(12) United States Patent
Inada et al.

(10) Patent No.: US 7,853,095 B2
(45) Date of Patent: Dec. 14, 2010

(54) APPARATUS, METHOD, RECORDING MEDIUM AND PROGRAM FOR PROCESSING SIGNAL

(75) Inventors: Tetsuji Inada, Tokyo (JP); Kazuki Yokoyama, Kanagawa (JP); Mitsuyasu Asano, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1050 days.

(21) Appl. No.: 11/589,065

(22) Filed: Oct. 30, 2006

(65) Prior Publication Data

US 2007/0103570 A1    May 10, 2007

(30) Foreign Application Priority Data

Nov. 2, 2005    (JP) .............................. 2005-319177

(51) Int. Cl.
*G06K 9/40* (2006.01)
(52) U.S. Cl. ........................ 382/260; 382/264; 348/619
(58) Field of Classification Search .......... 382/260–265
See application file for complete search history.

(56) References Cited

U.S. PATENT DOCUMENTS

| | | | | |
|---|---|---|---|---|
| 4,794,531 | A | * | 12/1988 | Morishita et al. ............ 382/132 |
| 5,001,576 | A | * | 3/1991 | Tanaka et al. ................ 358/462 |
| 5,467,412 | A | * | 11/1995 | Capitant et al. ............. 382/167 |
| 6,118,906 | A | * | 9/2000 | Keyes et al. ................. 382/266 |
| 6,157,749 | A | * | 12/2000 | Miyake ....................... 382/300 |
| 6,175,657 | B1 | * | 1/2001 | Mancuso et al. ............. 382/261 |
| 6,681,054 | B1 | * | 1/2004 | Gindele ....................... 382/272 |
| 6,718,068 | B1 | * | 4/2004 | Gindele et al. .............. 382/254 |

(Continued)

FOREIGN PATENT DOCUMENTS

EP        0 698 990 A1    2/1996

(Continued)

OTHER PUBLICATIONS

Ogata, Masami et al., "Dynamic Range Compression Based on Illumination Compensation," IEEE Transactions on Consumer Electronics, New York, NY, Aug. 1, 2001, 11 pages, vol. 47, No. 3.

(Continued)

*Primary Examiner*—Samir A. Ahmed
*Assistant Examiner*—Jayesh Patel
(74) *Attorney, Agent, or Firm*—Finnegan, Henderson, Farabow, Garrett and Dunner, L.L.P.

(57) ABSTRACT

A horizontal direction component pixel extractor extracts a pixel of interest and a horizontal direction component pixel thereof from an input video signal. A vertical direction component pixel extractor extracts the pixel of interest and a vertical direction component pixel thereof from the input video signal. A threshold setter sets a threshold value from the pixel of interest and the vertical processing direction component pixel thereof. A non-linear smoother non-linearly smoothes the pixel of interest using a horizontal processing direction component pixel in accordance with the set threshold value, thereby generating a video signal. A flat rate calculator calculates a flat rate in a vertical direction of the pixel of interest using a vertical processing direction component pixel. A mixer mixes the input video signal and the generated video signal using the flat rate, thereby outputting a horizontal direction smoothed video signal.

12 Claims, 37 Drawing Sheets

U.S. PATENT DOCUMENTS

| | | | | |
|---|---|---|---|---|
| 6,724,943 B2 * | 4/2004 | Tsuchiya et al. | ............ | 382/261 |
| 6,907,144 B1 * | 6/2005 | Gindele | ...................... | 382/275 |
| 6,965,416 B2 * | 11/2005 | Tsuchiya et al. | ............ | 348/606 |
| 6,987,544 B2 * | 1/2006 | Ogata et al. | ................. | 348/678 |
| 7,016,549 B1 * | 3/2006 | Utagawa | ..................... | 382/261 |
| 2003/0206245 A1 | 11/2003 | Lin et al. | | |
| 2005/0063475 A1 | 3/2005 | Bhaskaran | | |

FOREIGN PATENT DOCUMENTS

| | | |
|---|---|---|
| EP | 1 496 472 A2 | 1/2005 |
| JP | 2001-298621 | 10/2001 |

OTHER PUBLICATIONS

European Search Report dated Sep. 16, 2010 for EP Application No. 06255213.8-1522, Patent No. 1784005, 7 pages.

* cited by examiner

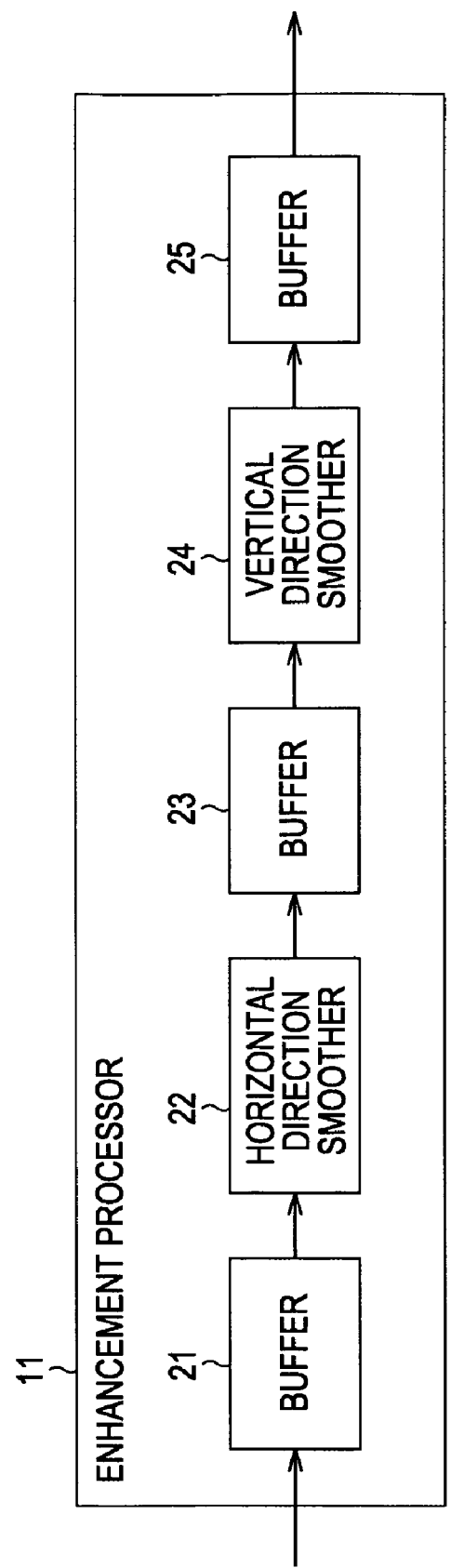

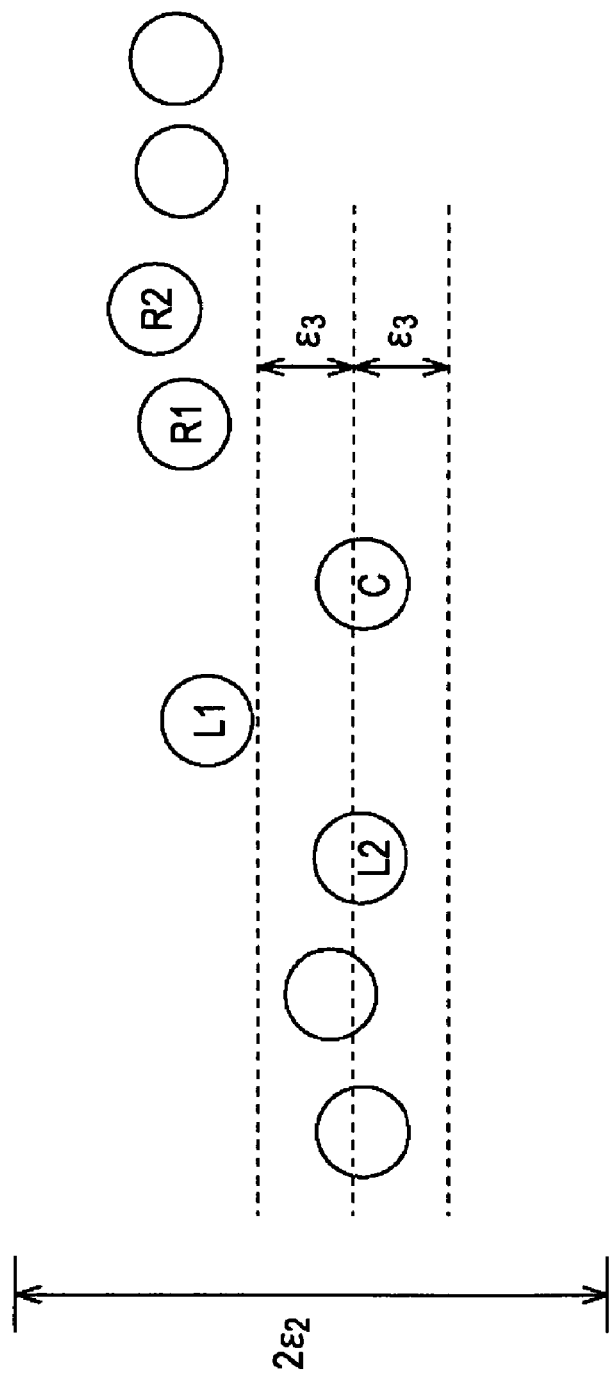

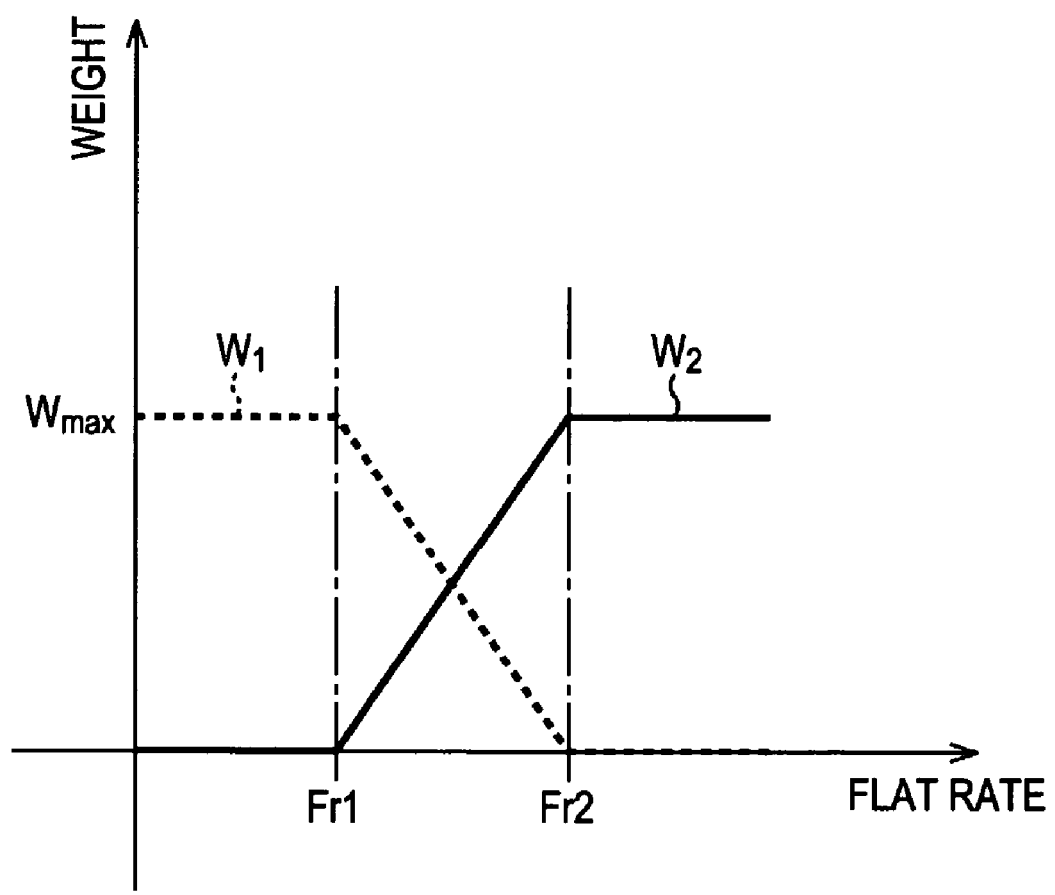

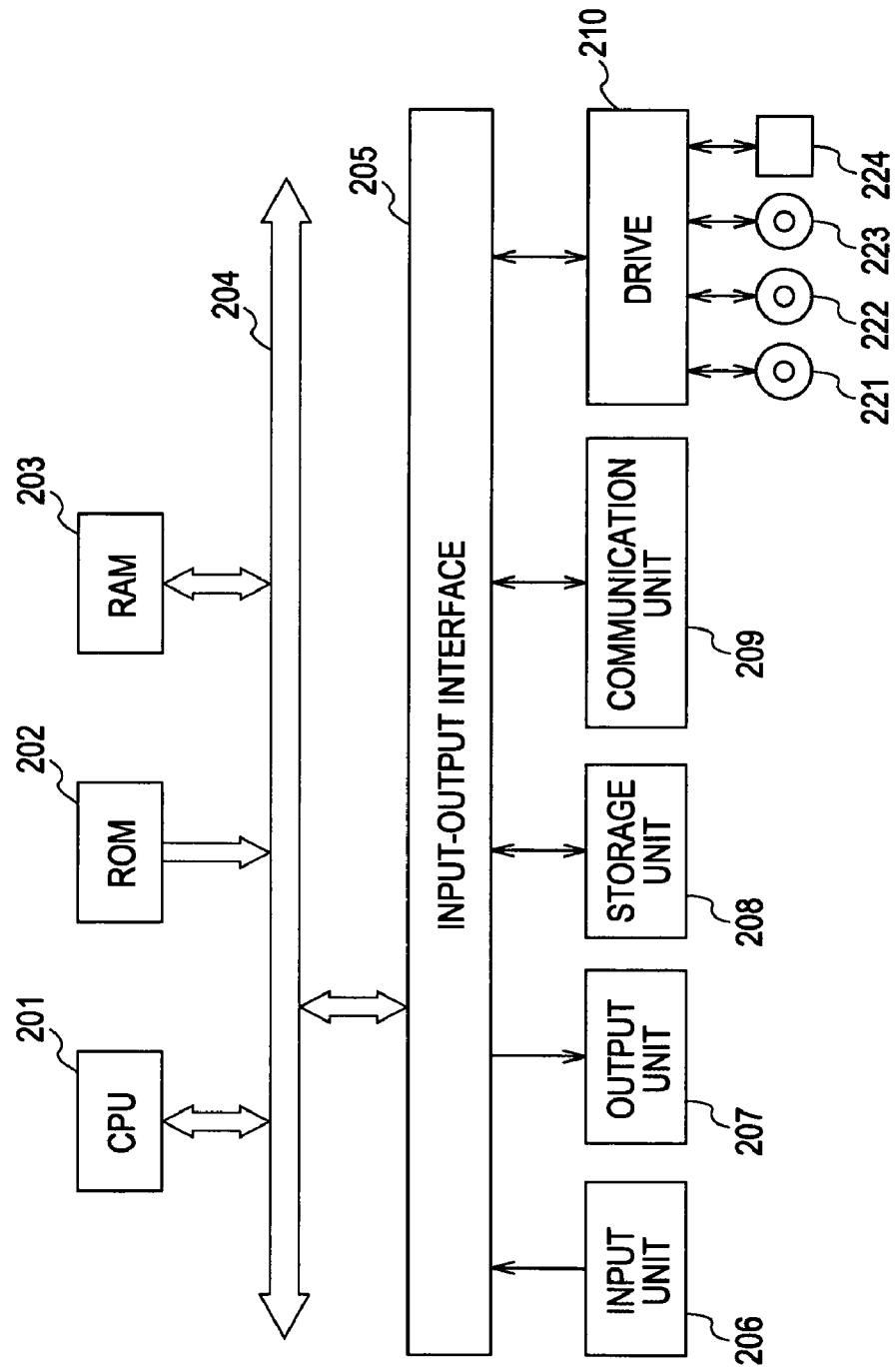

APPARATUS, METHOD, RECORDING MEDIUM AND PROGRAM FOR PROCESSING SIGNAL

CROSS REFERENCES TO RELATED APPLICATIONS

The present invention contains subject matter related to Japanese Patent Application JP 2005-319177 filed in the Japanese Patent Office on Nov. 2, 2005, the entire contents of which are incorporated herein by reference.

BACKGROUND OF THE INVENTION

1. Field of the Invention

The present invention relates to a method, apparatus, recording medium, and computer program for processing signal and, in particular, to a method, apparatus, recording medium and computer program for smoothing an image other than a sharp edge thereof with the sharp edge maintained without destroying continuity and correlation of pixels.

2. Description of the Related Art

A contrast enhancement method using gradation conversion and a high frequency component enhancement method enhancing contrast in a high frequency region have been contemplated in a video camera as a method for improving contrast (lightness difference between darkness and lightness) and sharpness of an image (clearness of a boundary) of an image picked up by an image pickup device such as charge-coupled device (CCD), a complementary metal-oxide semiconductor (CMOS) device.

The contrast enhancement methods include a tone curve adjustment method converting the pixel level of each pixel of an image in accordance with a function having a predetermined input and output relationship (hereinafter referred to as a level conversion function), and a histogram equalization method adaptively varying the level conversion function in response to a frequency distribution of the pixel level.

The high frequency component enhancement methods include an unsharp mask method performing outline enhancement by extracting an edge from an image and enhancing the extracted edge.

In accordance with the contrast enhancement method, only a portion of the entire luminance dynamic range (difference between a maximum level and a minimum level) of an image can be enhanced. Furthermore, contrast is lowered in the lightest portion and the darkest portion of the image in the tone curve adjustment method, and in a luminance region having a low frequency distribution in the histogram equalization method. In the high frequency component enhancement method, only the contrast of a high frequency component of the image is enhanced, leading to an unnaturally enhancement in the vicinity of an edge. As a result, image quality is degraded.

Japanese Unexamined Patent Application Publication No. 2001-298621 discloses a technique that enhances a portion of an image other than an edge by amplifying the portion of the image other than the edge with the edge providing a sharp change in pixel value of input video data stored.

Each of known image processing apparatuses extracts only a structural component of a signal from input video signal (pixel value) using an $\epsilon$ filter, generates an amplitude component as a difference between structural components of the input signal, amplifies only the amplitude component, sums the structural component and the amplified amplitude component, and outputs the sum. When a video signal having slightly varying video signal components surrounding a sharp edge having a larger magnitude than a predetermined threshold value $\epsilon_1$ is input, the video signal is converted into the one with only that edge extracted.

The $\epsilon$ filter determines each pixel of the input image as a pixel of interest C, sets a tap formed of a plurality of adjacent pixels consecutively arranged in a horizontal direction centered on the pixel of interest (for example, two pixels L2 and L1 to the left of the pixel of interest, and two pixels R1 and R2 to the right of the pixel of interest), weight averages pixel values of the pixel of interest C and the plurality of adjacent pixels using tap coefficients (for example, 1, 2, 3, 2, and 1) in accordance with equation (1), and outputs conversion result C':

$$C'=(1xL2+2xL1+3xC+2xR1+1xR2)/9 \qquad (1)$$

If the absolute value of difference between the pixel value of the adjacent pixel and the pixel value of the pixel of interest is greater than a predetermined $\epsilon_1$ (for example, the adjacent pixel $R2 > \epsilon_1$), the pixel value of the adjacent pixel R2 is replaced with the pixel value of the pixel of interest C as represented by equation (2):

$$C'=(1xL2+2xL1+3xC+2xR1+1xC)/9 \qquad (2)$$

The video signal smoothed by the $\epsilon$ filter is also referred to as a structural component of the video signal.

The video signal processed by the $\epsilon$ filter is subtracted from the input video signal (identical to the video signal input to the $\epsilon$ filter), and a slightly varying video signal other than the structural component of the video signal is extracted and amplified. The slightly varying video signal other than the structural component is referred to as an amplitude component. A portion of the video signal amplified and output, other than the structural component, and the structural component of the video signal output from the $\epsilon$ filter are summed, and the resulting sum becomes a video signal with the sharp edge thereof maintained and the portion of the video signal other than the edge amplified.

If an edge having a sharp variation in pixel value is smaller in size than a predetermined threshold value $\epsilon_1$, the video signal output from the $\epsilon$ filter is a smoothed one with the sharp edge missing. Severe image quality degradation is caused in a pattern image if the pattern image contains infinitesimal edges.

Each of consecutively arranged signals is successively designated as a signal of interest. A plurality of adjacent signals are determined from signals consecutively arranged in one of a horizontal direction and a vertical direction with respect to the signal of interest. A difference between the signal of interest and each of the adjacent signals is calculated. The adjacent signals having a difference smaller than a first threshold value and the signal of interest are weight averaged to calculate an smoothed signal. The difference is compared with a second threshold value smaller than the first threshold value. Whether an infinitesimal edge is present in the vicinity of the signal of interest is determined depending on whether the difference is greater than the second threshold value. One of the smoothed signal and the signal of interest is selected depending on the determination result.

Since horizontal processing and vertical processing are independently performed in accordance with the above technique, appropriate extraction of the structural component becomes difficult.

In another technique, information of direction component (reference direction) different from the processing direction is used. Depending on determination as to whether the input signal is flat in the processing direction, whether to perform smoothing process is determined. A signal serving as an intermediate value between a value provided as a result of smoothing process and a value with no smoothing process performed is output depending on the degree of flatness.

SUMMARY OF THE INVENTION

A signal of FIG. 1A is now processed with $\epsilon_1$ set using the previously discussed techniques. A pixel of interest C is represented by the letter x. If the smoothing process is varied in response to the degree of flatness, the signal is converted into a signal having no edge as shown in FIG. 1B. If the smoothing process is not activated depending on the degree of flatness, a signal having no substantial change from the original input signal can be frequently output as shown in FIG. 1C.

Even if the signal with the smoothing process performed and the signal with no smoothing process performed are mixed depending on the degree of flatness, the resulting signal can become an intermediate signal as shown in FIGS. 1B and 1C. A portion of the image other than an edge cannot be sufficiently smoothed with the edge preserved.

It is thus desirable to smooth an image other than a sharp edge thereof with the sharp edge maintained and with a continuity and correlation of pixels maintained.

In accordance with one embodiment of the present invention, a signal processing apparatus for adjusting a level of consecutively arranged signals, includes a designating unit for successively designating each of the consecutively arranged signals as a signal of interest, a setting unit for setting a first threshold value based on the absolute value of difference between a signal adjacent to the signal of interest designated by the designating unit and the signal of interest, a process signal extracting unit for extracting a plurality of adjacent signals as process signals from signals consecutively arranged in a first direction relative to the signal of interest designated by the designating unit, a calculating unit for calculating an average signal by weight averaging the signal of interest and the plurality of process signals based on a comparison result of comparing a process difference between the signal of interest and each of the process signals with the first threshold value, a first mix rate calculating unit for calculating a first mix rate of the average signal and the signal of interest based on a comparison result of comparing the process difference with a second threshold value smaller than the first threshold value, a first mixing unit for generating a first mix signal by mixing the average signal and the signal of interest in accordance with the first mix rate calculated by the first mix rate calculating unit, a reference signal extracting unit for extracting, as reference signals, a plurality of adjacent signals from signals consecutively arranged in a second direction relative to the signal of interest designated by the designating unit, a second mix rate calculating unit for calculating a second mix rate of the mix signal and the signal of interest based on a reference difference between the signal of interest and each reference signal, and a second mixing unit for generating a second mix signal by mixing the first mix signal and the signal of interest in accordance with the second mix rate calculated by the second mix rate calculating unit.

The signal may include a pixel value of each pixel constructing an image.

The setting unit may include the absolute value of difference calculating unit for calculating the absolute value of difference between the reference signal and the pixel of interest, wherein the first threshold value is set based on the maximum value of the absolute values of difference between each of the reference signals and the signal of interest.

The setting unit may include a maximum signal extracting unit for extracting one of the reference signals and the signal of interest providing a maximum value, from among the reference signals and the signal of interest, and a minimum signal extracting unit for extracting one of the reference signals and the signal of interest providing a minimum value, from among the reference signals and the signal of interest, wherein the first threshold value is set based on the absolute value of difference between the maximum value of the reference signals and the signal of interest and the minimum value of the reference signals and the signal of interest.

The setting unit may include a forward direction calculating unit for calculating the absolute value of difference between each of the reference signals and the signal of interest, the reference signals arranged in a forward direction with respect to the second direction relative to the signal of interest, and a backward direction calculating unit for calculating the absolute value of difference between each of the reference signals and the signal of interest, the reference signals arranged in a backward direction with respect to the second direction relative to the signal of interest, wherein the first threshold value is set based on the maximum value of the absolute values of difference calculated by the forward direction calculating unit or the maximum value of the absolute values of difference calculated by the backward direction calculating unit, whichever is smaller.

The setting unit may include a forward direction maximum signal extracting unit for extracting one of the reference signals and the signal of interest providing a maximum value, from among the reference signals and the signal of interest, the reference signals arranged in a forward direction with respect to the second direction relative to the signal of interest, a forward direction minimum signal extracting unit for extracting one of the reference signals and the signal of interest providing a minimum value, from among the reference signals and the signal of interest, the reference signals arranged in the forward direction with respect to the second direction relative to the signal of interest, a forward direction absolute value of difference calculating unit for calculating the absolute value of difference between the maximum value extracted by the forward direction maximum signal extracting unit and the minimum value extracted by the forward direction minimum signal extracting unit, a backward direction maximum signal extracting unit for extracting one of the reference signals and the signal of interest providing a maximum value, from among the reference signals and the signal of interest, the reference signals arranged in a backward direction with respect to the second direction relative to the signal of interest, a backward direction minimum signal extracting unit for extracting one of the reference signals and the signal of interest providing a minimum value, from among the reference signals and the signal of interest, the reference signals arranged in the backward direction with respect to the second direction relative to the signal of interest, and a backward direction absolute value of difference calculating unit for calculating the absolute value of difference between the maximum value extracted by the backward direction maximum signal extracting unit and the minimum value extracted by the backward direction minimum signal extracting unit, wherein the first threshold value is set based on the absolute value of difference calculated by the forward direction absolute value of difference calculating unit or the absolute value of difference calculated by the backward direction absolute value of difference calculating unit, whichever is smaller.

The setting unit may include the block absolute value of difference calculating unit for calculating the absolute value of difference between each pixel within each of blocks and a pixel of interest within each of the blocks set in a plurality of directions relative to the signal of interest, and outputting a maximum value of the absolute values of difference, wherein the first threshold value is set based on a minimum value of the maximum block values of difference calculated by the block absolute value of difference calculating unit.

The setting unit may include an adjacent absolute value of difference calculating unit for calculating the absolute value of difference between the signal of interest and each of adjacent pixels, and a histogram generating unit for generating a histogram based on the absolute value of difference between each pixel and the pixel of interest calculated by the adjacent absolute value of difference calculating unit, wherein the first threshold value is set based on the absolute value of difference providing a minimum frequency in the histogram.

In accordance with another embodiment of the present invention, a method of adjusting a level of consecutively arranged signals, includes steps of successively designating each of the consecutively arranged signals as a signal of interest, setting a first threshold value based on the absolute value of difference between a signal adjacent to the signal of interest designated in the designating step and the signal of interest, extracting a plurality of adjacent signals as process signals from signals consecutively arranged in a first direction relative to the signal of interest designated in the designating step, calculating an average signal by weight averaging the signal of interest and the plurality of process signals based on a comparison result of comparing a process difference between the signal of interest and each of the process signals with the first threshold value, calculating a first mix rate of the average signal and the signal of interest based on a comparison result of comparing the process difference with a second threshold value smaller than the first threshold value, generating a first mix signal by mixing the average signal and the signal of interest in accordance with the first mix rate calculated in the first mix rate calculating step, extracting, as reference signals, a plurality of adjacent signals from signals consecutively arranged in a second direction relative to the signal of interest designated in the designating step, calculating a second mix rate of the mix signal and the signal of interest based on a reference difference between the signal of interest and each reference signal, and generating a second mix signal by mixing the first mix signal and the signal of interest in accordance with the second mix rate calculated in the second mix rate calculating step.

In accordance with yet another embodiment of the present invention, a recording medium stores a computer-readable program of adjusting a level of consecutively arranged signals. The computer-readable program includes steps of successively designating each of the consecutively arranged signals as a signal of interest, setting a first threshold value based on the absolute value of difference between a signal adjacent to the signal of interest designated in the designating step and the signal of interest, extracting a plurality of adjacent signals as process signals from signals consecutively arranged in a first direction relative to the signal of interest designated in the designating step, calculating an average signal by weight averaging the signal of interest and the plurality of process signals based on a comparison result of comparing a process difference between the signal of interest and each of the process signals with the first threshold value, calculating a first mix rate of the average signal and the signal of interest based on a comparison result of comparing the process difference with a second threshold value smaller than the first threshold value, generating a first mix signal by mixing the average signal and the signal of interest in accordance with the first mix rate calculated in the first mix rate calculating step, extracting, as reference signals, a plurality of adjacent signals from signals consecutively arranged in a second direction relative to the signal of interest designated in the designating step, calculating a second mix rate of the mix signal and the signal of interest based on a reference difference between the signal of interest and each reference signal, and generating a second mix signal by mixing the first mix signal and the signal of interest in accordance with the second mix rate calculated in the second mix rate calculating step.

In accordance with still further embodiment of the present invention, a program causes a computer to adjust a level of consecutively arranged signals. The program includes steps of successively designating each of the consecutively arranged signals as a signal of interest, setting a first threshold value based on the absolute value of difference between a signal adjacent to the signal of interest designated in the designating step and the signal of interest, extracting a plurality of adjacent signals as process signals from signals consecutively arranged in a first direction relative to the signal of interest designated in the designating step, calculating an average signal by weight averaging the signal of interest and the plurality of process signals based on a comparison result of comparing a process difference between the signal of interest and each of the process signals with the first threshold value, calculating a first mix rate of the average signal and the signal of interest based on a comparison result of comparing the process difference with a second threshold value smaller than the first threshold value, generating a first mix signal by mixing the average signal and the signal of interest in accordance with the first mix rate calculated in the first mix rate calculating step, extracting, as reference signals, a plurality of adjacent signals from signals consecutively arranged in a second direction relative to the signal of interest designated in the designating step, calculating a second mix rate of the mix signal and the signal of interest based on a reference difference between the signal of interest and each reference signal, and generating a second mix signal by mixing the first mix signal and the signal of interest in accordance with the second mix rate calculated in the second mix rate calculating step.

In accordance with embodiments of the present invention, the level of the signals consecutively arranged is adjusted. Each of the consecutively arranged signals is successively designated as the signal of interest. The first threshold value is set based on the absolute value of difference between the signal adjacent to the designated signal of interest and the signal of interest. The plurality of adjacent signals are extracted as the process signals from the signals consecutively arranged in the first direction with respect to the designated signal of interest. The signal of interest and the plurality of process signals are weight averaged to generate the average signal based on the comparison result of comparing the process difference between the signal of interest and each process signal with the first threshold value. The first mix rate of the average signal and the signal of interest is calculated based on the comparison result of comparing the process difference with the second threshold value smaller than the first threshold value. The average signal and the signal of interest are mixed in accordance with the calculated first mix rate, thereby generating the first mix signal. The plurality of adjacent signals are extracted as the reference signals from the signal consecutively arranged in the second direction with respect to the designated signal of interest. The second mix rate of the mix signal and the signal of interest is calculated based on the reference difference between the signal of interest and each reference signal. The first mix signal and the signal of interest are mixed in accordance with the second mix rate. The second mix signal is thus generated.

The signal processing apparatus of embodiments of the present invention may be an independent apparatus or a block that processes signals.

In accordance with embodiments of the present invention an image other than a sharp edge thereof is smoothed with the sharp edge maintained and with a continuity and correlation of pixels maintained.

BRIEF DESCRIPTION OF THE DRAWINGS

FIG. 2 is a block diagram illustrating an enhancement processor in accordance with one embodiment of the present invention;

FIG. 15 illustrates the infinitesimal-edge determination process of the image enhancement processor of FIG. 2;

FIG. 16 illustrates another setting method of a weight by the image enhancement processor of FIG. 2;

FIG. 43 illustrates a recording medium.

DESCRIPTION OF THE PREFERRED EMBODIMENTS

Before describing an embodiment of the present invention, the correspondence between the invention described in this specification and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the invention. Conversely, even if an element is described herein as relating to a certain feature of the present invention, that does not necessarily mean that the element does not relate to other features of the present invention.

Furthermore, this description does not necessarily mean all the aspects of the invention. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 3:
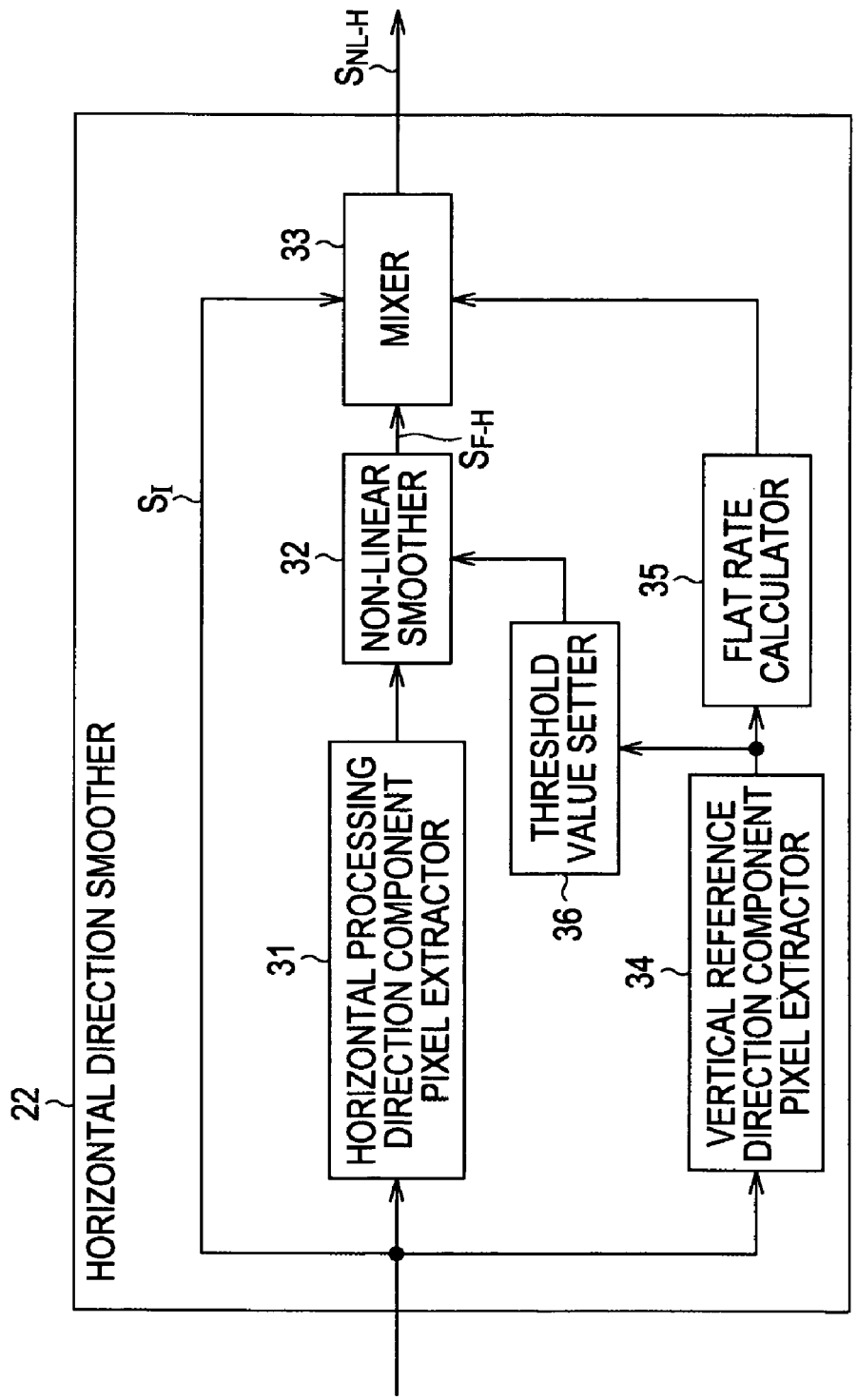
FIG. 3 is a block diagram illustrating a horizontal direction smoother of FIG. 2.

In accordance with one embodiment of the present invention, a signal processing apparatus for adjusting a level of consecutively arranged signals, includes a designating unit (for example, horizontal direction smoother 22 of FIG. 3) for successively designating each of the consecutively arranged signals as a signal of interest, a setting unit (for example, threshold value setter 36 of FIG. 3) for setting a first threshold value based on the absolute value of difference between a signal adjacent to the signal of interest designated by the designating unit and the signal of interest, a process signal extracting unit (for example, horizontal processing direction component pixel extractor 31 of FIG. 3) for extracting a plurality of adjacent signals as process signals from signals consecutively arranged in a first direction relative to the signal of interest designated by the designating unit, a calculating unit (for example, non-linear filter 51 of FIG. 5) for calculating an average signal by weight averaging the signal of interest and the plurality of process signals based on a comparison result of comparing a process difference between the signal of interest and each of the process signals with the first threshold value, a first mix rate calculating unit (for example, mix rate detector 53 of FIG. 5) for calculating a first mix rate of the average signal and the signal of interest based on a comparison result of comparing the process difference with a second threshold value smaller than the first threshold value, a first mixing unit (for example, mixer 52 of FIG. 5) for generating a first mix signal by mixing the average signal and the signal of interest in accordance with the first mix rate calculated by the first mix rate calculating unit, a reference signal extracting unit (for example, vertical reference direction component pixel extractor 34 of FIG. 3) for extracting, as reference signals, a plurality of adjacent signals from signals consecutively arranged in a second direction relative to the signal of interest designated by the designating unit, a second mix rate calculating unit (for example, flat rate calculator 35 of FIG. 3) for calculating a second mix rate of the mix signal and the signal of interest based on a reference difference between the signal of interest and each reference signal, and a second mixing unit (for example, mixer 33 of FIG. 3) for generating a second mix signal by mixing the first mix signal and the signal of interest in accordance with the second mix rate calculated by the second mix rate calculating unit.

The setting unit may include the absolute value of difference calculating unit (for example, absolute value of difference calculator 71 of FIG. 6) for calculating the absolute value of difference between the reference signal and the pixel of interest, wherein the first threshold value is set based on the maximum value of the absolute values of difference between each of the reference signals and the signal of interest.

The setting unit may include a maximum signal extracting unit (for example, maximum value extractor 81 of FIG. 20) for extracting one of the reference signals and the signal of interest providing a maximum value, from among the reference signals and the signal of interest, and a minimum signal extracting unit (for example, minimum value extractor 82 of FIG. 20) for extracting one of the reference signals and the signal of interest providing a minimum value, from among the reference signals and the signal of interest, wherein the first threshold value is set based on the absolute value of difference between the maximum value of the reference signals and the signal of interest and the minimum value of the reference signals and the signal of interest.

Figure 25:
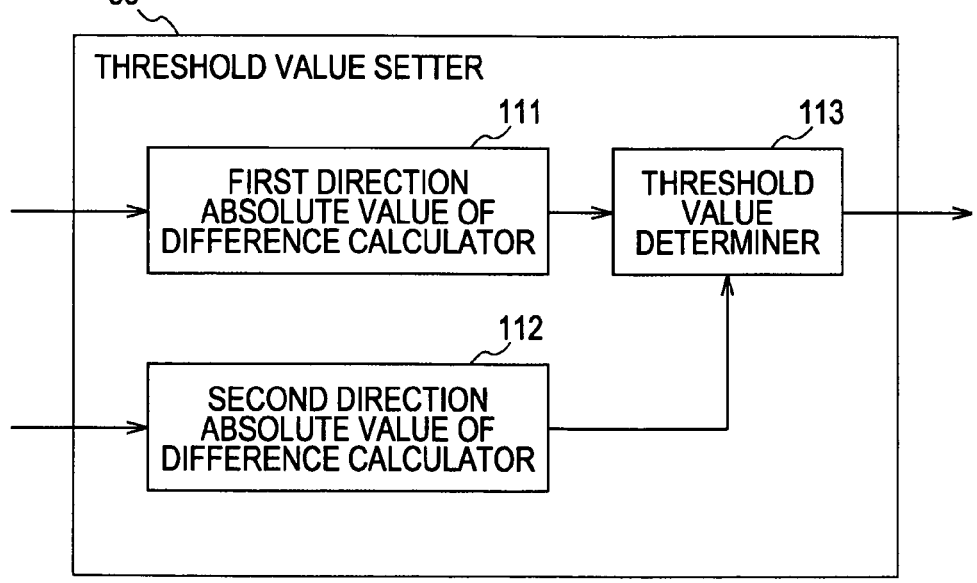
FIG. 25 is a block diagram of another modification of the threshold value setter of FIG. 3.
Figure 26:
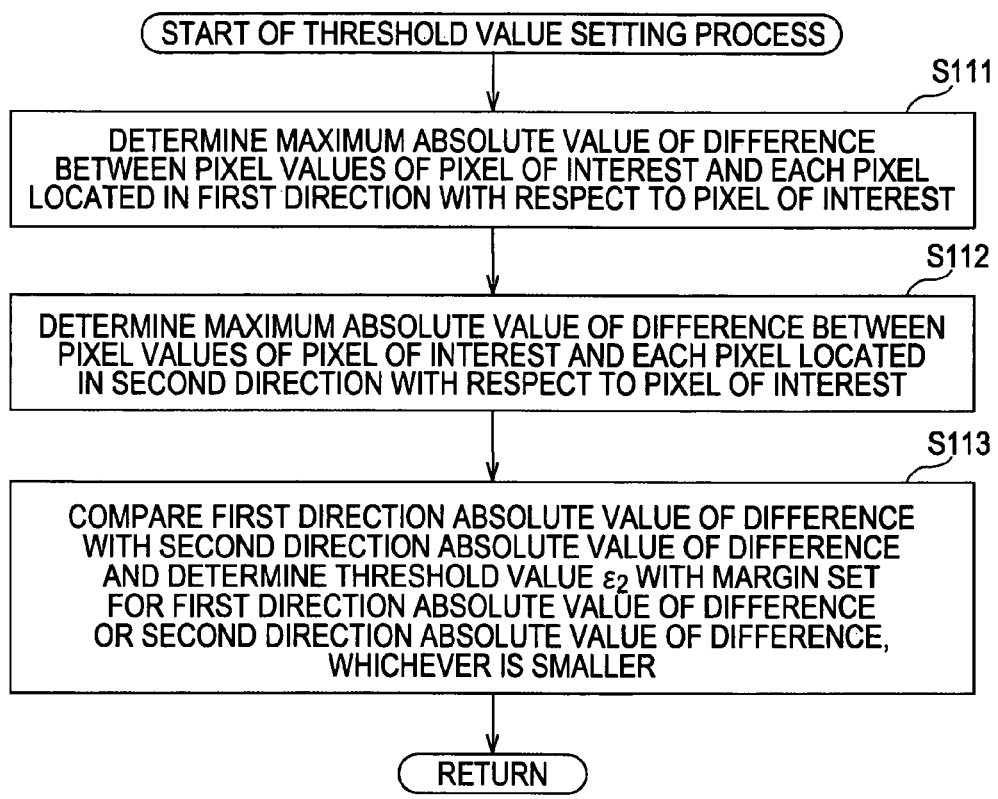
FIG. 26 is a flowchart illustrating the threshold value setting process of the threshold value setter of FIG. 25.

The setting unit may include a forward direction calculating unit (for example, first direction absolute value of difference calculator 111 of FIG. 25) for calculating the absolute value of difference between each of the reference signals and the signal of interest, the reference signals arranged in a forward direction with respect to the second direction relative to the signal of interest, and a backward direction calculating unit (for example, second direction absolute value of difference calculator 112 of FIG. 25) for calculating the absolute value of difference between each of the reference signals and the signal of interest, the reference signals arranged in a backward direction with respect to the second direction relative to the signal of interest, wherein the first threshold value is set based on the maximum value of the absolute values of difference calculated by the forward direction calculating unit or the maximum value of the absolute values of difference calculated by the backward direction calculating unit, whichever is smaller.

The setting unit may include a forward direction maximum signal extracting unit (for example, first direction maximum value extractor 91 of FIG. 22) for extracting one of the reference signals and the signal of interest providing a maximum value, from among the reference signals and the signal of interest, the reference signals arranged in a forward direction with respect to the second direction relative to the signal of interest, a forward direction minimum signal extracting unit (for example, first direction minimum value extractor 92 of FIG. 22) for extracting one of the reference signals and the signal of interest providing a minimum value, from among the reference signals and the signal of interest, the reference signals arranged in the forward direction with respect to the second direction relative to the signal of interest, a forward direction absolute value of difference calculating unit (for example, absolute value of difference calculator 93 of FIG. 22) for calculating the absolute value of difference between the maximum value extracted by the forward direction maximum signal extracting unit and the minimum value extracted by the forward direction minimum signal extracting unit, a backward direction maximum signal extracting unit (for example, second direction maximum value extractor 94 of FIG. 22) for extracting one of the reference signals and the signal of interest providing a maximum value, from among the reference signals and the signal of interest, the reference signals arranged in a backward direction with respect to the second direction relative to the signal of interest, a backward direction minimum signal extracting unit (for example, second direction minimum value extractor 95 of FIG. 22) for extracting one of the reference signals and the signal of interest providing a minimum value, from among the reference signals and the signal of interest, the reference signals arranged in the backward direction with respect to the second direction relative to the signal of interest, and a backward direction absolute value of difference calculating unit (for example, absolute value of difference calculator 96 of FIG. 22) for calculating the absolute value of difference between the maximum value extracted by the backward direction maximum signal extracting unit and the minimum value extracted by the backward direction minimum signal extracting unit, wherein the first threshold value is set based on the absolute value of difference calculated by the forward direction absolute value of difference calculating unit or the absolute value of difference calculated by the backward direction absolute value of difference calculating unit, whichever is smaller.

Figure 28:
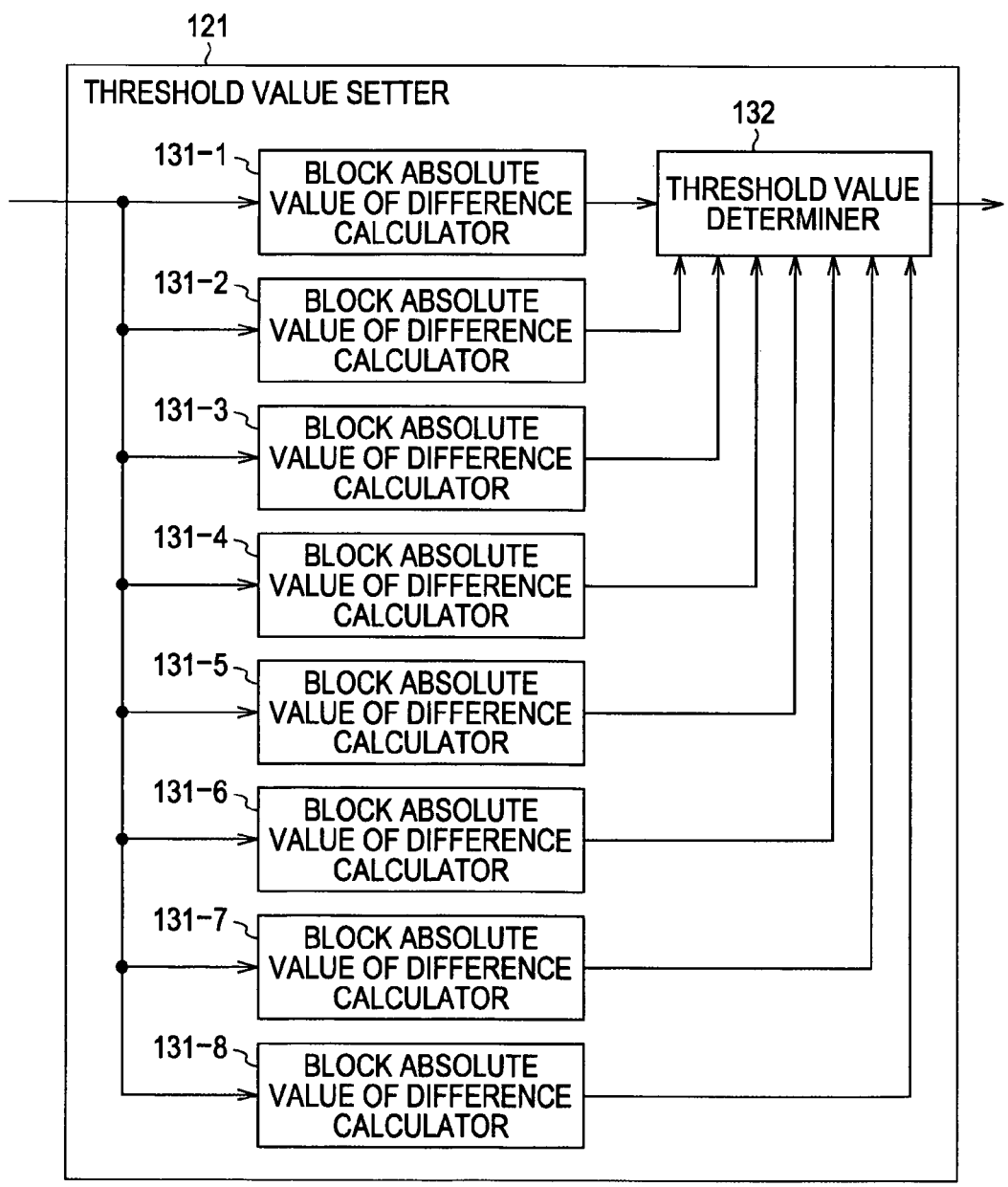
FIG. 28 is a block diagram illustrating the threshold value setter of FIG. 27.

The setting unit may include the block absolute value of difference calculating unit (for example, block absolute value of difference calculators 131-1 through 131-8 of FIG. 28) for calculating the absolute value of difference between each pixel within each of blocks and a pixel of interest in each of the blocks set in a plurality of directions relative to the signal of interest, and outputting a maximum value of the absolute values of difference, wherein the first threshold value is set based on a minimum value of the maximum block values of difference calculated by the block absolute value of difference calculating unit.

The setting unit may include an adjacent absolute value of difference calculating unit (for example, absolute value of difference calculator 141 of FIG. 31) for calculating the absolute value of difference between the signal of interest and each of adjacent pixels, and a histogram generating unit (for example, histogram generator 142 of FIG. 31) for generating a histogram based on the absolute value of difference between each pixel and the pixel of interest calculated by the adjacent absolute value of difference calculating unit, wherein the first threshold value is set based on the absolute value of difference providing a minimum frequency in the histogram.

Figure 8:
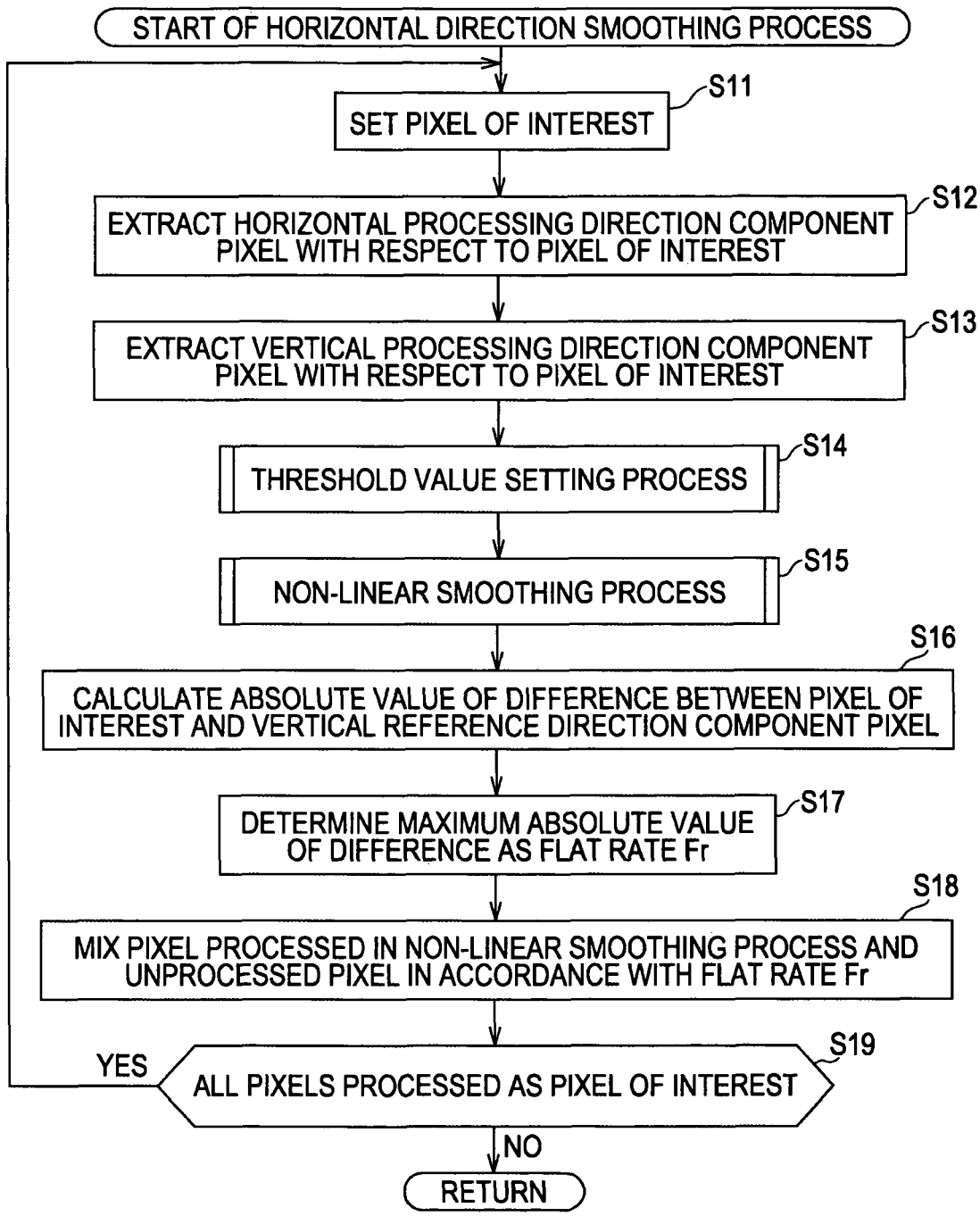
FIG. 8 is a flowchart illustrating a horizontal direction smoothing process of the image enhancement processor of FIG. 2.

In accordance with another embodiment of the present invention, one of a method and program of adjusting a level of consecutively arranged signals, includes steps of successively designating each of the consecutively arranged signals as a signal of interest (for example, in step S11 of a flowchart of FIG. 8), setting a first threshold value based on the absolute value of difference between a signal adjacent to the signal of interest designated in the designating step and the signal of interest (for example, in step S14 in the flowchart of FIG. 8), extracting a plurality of adjacent signals as process signals from signals consecutively arranged in a first direction relative to the signal of interest designated in the designating step (for example, in step S12 of in the flowchart of FIG. 8), calculating an average signal by weight averaging the signal of interest and the plurality of process signals based on a comparison result of comparing a process difference between the signal of interest and each of the process signals with the first threshold value (for example, in step S32 of a flowchart of FIG. 11), calculating a first mix rate of the average signal and the signal of interest based on a comparison result of comparing the process difference with a second threshold value smaller than the first threshold value (for example, in step S33 of the flowchart of FIG. 11), generating a first mix signal by mixing the average signal and the signal of interest in accordance with the first mix rate calculated in the first mix rate calculating step (for example, in step S36 of the flowchart of FIG. 11), extracting, as reference signals, a plurality of adjacent signals from signals consecutively arranged in a second direction relative to the signal of interest designated in the designating step (for example, in step S13 in the flowchart of FIG. 8), calculating a second mix rate of the mix signal and the signal of interest based on a reference difference between the signal of interest and each reference signal (for example, in step S17 in the flowchart of FIG. 8), and generating a second mix signal by mixing the first mix signal and the signal of interest in accordance with the second mix rate calculated in the second mix rate calculating step (for example, in step S18 of the flowchart of FIG. 8).

FIG. 2 illustrates an enhancement processor 11 in accordance with one embodiment of the present invention. The enhancement processor 11 enhances contrast and sharpness of a portion of an image other than an edge with the edge preserved and controls unnaturally looking enhancement caused depending on a processing direction.

A buffer 21 temporarily stores an input video signal, and then supplies the input video signal to a subsequent horizontal direction smoother 22. The horizontal direction smoother 22 performs a non-linear smoothing process in a horizontal direction on a pixel of interest using the pixel of interest and adjacent pixels horizontally arranged with respect to the pixel of interest, and then supplies the resulting video signal to a buffer 23. The buffer 23 temporarily stores the video signal supplied from the horizontal direction smoother 22, and then successively supplies the video signal to a vertical direction smoother 24. The vertical direction smoother 24 performs a non-linear smoothing process on the pixel of interest using the pixel of interest and adjacent pixels vertically arranged with respect to the pixel of interest and supplies the resulting video signal to a buffer 25. The buffer 25 temporarily stores the video signal composed of the vertically non-linearly smoothed pixels supplied from the vertical direction smoother 24 and then outputs the video signal to a subsequent apparatus (not shown).

Referring to FIG. 3, the horizontal direction smoother 22 is described below in detail.

A horizontal processing direction component pixel extractor 31 successively designates, as a pixel of interest, each of pixels of the video signal stored on the buffer 21 and extracts pixels, corresponding to the pixel of interest, required for the non-linear smoothing process, and outputs the pixels to a non-linear smoother 32. More specifically, the horizontal processing direction component pixel extractor 31 extracts, in response to the pixel of interest, two pixels to the right of the pixel of interest and two pixels to the left of the pixel of interest in the horizontal direction as horizontal processing direction component pixels, and supplies pixel values of the extracted four pixels and the pixel of interest to the non-linear smoother 32. The number of horizontal processing direction component pixels to be extracted is not limited to two to the right of the pixel of interest and two to the left of the pixel of interest. Any number of horizontal processing direction component pixels is acceptable as long as the pixels are arranged in the horizontal direction. For example, the horizontal processing direction component pixels to be extracted may be three pixels to the right of and three pixels to the left of the pixel of interest. Alternatively, the horizontal processing direction component pixels to be extracted may be three pixels to the right of and one pixel to the left of the pixel of interest.

The non-linear smoother 32 uses the horizontal processing direction component pixels, namely, the two pixels to the right of the pixel of interest and the two pixels to the left of the pixel of interest supplied from the horizontal processing direction component pixel extractor 31 to perform the non-linear smoothing process on the pixel of interest based on a threshold value $\epsilon_2$ supplied from a threshold value setter 36. The non-linearly smoothed pixel is then supplied to a mixer 33. The structure of the non-linear smoother 32 will be described later with reference to FIG. 5. The horizontal non-linear smoothing process refers to a non-linear smoothing process that is performed on the pixel of interest using a plurality of pixels horizontally adjacent to the pixel of interest. Similarly, a vertical non-linear smoothing process refers to a non-linear smoothing process that is performed on the pixel of interest using a plurality of pixels vertically adjacent to the pixel of interest.

A vertical reference direction component pixel extractor 34 successively designates, as a pixel of interest, each of pixels of the video signal stored on the buffer 21 and extracts pixels adjacent to the pixel of interest in a vertical direction different from the direction in which the pixels required for the non-linear smoothing process are arranged. The extracted pixels and the pixel of interest are then supplied to a flat rate calculator 35 and the threshold value setter 36. More specifically, the vertical reference direction component pixel extractor 34 extracts two pixels vertically arranged above the pixel of interest and two pixels vertically arranged below the pixel of interest as vertical reference direction component pixels, and supplies pixel values of the four extracted pixels and the pixel of interest to each of the flat rate calculator 35 and the threshold value setter 36. The number of vertical reference direction component pixels to be extracted are not limited to the two pixels above and the two pixels below the pixel of interest. Any pixels are acceptable as long as the pixels are adjacent to the pixel of interest in the vertical direction. Three pixels above and three pixels below the pixel of interest may be acceptable. Alternatively, one pixel above the pixel of interest and three pixels below the pixel of interest may be acceptable.

The flat rate calculator 35 calculates the absolute value of difference between the pixel values of the pixel of interest and the vertical reference direction component pixels supplied from the vertical reference direction component pixel extractor 34. The flat rate calculator 35 then supplies the maximum value of the absolute values of difference as a flat rate to the mixer 33. The flat rate in the vertical direction refers to a change in the absolute value of difference between the pixels values of the pixel of interest and the vertical reference direction component pixels. If the flat rate is large, a change in the pixel values of pixels in the vicinity of the pixel of interest is also large, and pixel to pixel correlation in the vertical direction is small. This is interpreted as a non-flat image with a large change occurring in the pixel value. If the flat rate is small, a change in the pixel values of pixels in the vicinity of the pixel of interest is also small, and pixel to pixel correlation in the vertical direction is large. This is interpreted as a flat image with a small change occurring in the pixel value.

In accordance with the vertical flat rate supplied from the flat rate calculator 35, the mixer 33 mixes pixel values of the non-linear smoothing processed pixel of interest and an unprocessed pixel of interest, and outputs the resulting pixel value to the subsequent buffer 23 as a horizontal direction smoothed pixel.

Using the pixels adjacent to the pixel of interest in the vertical direction different from the direction in which the pixel required for the non-linear smoothing process are arranged, the threshold value setter 36 sets the threshold value $\epsilon_2$ required for the non-smoothing process of the non-linear smoother 32, and then supplies the threshold value $\epsilon_2$ to the non-linear smoother 32. The threshold value setter 36 will be described in detail with reference to FIG. 6.

The vertical direction smoother 24 is described in detail below with reference to FIG. 4.

The vertical direction smoother 24 is substantially identical in structure to the horizontal direction smoother 22 except that the horizontal direction process and the vertical direction process are interchanged. A vertical processing direction component pixel extractor 41 successively designates, as a pixel of interest, each of pixels of the video signal stored on the buffer 23, extracts pixels required for a non-linear smoothing process corresponding to the pixel of interest and supplies the extracted pixels and the pixel of interest to a non-linear smoother 42. More specifically, the vertical processing direction component pixel extractor 41 extracts, in response to the pixel of interest, two adjacent pixels vertically above and two adjacent pixels vertically blow the pixel of interest as vertical processing direction component pixels, and supplies pixel values of the extracted four pixels and the pixel of interest to the non-linear smoother 42. The vertical processing direction component pixels to be extracted is not limited to the two pixels above and the two pixel below the pixel of interest. Any number of vertical processing direction component pixels is acceptable as long as the pixels are adjacent to the pixel of interest in the vertical direction. For example, the vertical processing direction component pixels to be extracted may be three pixels above and three pixels below the pixel of interest. Alternatively, the vertical processing direction component pixels to be extracted may be one pixel above and three pixels below the pixel of interest.

The non-linear smoother 42 uses the vertical processing direction component pixels, namely, the two pixels above the pixel of interest and the two pixels below the pixel of interest supplied from the vertical processing direction component pixel extractor 41 to perform the non-linear smoothing process on the pixel of interest based on a threshold value $\epsilon_2$ supplied from a threshold value setter 46. The non-linear smoothed pixel is then supplied to a mixer 43. The non-linear smoother 42 is identical in structure to the non-linear smoother 32, and will be described later with reference to FIG. 5.

A horizontally reference direction component pixel extractor 44 successively designates, as a pixel of interest, each of pixels of the video signal stored on the buffer 23 and extracts pixels adjacent to the pixel of interest in a horizontal direction different from the direction in which the pixels required for the non-linear smoothing process are arranged. The extracted pixels and the pixel of interest are then supplied to a flat rate calculator 45 and the threshold value setter 46. More specifically, the horizontal reference direction component pixel extractor 44 extracts two pixels to the right of the pixel of interest and two pixels to the left of the pixel of interest as horizontal reference direction component pixels, and supplies pixel values of the extracted four pixels and the pixel of interest to each of the flat rate calculator 45 and the threshold value setter 46. The number of horizontal reference direction component pixels to be extracted are not limited to the two pixels to the right of and the two pixels to the left of the pixel of interest. Any pixels are acceptable as long as the pixels are adjacent to the pixel of interest in the horizontal direction. For example, three pixels to the right of and three pixels to the left of the pixel of interest may be acceptable. Alternatively, three pixels to the right of the pixel of interest and one pixel to the left of the pixel of interest may be acceptable.

The flat rate calculator 45 calculates the absolute value of difference between the pixel values of the pixel of interest and the two pixels to the right of the pixel of interest and the two pixels to the left of the pixel of interest supplied from the horizontal reference direction component pixel extractor 44, and then supplies the maximum value of the absolute values of difference to the mixer 43 as a flat rate.

In accordance with the horizontal flat rate supplied from the flat rate calculator 45, the mixer 33 mixes pixel values of the non-linear smoothing processed pixel of interest and an unprocessed pixel of interest, and outputs the resulting pixel value to the subsequent buffer 25 as a vertical direction smoothed pixel.

Using the pixels adjacent to the pixel of interest in the horizontal direction different from the direction in which the pixel required for the non-linear smoothing process are arranged, the threshold value setter 46 sets the threshold value $\epsilon_2$ required for the non-smoothing process of the non-linear smoother 42, and then supplies the threshold value $\epsilon_2$ to the non-linear smoother 42. The threshold value setter 46 is identical in structure to the threshold value setter 36 and will be described in detail later with reference to FIG. 6.

The non-linear smoother 32 is described in detail below with reference to FIG. 5.

A non-linear filter 51 in the non-linear smoother 32 holds a sharp edge larger in size than the threshold value $\epsilon_2$ supplied from the threshold value setter 36, from among variations of the pixels constructing the input video signal $S_1$ while smoothing a portion of the video signal $S_1$ other than the edge and outputs a smoothed video signal $S_{LPF-H}$ to a mixer 52.

A mix rate detector 53 determines a threshold value $\epsilon_3$ smaller than the threshold value $\epsilon_2$ supplied by the threshold value setter 36, detects an infinitesimal change in variations of the pixels constructing the input video signal $S_1$ in accordance with the threshold value $\epsilon_3$, calculates a mix rate based on the detection result, and supplies the calculated mix rate to the mixer 52.

The mixer 52 mixes the smoothed video signal $S_{LPF-H}$ and the unsmoothed video signal $S_1$ in accordance with the mix rate supplied from the mix rate detector 53, and outputs the mixing result as non-linearly smoothed video signal $S_{F-H}$.

A low-pass filter (LPF) 61 in the non-linear filter 51 smoothes the pixel of interest based on the pixel of interest and the horizontal processing direction component pixels, namely, the two adjacent pixels to the right of the pixel of interest and the two adjacent pixels to the left of the pixel of interest in the horizontal direction, in accordance with a control signal supplied from a control signal generator 62 and the threshold value $\epsilon_2$ supplied from the threshold value setter 36. The low-pass filter 61 outputs a smoothed video signal $S_{LPF-H}$ to the mixer 52. The control signal generator 62 calculates the absolute value of difference between the pixel value of the pixel of interest and the pixel value of each of the horizontal processing direction component pixels, generates the control signal for controlling the low-pass filter 61 based on the calculation result, and then supplies the control signal to the low-pass filter 61. The known $\epsilon$ filter may be used for the non-linear filter 51.

Figure 6:
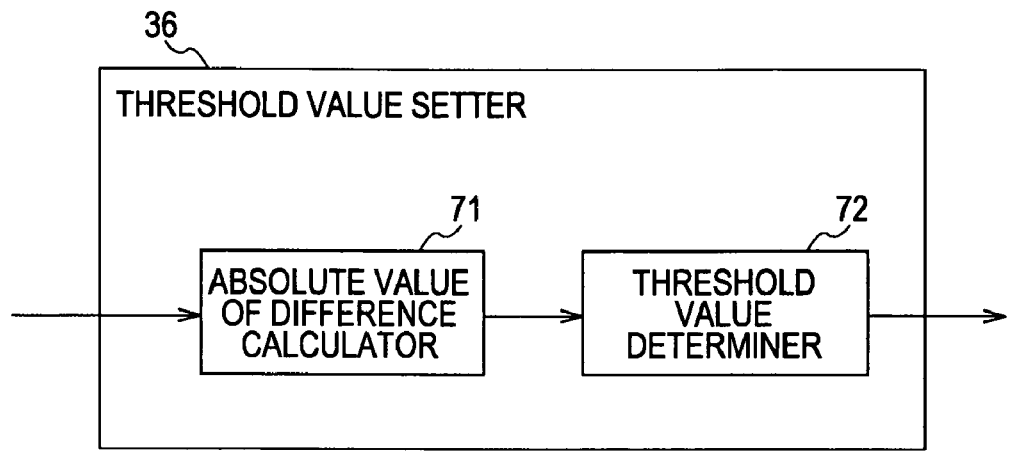
FIG. 6 is a block diagram illustrating a threshold value setter of FIG. 3.

The threshold value setter 36 is described below with reference to FIG. 6.

An absolute value of difference calculator 71 calculates the absolute value of difference between the pixel of interest and each pixel adjacent to the pixel of interest in the vertical direction different from the direction in which the pixels required for the non-linear smoothing process are arranged, and supplies the calculated absolute value of difference to the threshold value determiner 72. The threshold value determiner 72 adds a margin to the maximum value of the absolute values of difference supplied from the absolute value of difference calculator 71 to determine a threshold value $\epsilon_2$. The threshold value $\epsilon_2$ is then supplied to the non-linear smoother 32. The threshold value setter 46, identical in structure to the threshold value setter 36, is not shown in detail. In the threshold value setter 46, the absolute value of difference calculator 71 calculates the absolute value of difference between the pixel of interest and each of pixels adjacent to the pixel of interest in the horizontal direction different from the direction in which the pixels required for the non-linear smoothing process are arranged, and then supplies the calculated absolute value of difference to the threshold value determiner 72.

An image enhancement process of the enhancement processor 11 of FIG. 2 is described below with reference to a flowchart of FIG. 7.

In step S1, the horizontal direction smoother 22 successively performs a horizontal direction smoothing process using the video signal stored on the buffer 21.

The horizontal direction smoothing process of the horizontal direction smoother 22 is described below with reference to a flowchart of FIG. 8.

In step S11, the horizontal processing direction component pixel extractor 31 in the horizontal direction smoother 22 successively sets each pixel of interest in the order of raster scanning sequence. Similarly, the vertical reference direction component pixel extractor 34 sets each pixel of interest in the order of raster scanning sequence. The order of setting the pixel of interest may be any other manner than the raster scanning sequence. But it is important that the pixel of interest set by the horizontal processing direction component pixel extractor 31 be the same as the pixel of interest set by the vertical reference direction component pixel extractor 34.

Figure 9:
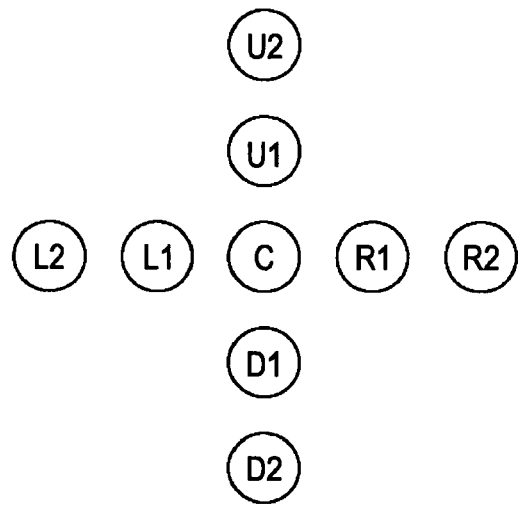
FIG. 9 illustrates the horizontal direction smoothing process of the image enhancement processor of FIG. 2.

In step S12, the horizontal processing direction component pixel extractor 31 extracts a total of five pixels from the buffer 21, including the pixel of interest and the adjacent horizontal processing direction component pixels, namely, the two pixels to the right of and the two pixels to the left of the pixel of interest in the horizontal direction. For example, as shown in FIG. 9, pixels L2, L1, C, R1 and R2 are extracted as the horizontal processing direction component pixels and the pixel of interest. As shown in FIG. 9, the pixel C is the pixel of interest, the pixels L2 and L1 are the two horizontal processing direction component pixels arranged to the left of the pixel of interest C and the pixels R1 and R2 are the two horizontal processing direction component pixels arranged to the right of the pixel of interest C.

In step S13, the vertical reference direction component pixel extractor 34 extracts a total of five pixels from the buffer 21, including the pixel of interest and the adjacent vertical reference direction component pixels, namely, the two pixels above and the two pixels below the pixel of interest in the vertical direction. For example, as shown in FIG. 9, pixels U2, U1, C, D1 and D2 are extracted as the pixel of interest and the vertical reference direction component pixels. As shown in FIG. 9, the pixel C is the pixel of interest, and the pixels U2 and U1 are the two vertical reference direction component pixels above the pixel of interest C and the pixels D1 and D2 are the two vertical reference direction component pixels below the pixel of interest C.

In step S14, the threshold value setter 36 performs a threshold value setting process.

Figure 10:
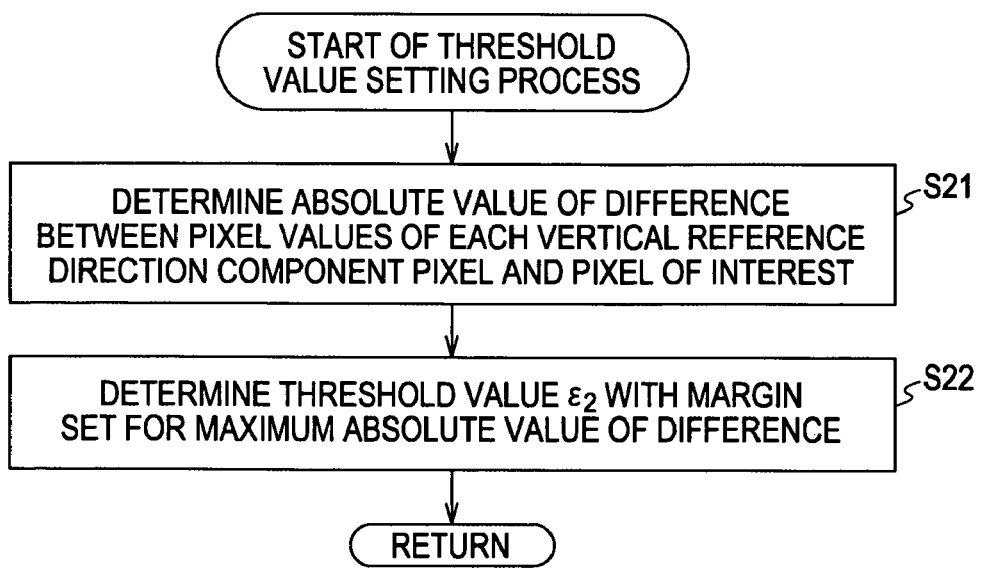
FIG. 10 is a flowchart illustrating a threshold value setting process of the threshold value setter of FIG. 6.

The threshold value setting process is described below with reference to a flowchart of FIG. 10.

In step S21, the absolute value of difference calculator 71 calculates the absolute value of difference between the pixel value of the pixel of interest and the pixel value of each of the vertical reference direction component pixels, and supplies the calculated absolute value of difference to the threshold value determiner 72. As shown in FIG. 9, the pixel C is the pixel of interest and the pixels U2, U1, D1 and D2 are the vertical reference direction component pixels. The absolute value of difference calculator 71 calculates |C-U2|, |C-U1|, |C-D2|, and |C-D1|, and supplies the calculated absolute values of difference to the threshold value determiner 72.

In step S22, the threshold value determiner 72 determines as the threshold value $\epsilon_2$ the maximum value of the absolute values of difference supplied from the absolute value of difference calculator 71 and then supplies the threshold value $\epsilon_2$ to the non-linear smoother 32. As shown in FIG. 9, the threshold value determiner 72 searches |C-U2|, |C-U1|, |C-D2|, and |C-D1| for the maximum value and adds a predetermined margin to the maximum value to determine the threshold value $\epsilon_2$. For example, if a 10% margin is added, 1.1 times the maximum value of the absolute values of difference is set to be the threshold value $\epsilon_2$.

Returning to the flowchart of FIG. 8, the threshold value setting process ends in step S14. In step S15, the non-linear smoother 32 performs the non-linear smoothing process on the pixel of interest based on the pixel of interest and the horizontal processing direction component pixels supplied from the horizontal processing direction component pixel extractor 31.

The non-linear smoothing process of the non-linear smoother 32 is described below with reference to a flowchart of FIG. 11.

In step S31, the control signal generator 62 in the non-linear filter 51 calculates the absolute value of difference between the pixel value of the pixel of interest and the pixel value of each of the horizontal processing direction component pixels. As shown in FIG. 9, the control signal generator 62 calculates the absolute values of difference between the pixel value of the pixel of interest and the pixel value of each of the near horizontal processing direction component pixels, namely, |C-L2|, |C-L1|, |C-R1|, and |C-R2|.

In step S32, the low-pass filter 61 compares the absolute value of difference calculated by the control signal generator 62 with the threshold value $\epsilon_2$ set by the threshold value setter 36, and performs a non-linear filtering process on the input video signal $S_1$ based on the comparison result. More specifically, the low-pass filter 61 weight-averages the pixel values of the pixel of interest and the horizontal processing direction component pixels using tap coefficients in accordance with equation (1), and outputs the conversion result C' responsive to the pixel of interest C to the mixer 52 as the smoothed video signal $S_{LPF-H}$. A horizontal processing direction component pixel having the absolute value of difference with respect to the pixel value of the pixel of interest above the threshold value $\epsilon_2$ is replaced with the pixel value of the pixel of interest C before weight averaging (as represented equation (2)).

In step S33, the mix rate detector 53 performs an infinitesimal edge determination process to determine whether there is an infinitesimal edge in the image.

Figure 12:
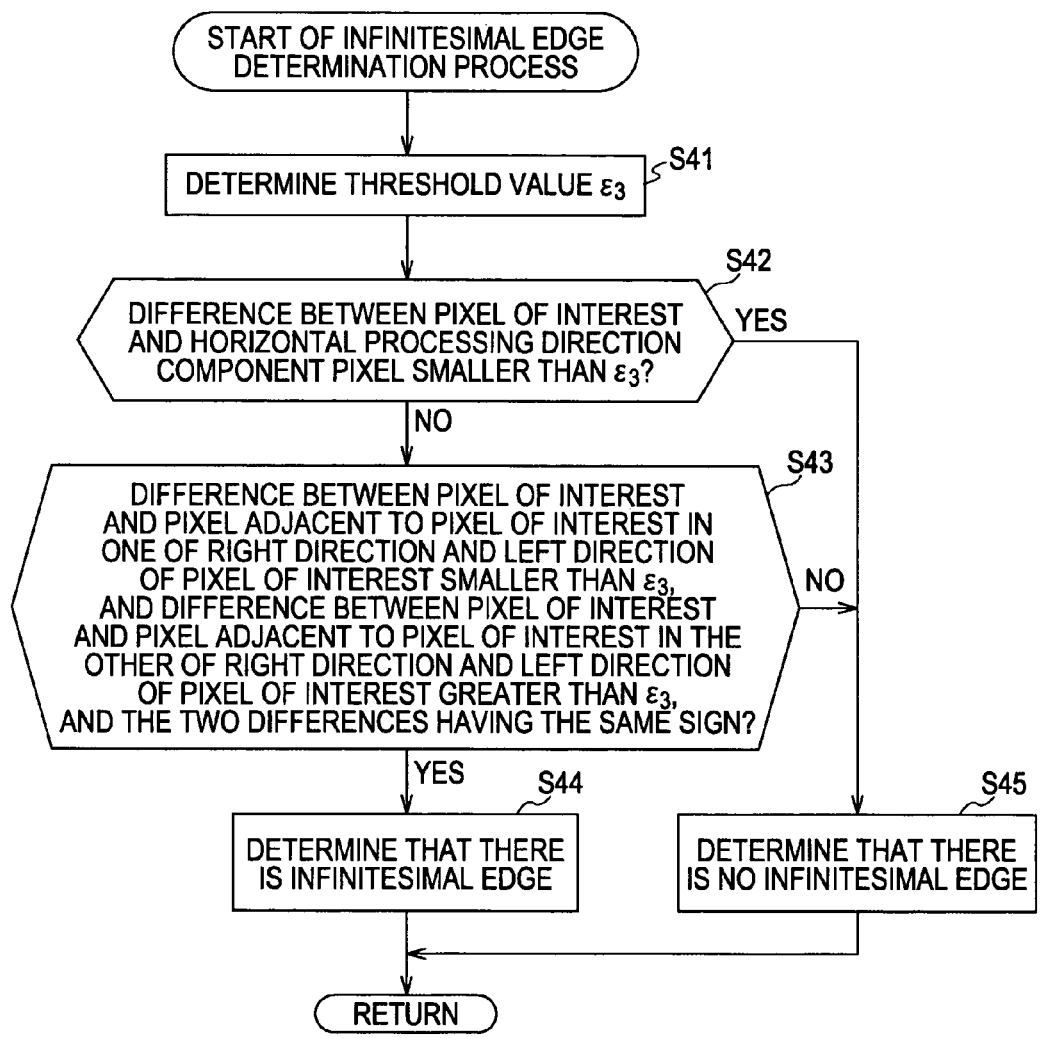
FIG. 12 is a flowchart illustrating an infinitesimal edge determination process of the image enhancement processor of FIG. 2.

The infinitesimal edge determination process is described below with reference to a flowchart of FIG. 12.

In step S41, the mix rate detector 53 detects a threshold value $\epsilon_3$, required to detect the presence of an infinitesimal edge, based on the threshold value $\epsilon_2$ supplied from the low-pass filter 61. More specifically, it is a requirement that the threshold value $\epsilon_3$ be sufficiently smaller than the threshold value $\epsilon_2$ ($\epsilon_3 \ll \epsilon_2$), and for example, the threshold value $\epsilon_3$ may be set by multiplying the threshold value $\epsilon_2$ by a sufficiently small number.

In step S42, the mix rate detector 53 calculates the absolute value of difference between the pixel value of the pixel of interest and the pixel value of each of the horizontal processing direction component pixels, determines whether each of the resulting absolute values of difference is smaller than the threshold value $\epsilon_3$ ($\ll \epsilon_2$), and determines based on the determination whether there is an infinitesimal edge.

As shown in FIG. 9, the mix rate detector 53 calculates the absolute value of difference between the pixel value of the pixel of interest C and the pixel value of each of the horizontal processing direction component pixels L2, L1, R1 and R2, and determines whether each absolute value of difference is smaller than the threshold value $\epsilon_3$. If it is determined that each absolute value of difference is smaller than the threshold value $\epsilon_3$, the mix rate detector 53 determines that there is no change between the pixel value of the pixel of interest and the pixel value of each of the adjacent pixels. Processing proceeds to step S44. The mix rate detector 53 determines that there is no infinitesimal edge in the vicinity of the pixel of interest.

If it is determined in step S42 that any one of the calculated absolute values of difference is greater than the threshold value $\epsilon_3$, processing proceeds to step S43. The mix rate detector 53 determines whether all absolute values of difference between the pixel of interest of the pixel of interest and the pixel value of each of the horizontal processing direction component pixels on one of the left and right sides to the pixel of interest are smaller than the threshold value $\epsilon_3$, whether all absolute values of difference between the pixel value of the pixel of interest and the pixel value of each of the horizontal processing direction component pixels on the other of the left and right sides of the pixel of interest are equal to or greater than the threshold value $\epsilon_3$, and whether differences between the pixel value of the pixel of interest and the pixel value of each of the horizontal processing direction component pixels on the other side of the pixel of interest have the same sign.

The horizontal processing direction component pixels on the one of the left and right sides of the pixel of interest C might be pixels L2 and L1 of FIG. 9, and the horizontal processing direction component pixels on the other of the left and right sides of the pixel of interest C might be pixels R2 and R1 of FIG. 9. The mix rate detector 53 determines whether all absolute values of difference between the pixel value of the pixel of interest C of the pixel of interest and the pixel value of each of the horizontal processing direction component pixels L2 and L1 on the one of the left and right sides of the pixel of interest are smaller than the threshold value $\epsilon_3$, whether all absolute values of difference between the pixel value of the pixel of interest of the pixel of interest C and the pixel value of each of the horizontal processing direction component pixels R1 and R2 on the other of the left and right sides of the pixel of interest are equal to or greater than the threshold value $\epsilon_3$, and whether the differences between the pixel value of the pixel of interest and the pixel value of each of the horizontal processing direction component pixels R1 and $2 on the other side have the same sign.

If the above conditions are determined as being satisfied, the mix rate detector 53 determines in step S44 that there is an infinitesimal edge in the vicinity of the pixel of interest.

If it is determined in step S43 that the above conditions are not satisfied, the mix rate detector 53 determines in step S45 that there is no infinitesimal edge in the vicinity of the pixel of interest.

Figure 13:
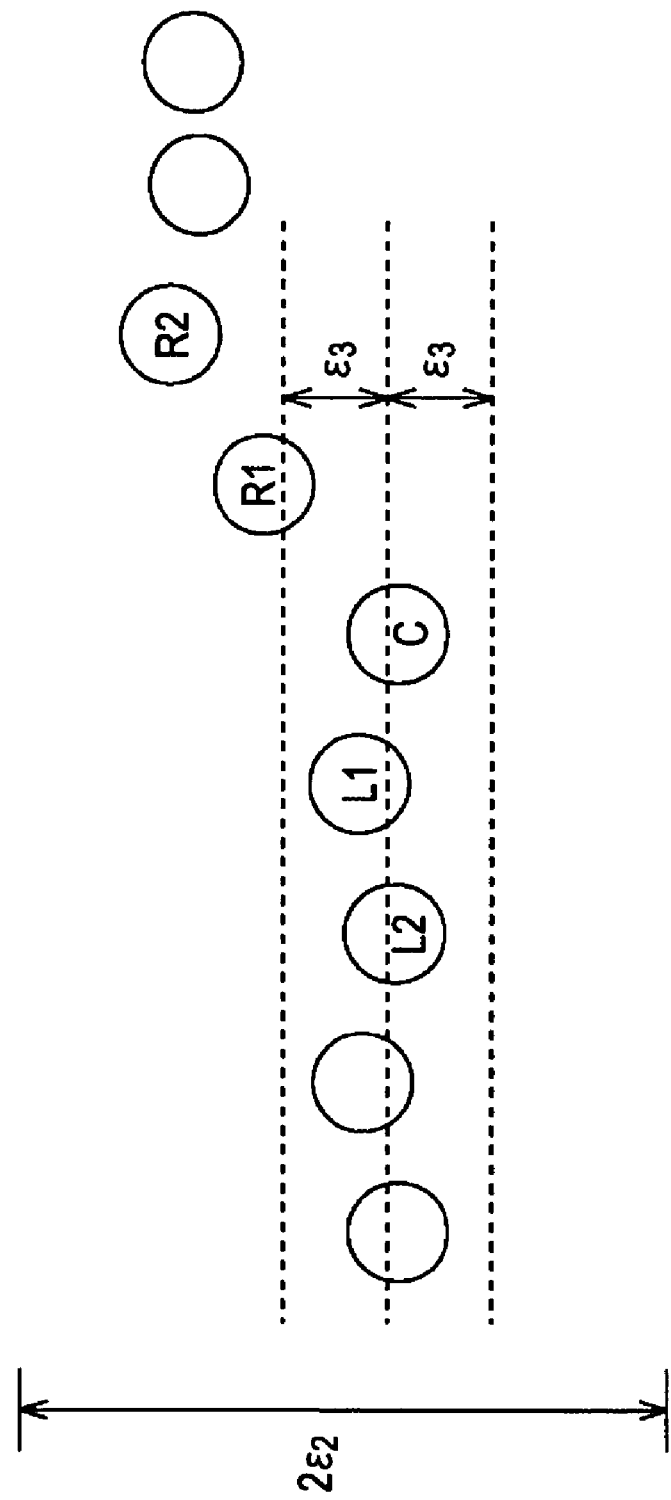
FIG. 13 illustrates the infinitesimal edge determination process of the image enhancement processor of FIG. 2.

FIG. 13 illustrates a pixel of interest C and horizontal processing direction component pixels L2, L1, R1, and R2. Each of the absolute values of difference between the pixel value of each of the horizontal processing direction component pixels L2 and L1 to the left of the pixel of interest C and the pixel value of the pixel of interest C, namely, |L2-C| and |L1-C|, is smaller than the threshold value $\epsilon_3$ and each of the absolute values of difference between the pixel value of each of the horizontal processing direction component pixels R1 and R2 to the right of the pixel of interest C and the pixel value of the pixel of interest C, namely, |R1-C| and |R2-C| is equal to or greater than the threshold value $\epsilon_3$, and the differences between the pixel value of the pixel of interest and the pixel values of the horizontal processing direction component pixels R1 and R2, namely, (R1-C) and (R2-C) agree in sign (currently both are positive). The mix rate detector 53 thus determines that there is an infinitesimal edge in the vicinity of the pixel of interest.

Figure 14:
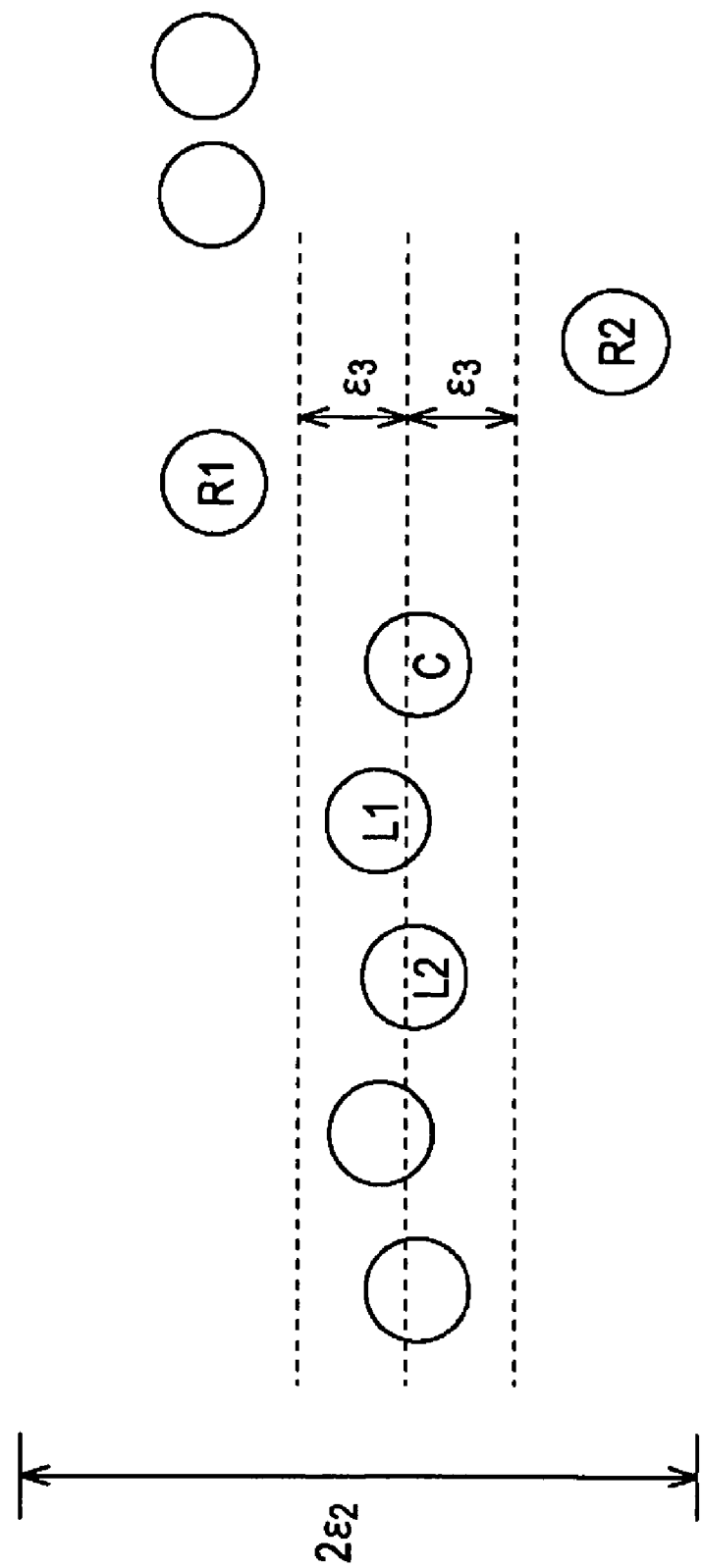
FIG. 14 illustrates the infinitesimal edge determination process of the image enhancement processor of FIG. 2.

FIG. 14 illustrates a pixel of interest C and horizontal processing direction component pixels L2, L1, R1, and R2. Each of the absolute values of difference between the pixel value of each of the horizontal processing direction component pixels L2 and L1 to the left of the pixel of interest C and the pixel value of the pixel of interest C, namely, |L2-C| and |L1-C|, is smaller than the threshold value $\epsilon_3$ and each of the absolute values of difference between the pixel value of each of the horizontal processing direction component pixels R1 and R2 to the right of the pixel of interest C and the pixel value of the pixel of interest C, namely, |R1-C| and |R2-C| is equal to or greater than the threshold value $\epsilon_3$ and the differences between the pixel value of the pixel of interest and the pixel values of the horizontal processing direction component pixels R1 and R2, namely, (R1-C) and (R2-C) fail to agree in sign (currently one is positive and the other is negative). The mix rate detector 53 thus determines that there is no infinitesimal edge in the vicinity of the pixel of interest.

FIG. 15 illustrates a pixel of interest C and horizontal processing direction component pixels L2, L1, R1, and R2. The absolute values of difference of the horizontal processing direction component pixels on both sides of the pixel of interest C with respect to the pixel of interest C are not necessarily smaller than the threshold value $\epsilon_3$. The mix rate detector 53 thus determines that there is no infinitesimal edge in the vicinity of the pixel of interest C.

Figure 11:
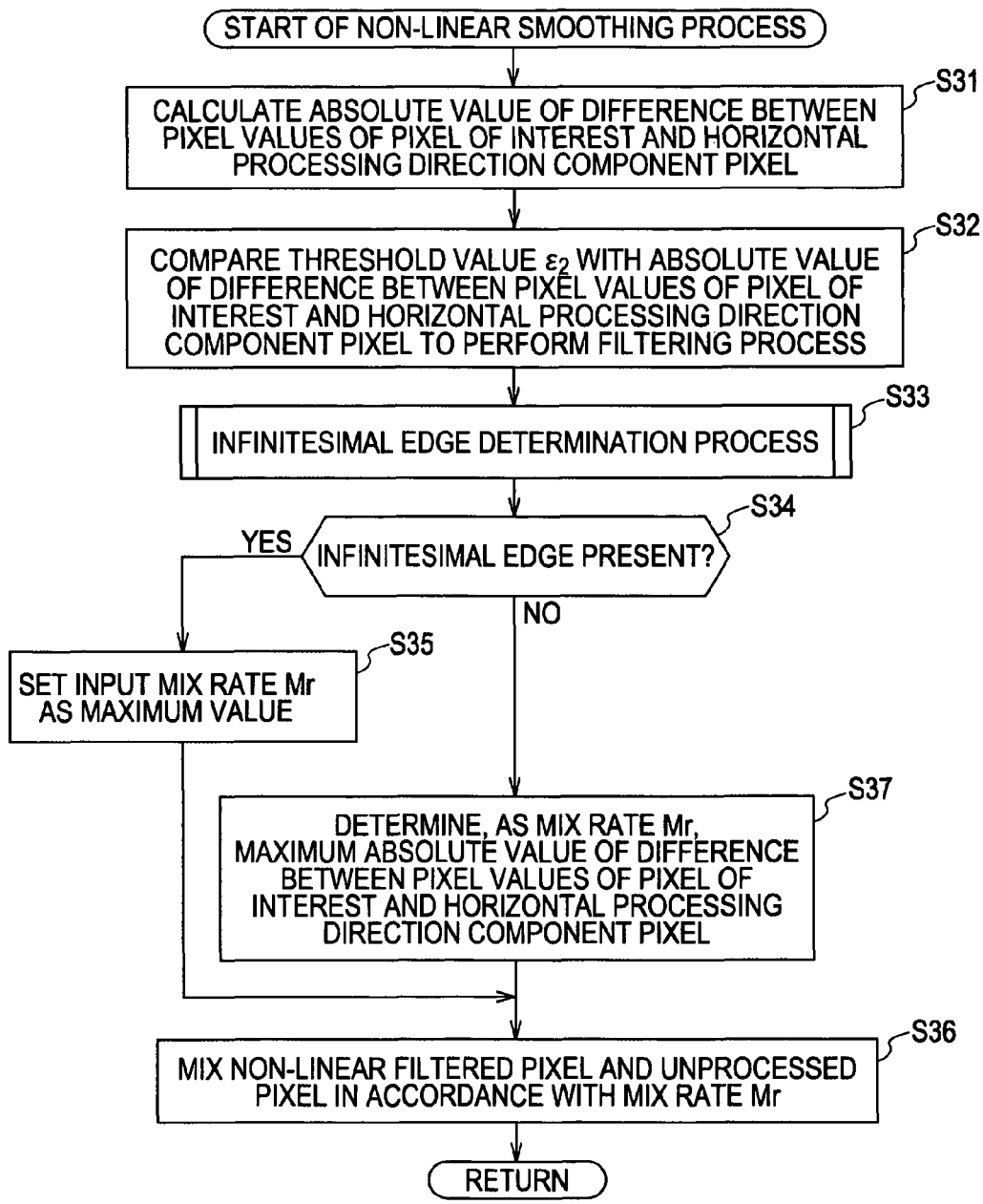
FIG. 11 is a flowchart illustrating a non-linear smoothing process of the image enhancement processor of FIG. 2.

After the determination of whether there is an infinitesimal edge is present in the vicinity of the pixel of interest is performed, processing returns to step S34 of FIG. 11.

Subsequent to step S33, the mix rate detector 53 determines in step S34 whether the determination result in the infinitesimal edge determination process in step S33 is that "there is an infinitesimal edge in the vicinity of the pixel of interest C." If it is determined in step S34 that the determination result in the infinitesimal edge determination process in step S33 is that "there is an infinitesimal edge in the vicinity of the pixel of interest C," the mix rate detector 53 outputs in step S35 a mix rate $Mr_{\_H}$, namely, a mix rate of the horizontally non-linearly smoothed video signal $S_{LPF\_H}$ and the video signal $S_1$ as the maximum mix rate $Mr_{\_Hmax}$ to the mixer 52. The maximum mix rate $Mr_{\_Hmax}$ is a maximum value of the mix rate $Mr_{\_H}$, namely, the absolute value of difference between the maximum value of the dynamic range of the pixel value and the minimum value of the dynamic range of the pixel value.

In step S36, the mixer 52 mixes the input video signal $S_1$ and the video signal $S_{LPF\_H}$ non-linearly smoothed by the non-linear filter 51 in accordance with the mix rate $Mr_{\_H}$ supplied from the mix rate detector 53, and outputs the mixed signal as a non-linearly smoothed video signal $S_{F\_H}$ to the buffer 23. More specifically, the mixer 52 calculates the following equation (3), thereby mixing the input video signal $S_1$ and the video signal $S_{LPF\_H}$ non-linearly smoothed by the non-linear filter:

$$S_{F\_H}=S_1 \times Mr_{\_H}/Mr_{\_Hmax}+S_{LPF\_H} \times (1-Mr_{\_H}/Mr_{\_Hmax}) \quad (3)$$

where $Mr_{\_H}$ is a mix rate, $Mr_{\_Hmax}$ is the maximum value of the mix rate $Mr_{\_H}$, namely, the absolute value of difference between the maximum value of the pixel value and the minimum value of the pixel value.

As represented by equation (3), the larger the mix rate $Mr_{\_H}$, the smaller the weight of the video signal $S_{LPF\_H}$ processed by the non-linear filter 51, and the larger the weight of the input unprocessed video signal $S_1$. Conversely, the smaller the mix rate $Mr_{\_H}$, the larger the weight of the video signal $S_{LPF\_H}$ processed by the non-linear filter 51, and the smaller the weight of the input unprocessed video signal $S_1$.

When an infinitesimal edge is detected, the mix rate $Mr_{\_H}$ becomes the maximum mix rate $Mr_{\_Hmax}$ and the actually input video signal $S_1$ is virtually output as is.

If it is determined in step S34 that there is no infinitesimal edge, the mix rate detector 53 determines in step S37 the absolute value of difference between the pixel value of the pixel of interest and the pixel value of each of the horizontal processing direction component pixels, determines the maximum value of the calculated absolute values of difference as the mix rate $Mr_{\_H}$, and outputs the mix rate $Mr_{\_H}$ to the mixer 52. Processing proceeds to step S36.

As shown in FIG. 9, the mix rate detector 53 calculates each absolute value of difference between the pixel value of the pixel of interest C and the pixel value of each of the horizontal processing direction component pixels L2, L1, R1, and R2, namely, |C-L2|, |C-L1|, |C-R1| and |C-R2|, determines the maximum value of the calculated absolute values of difference as the mix rate $Mr_{\_H}$, and outputs the mix rate $Mr_{\_H}$ to the mixer 52.

If there is no edge, the non-linearly filtered video signal $S_{LPF\_H}$ and the input video signal $S_1$ are mixed in accordance with the maximum value of the absolute values of difference of the horizontal processing direction component pixels with respect to the pixel of interest. The non-linearly smoothed video signal $S_{F\_H}$ is generated. If there is an edge, the input video signal $S_1$ is output as is.

As a result, the non-linear smoother 32 detects an infinitesimal edge in accordance with the threshold value $\epsilon_3$. A portion containing an edge does not undergo the non-linear smoothing process. For a portion containing no edge, a pixel value having undergone the non-linear smoothing process and the input video signal are mixed in accordance with the magnitude of the absolute value of difference. For example, a simple pattern containing an infinitesimal edge is thus free from severe image degradation.

The flowchart of FIG. 8 is described below.

In step S16, the flat rate calculator 35 calculates the absolute value of difference between the pixel value of the pixel of interest and the pixel value of each of the vertical reference direction component pixels adjacent to the pixel of interest in the vertical direction. As shown in FIG. 9, the flat rate calculator 35 calculates the absolute values of difference between the pixel value of the pixel of interest C and the pixel value of each of the vertical reference direction component pixels U2, U1, D1, and D1, namely, |C-U2|, |C-U1|, |C-D1| and |C-D2|.

In step S17, the flat rate calculator 35 determines the maximum value of the absolute values of difference of each of the vertical reference direction component pixels adjacent to the pixel of interest in the vertical direction, and outputs the maximum value as a flat rate $Fr_{\_V}$ to the mixer 33.

In step S18, the mixer 33 mixes the input video signal $S_1$ and the video signal $S_{F\_H}$ non-linearly smoothed by the non-linear smoother 32 in accordance with the flat rate $Fr_{\_V}$ supplied from the flat rate calculator 35, and outputs the mixed result to the buffer 23 as a horizontal direction smooth processed video signal $S_{NL\_H}$. More specifically, the mixer 33 calculates the following equation (4), thereby mixing the input video signal $S_1$ and the video signal $S_{F\_H}$ non-linearly smoothed by the non-linear smoother 32:

$$S_{NL\_H}=S_{F\_H} \times Fr_{\_V}/Fr_{\_Hmax}+S_1 \times (1-Fr_{\_V}/Fr_{\_Vmax}) \quad (4)$$

where $Fr_{\_V}$ is a flat rate in the vertical direction, and $Fr_{\_Vmax}$ is the maximum value of the flat rate $Fr_{\_V}$ in the vertical direction, namely, the absolute value of difference between the maximum value and the minimum value of the dynamic range of the pixel value. Since the flat rate $Fr_{\_V}$ is the maximum value of the absolute values of difference of the vertical reference direction component pixels with respect to the pixel of interest. The smaller the flat rate $Fr_{\_V}$, the smaller the variations in the pixel values of the vertical reference direction component pixels adjacent to the pixel of interest in the vertical direction, and the smaller the visible change in color. As a result, the resulting image is flat. Conversely, the larger the flat rate $Fr_{\_V}$, the larger the variations in the pixel values of the vertical reference direction component pixels adjacent to the pixel of interest in the vertical direction. The resulting image becomes non-flat.

As represented by equation (4), the larger the flat rate $Fr_{\_V}$, the larger the weight of the video signal $S_{F\_H}$ non-linearly smoothed by the non-linear smoother 32, and the smaller the weight of the input unprocessed video signal $S_1$. Conversely, the smaller the flat rate $Fr_{\_V}$, in other words, the smaller the absolute value of difference of each of the pixels in the vertical direction with respect to the pixel of interest, the smaller the weight of the video signal $S_{F\_H}$ non-linearly smoothed by the non-linear smoother 32, and the larger the weight of the input unprocessed video signal $S_1$.

In step S19, the horizontal processing direction component pixel extractor 31 determines whether all pixels have been processed as the pixel of interest, namely, whether unprocessed pixels are present. If it is determined in step S19 that not all pixels are processed as the pixel of interest, namely, that unprocessed pixels are present, processing returns to step S11. If it is determined in step S19 that all pixels have been processed, namely, that no unprocessed pixels are present, processing ends. The process in step S1 of FIG. 7 is thus completed. Similarly, the vertical reference direction component pixel extractor 34 determines whether all pixels have been processed, namely, that unprocessed pixels are present. The process in step S1 of FIG. 7 may be completed when both the horizontal processing direction component pixel extractor 31 and the vertical reference direction component pixel extractor 34 determine that no unprocessed pixels are present.

The flat rate $Fr_{\_V}$ is determined from the absolute value of difference between the pixel value of the pixel of interest and the pixel value of each of the vertical reference direction component pixels adjacent to the pixel of interest in the vertical direction. The horizontally non-linearly smoothed video signal $S_{F-H}$ and the input video signal $S_1$ are mixed in accordance with the flat rate $Fr_{\_V}$. If vertical correlation is strong, in other words, if the vertical flat rate $Fr_{\_V}$ is small, the weight of the input video signal $S_1$ is increased. If the vertical flat rate $Fr_{\_V}$ is large with a weak vertical correlation, the weight of the horizontally non-linearly filtered video signal $S_{F-H}$ is increased. With the edge taken into consideration, unnatural processing in the processing direction (depending on whether the adjacent pixels used in the non-linear smoothing process is the one vertically adjacent to the pixel of interest or horizontally adjacent to the pixel of interest) is controlled.

In the above discussion, the pixel value is directly multiplied by the flat rate $Fr_{\_V}$ as a weight in the mixing operation. Alternatively, the mixing operation is performed by multiplying each of the non-linearly filtered video signal $S_{F-H}$ and the input video signal $S_1$ by respective weights responsive to other flat rate. For example, as shown in FIG. 16, the mixing operation may be performed using weight coefficients $W_1$ and $W_2$ set in response to the flat rate $Fr_{\_V}$ in accordance with equation (5)

$$S_{NL-H} = S_1 \times W_1 + S_{F-H} \times W_2 \qquad (5)$$

where $W_2$ is the weight coefficient of the horizontally non-linearly filtered video signal $S_{F-H}$, and $W_1$ is the weight coefficient of the input video signal $S_1$. Herein, $(W_1+W_2)$ is a maximum value $W_{max}(=1)$ of the weight coefficients.

As shown in FIG. 16, the weight coefficient $W_1$ is the maximum weight coefficient $W_{max}$ within a range of the flat rate $Fr_{\_H}$ being smaller than Fr1 ($Fr_{\_H}$<Fr1) while the weight coefficient $W_2$ is zero. When the flat rate $Fr_{\_V}$ falls within a range equal to or greater than Fr1 and equal to or smaller than Fr2 (Fr1≦$Fr_{\_V}$≦Fr2), the weight coefficient $W_1$ decreases in proportion to the flat rate $Fr_{\_V}$ while the weight coefficient $W_2$ increases in proportion to the flat rate $Fr_{\_V}$, and $(W_1+W_2)$ is set to be the maximum value $W_{max}(=1)$. When the flat rate $Fr_{\_V}$ falls within a range equal to or greater than Fr2 (Fr2≦$Fr_{\_V}$), the weight coefficient $W_1$ is zero while the weight coefficient $W_2$ is the maximum value $W_{max}$.

Images can thus be non-linearly smoothed with the presence or absence of an edge being accurately considered. If Fr1=Fr2, the signal to be output is to be switched between the input video signal $S_1$ and the non-linearly smoothed video signal $S_{F-H}$ in response to Fr1 (=Fr2) as the threshold value.

Figure 1A:
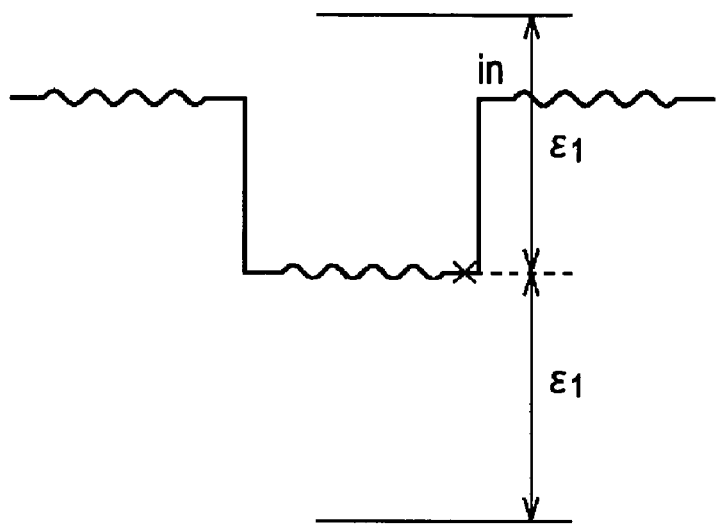
FIGS. 1A-1C illustrate a drawback of an $\epsilon$ filter.
Figure 1B:
Figure 17A:
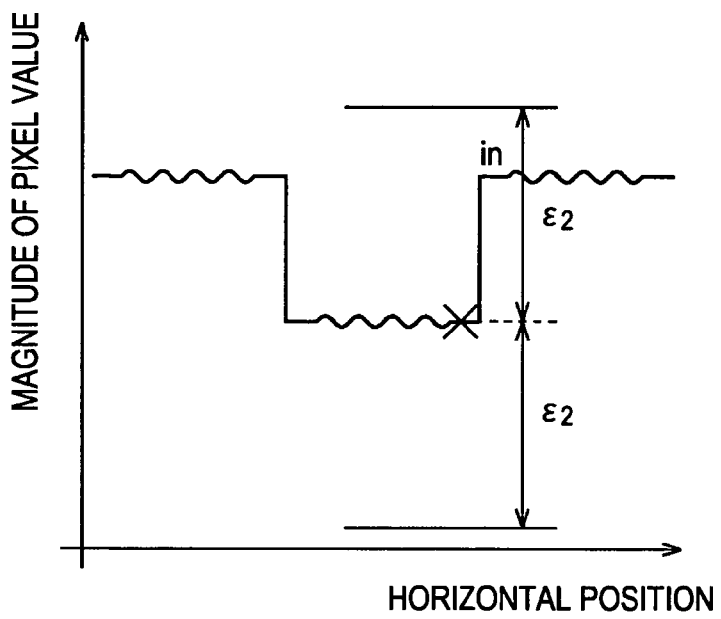
FIGS. 17A and 17B illustrate the effect of the smoothing process of the threshold value set by the threshold value setter of FIG. 6.
Figure 17B:
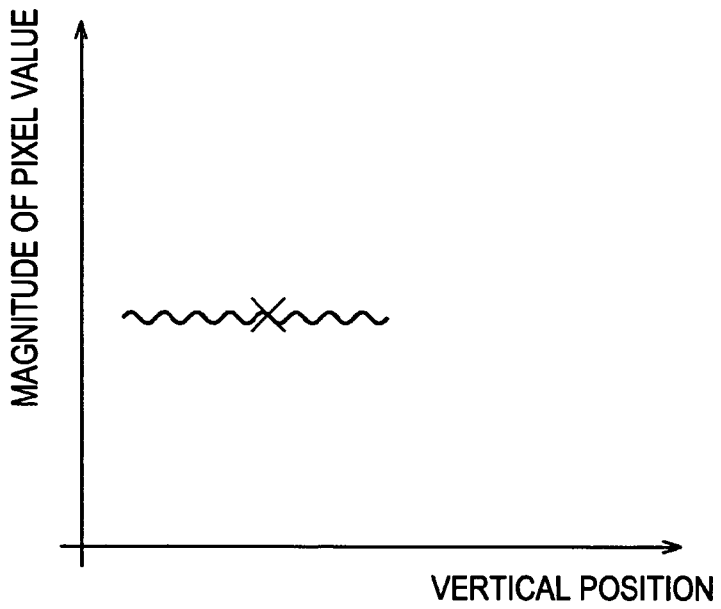
Figure 18A:
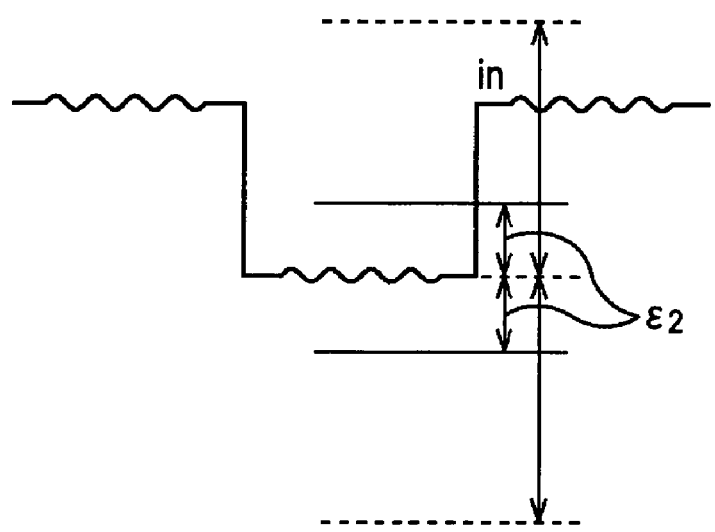
FIGS. 18A and 18B illustrate the effect of the smoothing process of the threshold value set by the threshold value setter of FIG. 6.
Figure 18B:
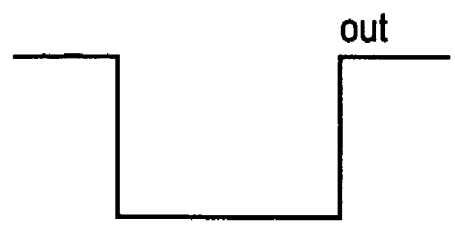

The process in step S14 of FIG. 8 has been discussed. With the threshold value set, a rectangular wave shown in FIG. 17A takes place, for example. The letter x represents a pixel of interest and the threshold value $\epsilon_2$ is set in the waveform of the vertical reference direction component pixels as shown in FIG. 17B, thereby causing a threshold value $\epsilon_2$ to be set as shown in FIG. 18A. This arrangement prevents the threshold value $\epsilon_2$ from being set in a range exceeding the change in the rectangular wave constructed of pixel values as shown in FIG. 1B. As a result, an amplitude component only is smoothed while the rectangular waveform is maintained as shown in FIG. 18B.

Figure 7:
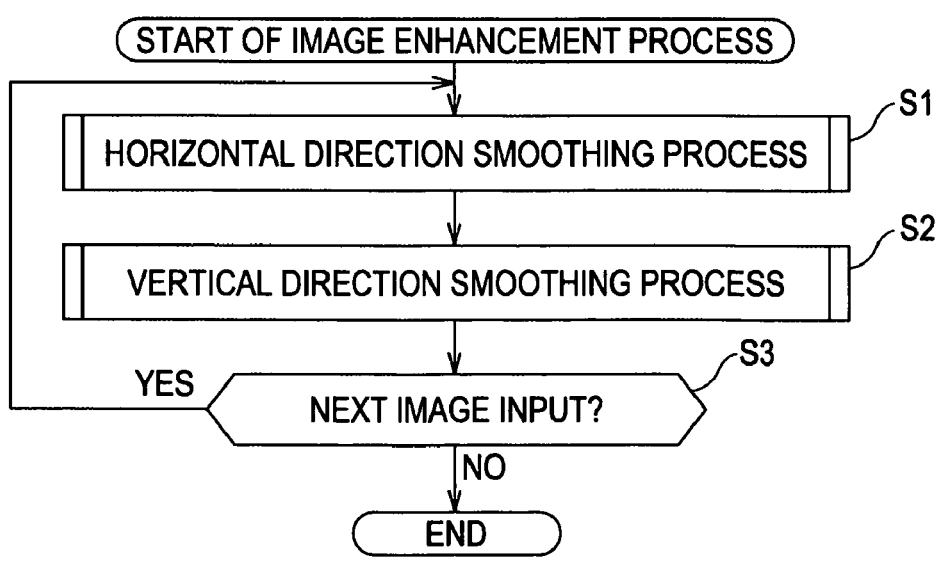
FIG. 7 is a flowchart illustrating an image enhancement process.

Returning to the flowchart of FIG. 7, in step S1, the horizontal direction smoother 22 causes the buffer 23 to successively store the horizontally smoothed video signal $S_{NL-H}$.

Figure 19:
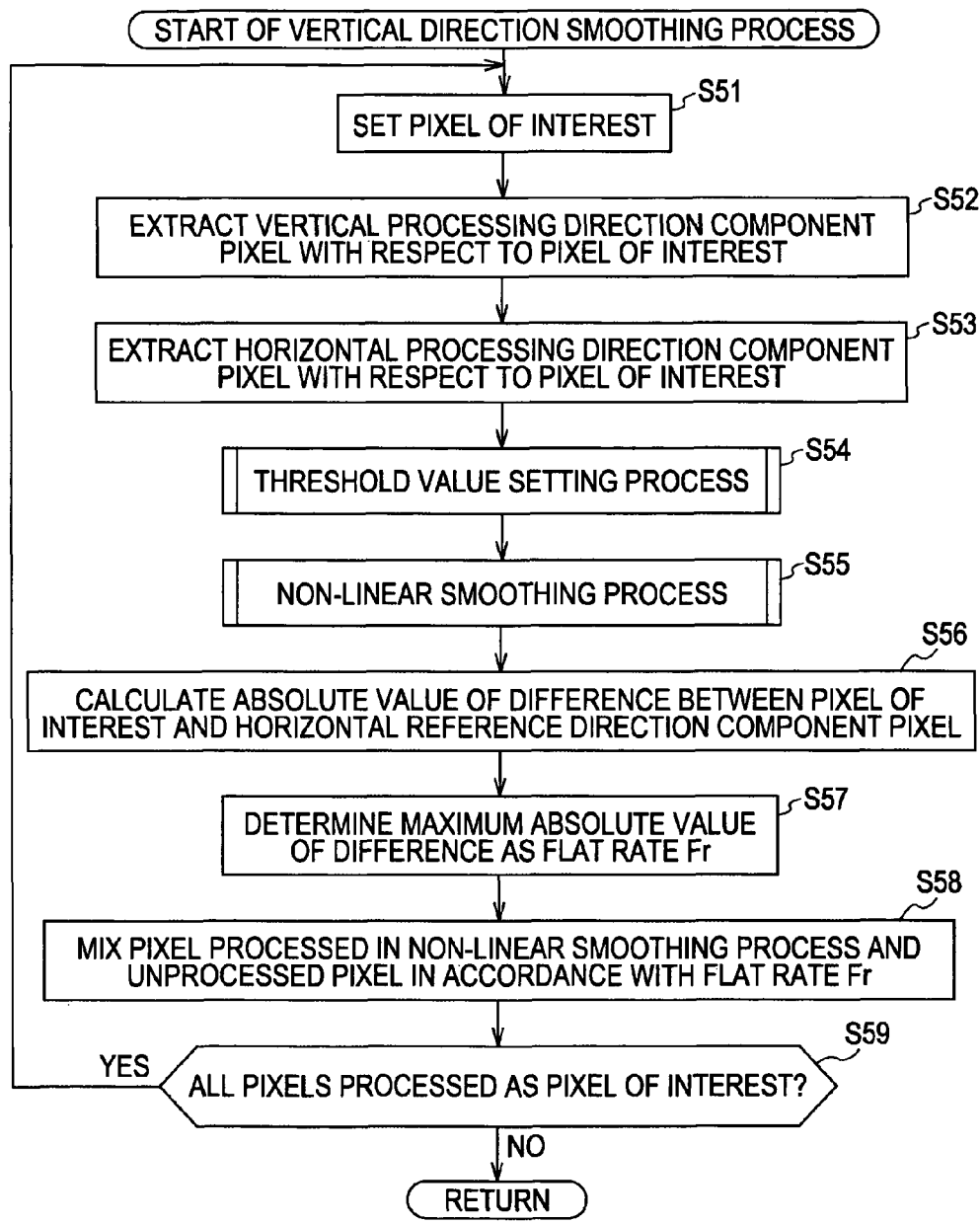
FIG. 19 illustrates a vertical direction smoothing process of the image enhancement processor of FIG. 2.

In step S2, the vertical direction smoother 24 performs a vertical direction smoothing process using successively the horizontally smoothed video signal $S_{NL-H}$ stored on the buffer 23. With reference to a flowchart of FIG. 19, the vertical direction smoothing process is described below. The vertical direction smoothing process is similar to the horizontal direction smoothing process except that processing in the vertical direction is performed instead of processing in the horizontal direction. The threshold value setting process in the vertical direction smoothing process is also identical to the threshold value setting process in the horizontal direction smoothing process except that pixels horizontally adjacent to the pixel of interest are used instead of the pixels vertically adjacent to the pixel of interest.

In step S51, the vertical processing direction component pixel extractor 41 in the vertical direction smoother 24 sets a pixel of interest in the order of raster scanning sequence. The horizontal reference direction component pixel extractor 44 also sets the pixel of interest in the order of raster scanning. The order of setting the pixel of interest may be any other manner than the raster scanning sequence. But it is important that the pixel of interest set by the vertical processing direction component pixel extractor 41 be the same as the pixel of interest set by the horizontal reference direction component pixel extractor 44.

In step S52, the vertical processing direction component pixel extractor 41 extracts a total of five pixels from the buffer 23, including the pixel of interest and the adjacent vertical processing direction component pixels, namely, the two pixels above and the two pixels below the pixel of interest in the vertical direction, and outputs the extracted pixels to the non-linear smoother 42. For example, as shown in FIG. 9, pixels U2, U1, C, D1 and D2 are extracted as the vertical processing direction component pixels and the pixel of interest.

In step S53, the horizontal reference direction component pixel extractor 44 extracts a total of five pixels from the buffer 23, including the pixel of interest and the adjacent horizontal processing direction component pixels, namely, the two pixels to the right of and the two pixels to the left of the pixel of interest in the horizontal direction and supplies the extracted pixels to the flat rate calculator 45. For example, as shown in FIG. 9, pixels L2, L1, C, R1 and R2 are extracted as the pixel of interest and the horizontal reference direction component pixels.

In step S54, the threshold value setter 46 performs the threshold value setting process.

In step S55, the non-linear smoother 42 performs the non-linear smoothing process on the pixel of interest based on the pixel of interest and the vertical processing direction component pixels supplied from the vertical processing direction component pixel extractor 41. The non-linear smoothing process in step S55 is identical to the non-linear smoothing process in step S15 of FIG. 8 except that the relationship between the horizontal direction and the vertical direction is reversed, and the discussion thereof is omitted herein. The non-linear smoother 42 outputs the vertically non-linearly smoothed video signal $S_{F\text{-}V}$ to the mixer 43.

In step S56, the flat rate calculator 45 calculates the absolute value of difference between the pixel value of the pixel of interest and the pixel value of each of the horizontal reference direction component pixels adjacent to the pixel of interest in the horizontal direction. As shown in FIG. 9, the flat rate calculator 45 calculates each absolute value of difference between the pixel value of the pixel of interest C and the pixel value of each of the horizontal reference direction component pixels L2, L1, R1 and R2 adjacent to the pixel of interest in the horizontal direction, namely, calculates |C-L2|, |C-L1|, |C-R1|, and |C-R2|.

In step S57, the flat rate calculator 45 determines the maximum value of the absolute values of difference of the horizontal reference direction component pixels adjacent to the pixel of interest in the horizontal direction with respect to the pixel of interest, and then outputs the maximum value of the absolute values of difference to the mixer 43 as a flat rate $Fr_{\text{-}H}$.

In step S58, the mixer 43 mixes the horizontally non-linearly smoothed video signal $S_{NL\text{-}H}$ input from the horizontal direction smoother 22 and the non-linearly smoothed video signal $S_{F\text{-}V}$ from the non-linear smoother 42 in accordance with the flat rate $Fr_{\text{-}H}$ supplied from the flat rate calculator 45. The mixer 43 then outputs to the buffer 25 a video signal $S_o$ smoothed using the adjacent pixels in the vertical direction. More specifically, the mixer 43 mixes the input horizontally non-linearly smoothed video signal $S_{NL\text{-}H}$ and the video signal $S_{F\text{-}V}$ vertically non-linearly smoothed by the non-linear smoother 42 by calculating the following equation (6):

$$S_o = S_{F\text{-}V} \times Fr_{\text{-}H}/Fr_{\text{-}Hmax} + S_{NL\text{-}H} \times (1 - Fr_{\text{-}H}/Fr_{\text{-}Hmax}) \quad (6)$$

wherein $Fr_{\text{-}H}$ is a horizontal flat rate, and $Fr_{\text{-}Hmax}$ is the maximum value of the flat rate $Fr_{\text{-}H}$, namely, the absolute value of difference between the maximum value and the minimum value of the dynamic range of the pixel value. Since the flat rate $Fr_{\text{-}H}$ is the maximum value of the absolute values of difference of each of the horizontal reference direction component pixels adjacent to the pixel of interest in the horizontal direction with respect to the pixel of interest, the smaller the flat rate $Fr_{\text{-}H}$, the smaller the change in the pixel values of the adjacent pixels adjacent to the pixel of interest, and the smaller the visible change in color. As a result, the resulting image is flat. Conversely, the larger the flat rate $Fr_{\text{-}H}$, the larger the variations in the pixel values of the horizontal reference direction component pixels adjacent to the pixel of interest in the vertical direction. The resulting image becomes non-flat.

As represented by equation (6), the larger the flat rate $Fr_{\text{-}H}$, the larger the weight of the video signal $S_{F\text{-}V}$ vertically non-linearly smoothed by the non-linear smoother 42, and the smaller the weight of the horizontally smoothed video signal $S_{NL\text{-}H}$. Conversely, the smaller the flat rate $Fr_{\text{-}H}$, in other words, the smaller the absolute value of difference of each of the pixels in the horizontal direction with respect to the pixel of interest, the smaller the weight of the video signal $S_{F\text{-}V}$ non-linearly smoothed by the non-linear smoother 32, and the larger the weight of the input horizontally non-linearly smoothed signal $S_{NL\text{-}H}$.

In step S59, the vertical processing direction component pixel extractor 41 determines whether all pixels have been processed as the pixel of interest, namely, whether unprocessed pixels are present. If it is determined in step S59 that not all pixels are processed as the pixel of interest, namely, that unprocessed pixels are present, processing returns to step S51. If it is determined in step S59 that all pixels have been processed, namely, that no unprocessed pixels are present, processing ends. The process in step S2 of FIG. 7 is thus completed. Similarly, the horizontal reference direction component pixel extractor 44 determines whether all pixels have been processed, namely, that unprocessed pixels are present. The process in step S2 of FIG. 7 may be completed when both the vertical processing direction component pixel extractor 41 and the horizontal reference direction component pixel extractor 44 determine that no unprocessed pixels are present.

The flat rate $Fr_{\text{-}H}$ is determined from the absolute value of difference between the pixel value of the pixel of interest and the pixel value of each of the horizontal reference direction component pixels adjacent to the pixel of interest in the horizontal direction. The vertically smoothed video signal $S_{F\text{-}V}$ and the input video signal $S_{NL\text{-}H}$ are mixed in accordance with the flat rate $Fr_{\text{-}H}$. If horizontal correlation is strong, in other words, if the horizontal flat rate $Fr_{\text{-}H}$ is small, the weight of the input horizontally non-linearly smoothed video signal $S_{NL\text{-}H}$ is increased. If the horizontal flat rate $Fr_{\text{-}H}$ is large with a weak vertical correlation, the weight of the vertically non-linearly filtered video signal $S_{F\text{-}V}$ is increased. With the edge taken into consideration, unnatural processing is controlled in the processing direction (depending on whether the adjacent pixels used in the non-linear smoothing process is the one vertically adjacent to the pixel of interest or horizontally adjacent to the pixel of interest).

In the above discussion, the pixel value is directly multiplied by the flat rate $Fr_{\text{-}H}$ as a weight in the mixing operation. Alternatively, the mixing operation is performed by multiplying each of the smoothed video signal $S_{F\text{-}V}$ and the input horizontally smoothed video signal $S_{NL\text{-}H}$ by respective weights responsive to other flat rates $Fr_{\text{-}H}$. For example, as shown in FIG. 16, the mixing operation may be performed using weight coefficients $W_1$ and $W_2$ set in response to the flat rate $Fr_{\text{-}H}$ in accordance with equation (7)

$$S_o = S_{NL\text{-}H} \times W_{11} + S_{F\text{-}V} \times W_{12} \quad (7)$$

where $W_{12}$ is the weight coefficient of the vertically smoothed video signal $S_{F\text{-}V}$, and $W_{11}$ is the weight coefficient of the input horizontally smoothed video signal $S_{NL\text{-}H}$. Herein, $(W_{11}+W_{12})$ is a maximum value $W_{max}(=1)$ of the weight coefficients.

The image generated with the presence or absence of an edge taken into consideration is non-linearly smoothed.

Returning to the flowchart of FIG. 7, the vertical direction smoothing process is performed in step S2. In step S3, it is determined whether a next image has been input. If it is determined in step S3 that a next image has been input, processing returns to step S1 to repeat step S1 and subsequent steps. If it is determined in step S3 that no next image has been input, namely, if it is determined that processing of the video signal is completed, processing ends.

Through the above-referenced horizontal direction smoothing process and the vertical direction smoothing process, the flat rate is determined, and the video signal non-linearly smoothed and the video signal not non-linearly smoothed are mixed in accordance with the determined flat rate. With the edge of the image preserved, the contrast and the sharpness of the area other than the edge are enhanced in a manner free from the effect of unnatural enhancement in the processing direction.

Figure 1C:
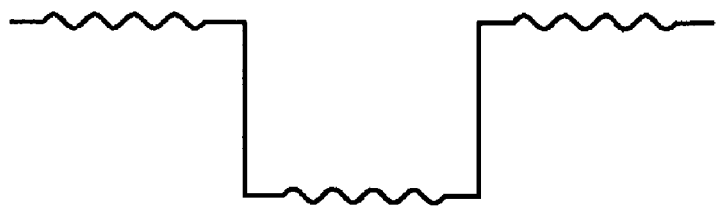

Since the threshold value $\epsilon_2$ for use in the non-linear smoothing process is set using pixels vertical to the processing direction (reference direction pixels), the amplitude component only can be enhanced with the structural component left intact. The apparatus is free from the problems such as destruction of the rectangular shape, unsuccessful enhancement process, discussed with reference to FIGS. 1A-1C. Contrast and sharpness in the area other than the edge are thus enhanced.

In the threshold value setting process, the maximum value of the absolute values of difference between the pixel of interest and each reference direction pixel is set to be the threshold value $\epsilon_2$. The present invention is not limited to this method of determining the threshold value $\epsilon_2$. For example, the maximum value and the minimum value of the pixel of interest and the reference direction component pixels are determined, and the absolute value of difference between the maximum value and the minimum value may be set to be the threshold value $\epsilon_2$.

Figure 20:
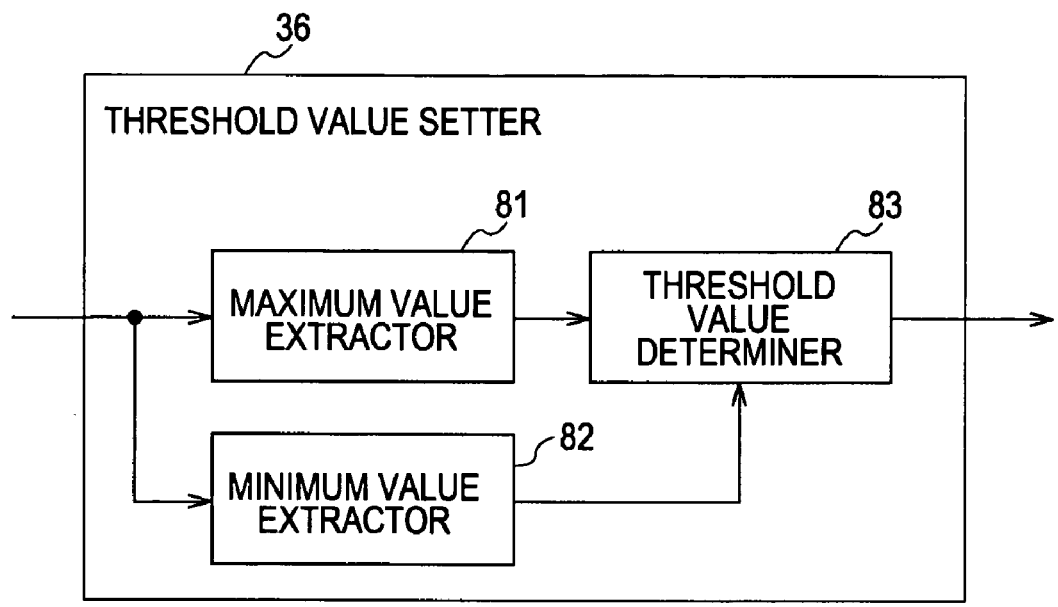
FIG. 20 is a block diagram illustrating a modification of the threshold setter of FIG. 3.

FIG. 20 illustrates the threshold value setter 36 that sets as the threshold value $\epsilon_2$ the absolute value of difference between the maximum value and the minimum value of the pixel of interest and the vertical reference direction component pixels.

A maximum value extractor 81 extracts a pixel having the maximum pixel value from among the pixel of interest and the vertical reference direction component pixels, and then supplies the maximum pixel value to a threshold value determiner 83.

A minimum value extractor 82 extracts a pixel having the minimum pixel value from among the pixel of interest and the vertical reference direction component pixels and then supplies the minimum pixel value to the threshold value determiner 83.

The threshold value determiner 83 determines the absolute value of difference between the maximum pixel value of the pixel from among the pixel of interest and the vertical reference direction component pixels supplied from the maximum value extractor 81 and the minimum pixel value of the pixel from among the pixel of interest and the vertical reference direction component pixels supplied from the minimum value extractor 82. The threshold value determiner 83 adds a margin to the absolute value of difference, sets the sum as the threshold value $\epsilon_2$, and then supplies the threshold value $\epsilon_2$ to the non-linear smoother 32.

Figure 21:
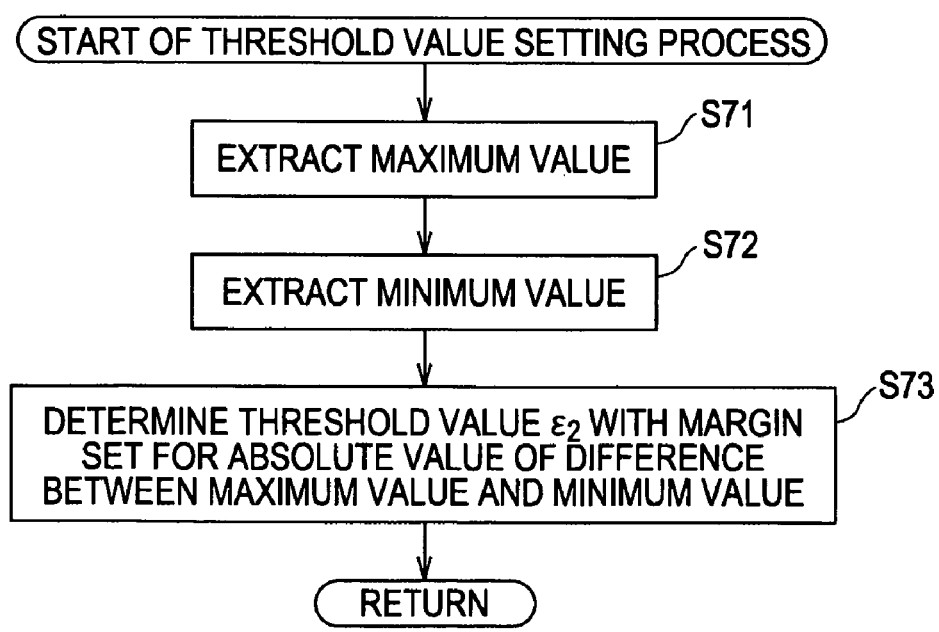
FIG. 21 is a flowchart illustrating a threshold value setting process of the threshold value setter of FIG. 20.

The threshold value setting process of the threshold value setter 36 of FIG. 20 is described below with reference to a flowchart of FIG. 21.

In step S71, the maximum value extractor 81 extracts the pixel having the maximum pixel value from among the pixel of interest and the vertical reference direction component pixels, and then supplies the maximum value to the threshold value determiner 83. As shown in FIG. 9, the pixel of interest and the vertical reference direction component pixels are pixels U2, U1, C, D1 and D2. The maximum value extractor 81 extracts the pixel having the maximum pixel value from among the pixels U2, U1, C, D1 and D2 and supplies the maximum pixel value of that pixel to the threshold value determiner 83.

In step S72, the minimum value extractor 82 extracts the pixel having the minimum pixel value from among the pixel of interest and the vertical reference direction component pixels, and supplies the minimum pixel value to the threshold value determiner 83. As shown in FIG. 9, the pixel of interest and the vertical reference direction component pixels are pixels U2, U1, C, C1 and D2. The minimum value extractor 82 extracts any pixel having the minimum pixel value from among the pixels U2, U1, C, C1 and D2 and supplies the minimum pixel value to the threshold value determiner 83.

In step S73, the threshold value determiner 83 determines the absolute value of difference between the maximum pixel value of the pixel of interest and the vertical reference direction component pixels supplied from the maximum value extractor 81 and the minimum pixel value of the pixel of interest and the vertical reference direction component pixels supplied from the minimum value extractor 82. The threshold value determiner 83 adds the margin to the absolute value of difference, sets the sum to be the threshold value $\epsilon_2$, and supplies the threshold value $\epsilon_2$ to the non-linear smoother 32.

Since the threshold value $\epsilon_2$ is determined from the absolute value of difference between the maximum value and the minimum value of the pixel of interest and the vertical reference direction component pixels, the amplitude component is smoothed while the structural component is maintained. The threshold value setter 46 is identical in operation to the threshold value setter 36 except that the pixel of interest and the vertical reference direction component are replaced with the pixel of interest and the horizontal reference direction component pixels, and the discussion of the operation thereof is thus omitted herein.

In the above discussion, the threshold value $\epsilon_2$ is determined based on the absolute value of difference between the maximum value and the minimum value of the pixel of interest and the vertical reference direction component pixels. Alternatively, from among the pixel of interest and the reference direction component pixels, the threshold value $\epsilon_2$ may be set by adopting one of the two absolute values of difference between the maximum pixel value and the minimum pixel value of pixels on two sides of the pixel of interest, whichever is smaller.

Figure 22:
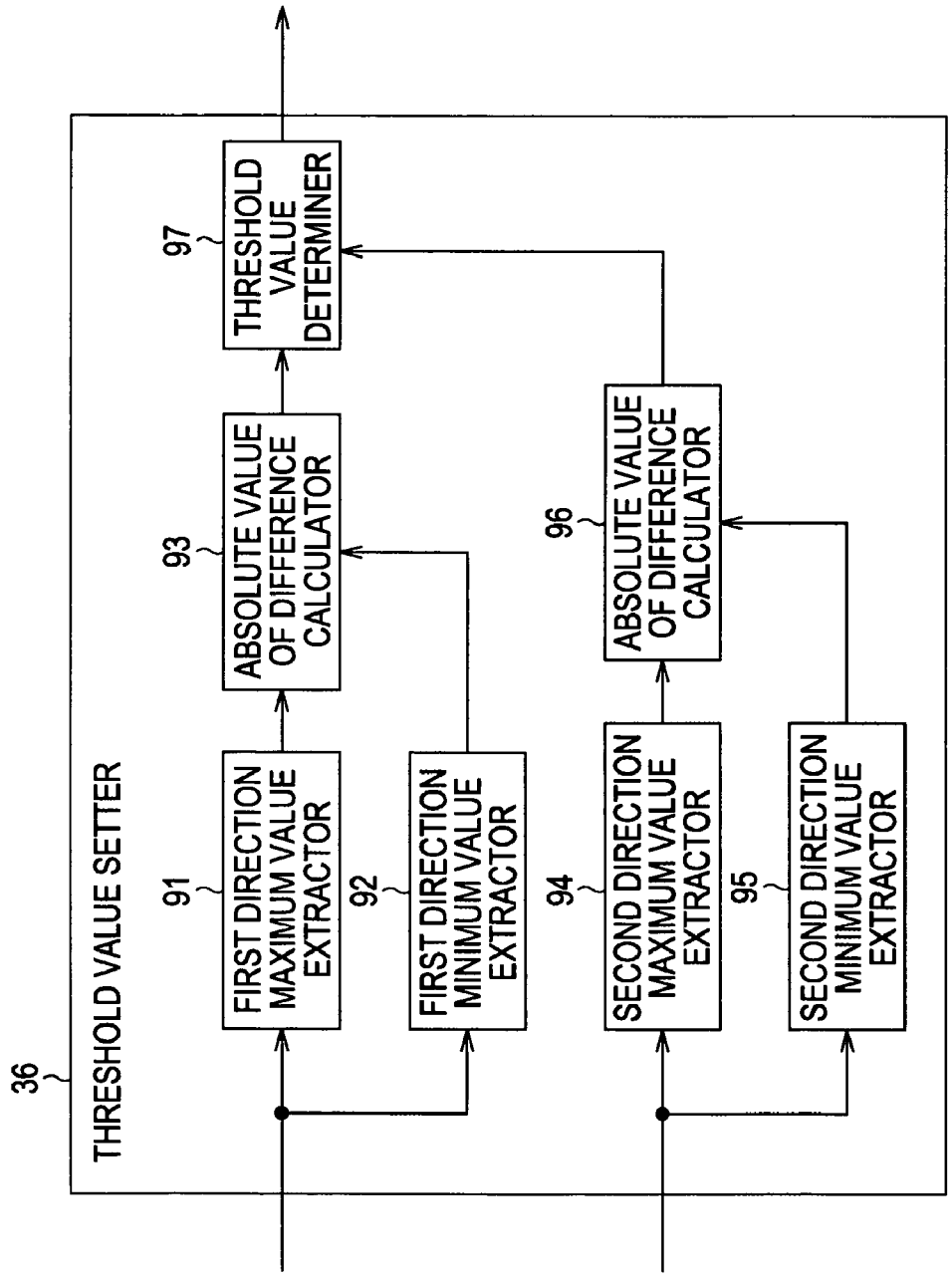
FIG. 22 is a block diagram illustrating another modification of the threshold value setter of FIG. 3.

FIG. 22 illustrates the threshold value setter 36 that determines, as the threshold value $\epsilon_2$, one of the two absolute values of difference between the maximum pixel value and the minimum pixel value of pixels on two sides of the pixel of interest, whichever is smaller.

A first direction maximum value extractor 91 extracts the maximum value of the pixel values of the pixel of interest and the vertical reference direction component pixels adjacent to and above the pixel of interest in an upward direction, from among the pixel of interest and the vertical reference direction component pixels, and supplies the maximum pixel value to the absolute value of difference calculator 93. As shown in FIG. 22, the first direction refers to an upward direction from the pixel of interest and the second direction refers to a downward direction from the pixel of interest.

A first direction minimum value extractor 92 extracts the minimum value of the pixel values of the pixel of interest and the vertical reference direction component pixels adjacent to and above the pixel of interest in the upward direction, from among the pixel of interest and the vertical reference direction component pixels, and supplies the minimum value to the absolute value of difference calculator 93.

A second direction maximum value extractor 94 extracts the maximum value of the pixel values of the pixel of interest and the vertical reference direction component pixels adjacent to and below the pixel of interest in the downward direction, from among the pixel of interest and the vertical reference direction component pixels, and supplies the maximum value to an absolute value of difference calculator 96.

A second direction minimum value extractor 95 extracts the minimum value of the pixel values of the pixel of interest and the vertical reference direction component pixels adjacent to and below the pixel of interest in the downward direction, from among the pixel of interest and the vertical reference direction component pixels, and supplies the minimum value to the absolute value of difference calculator 96.

The absolute value of difference calculator 93 calculates the absolute value of difference between the maximum value of the pixel values of the pixel of interest and the vertical reference direction component pixels above the pixel of interest supplied from the first direction maximum value extractor 91 and the minimum value of the pixel values of the pixel of interest and the vertical reference direction component pixels above the pixel of interest, and supplies the absolute value of difference to a threshold value determiner 97.

The absolute value of difference calculator 96 calculates the absolute value of difference between the maximum value of the pixel values of the pixel of interest and the vertical reference direction component pixels below the pixel of interest supplied from the second direction maximum value extractor 94 and the minimum value of the pixel values of the pixel of interest and the vertical reference direction component pixels below the pixel of interest supplied from the second direction minimum value extractor 95, and supplies the absolute value of difference to the threshold value determiner 97.

The threshold value determiner 97 adds a margin to one of the two absolute values of difference respectively supplied from the absolute value of difference calculators 93 and 96 to be the threshold value $\epsilon_2$, and supplies the threshold value $\epsilon_2$ to the non-linear smoother 32.

Figure 23:
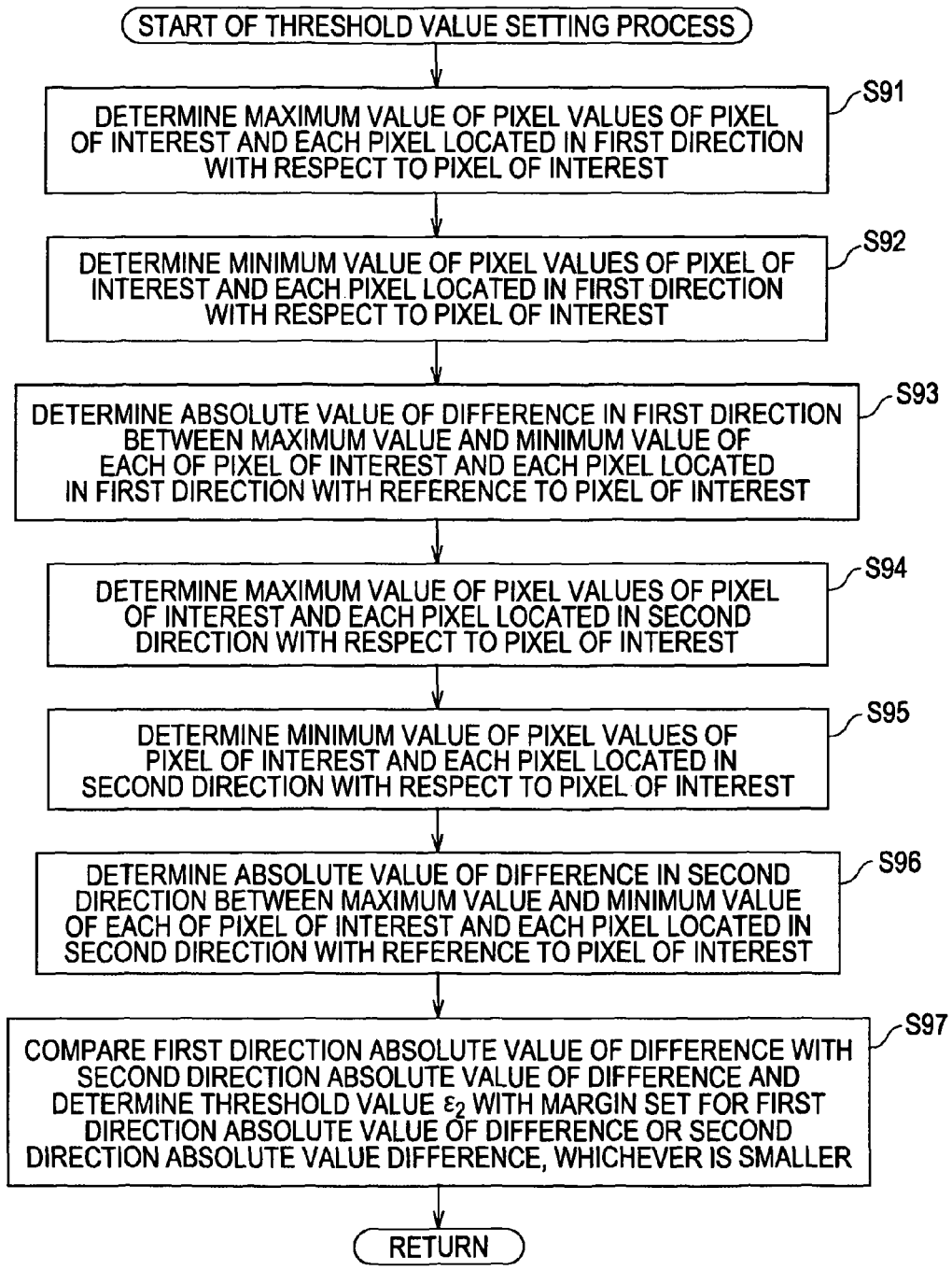
FIG. 23 is a flowchart illustrating a threshold value setting process of the threshold value setter of FIG. 22.

The threshold value setting process of the threshold value setter 36 of FIG. 22 is described below with reference to a flowchart of FIG. 23.

In step S91, the first direction maximum value extractor 91 extracts the maximum value of the pixel values of the pixel of interest and the vertical reference direction component pixels adjacent to and above the pixel of interest in the upward direction, from among the pixel of interest and the vertical reference direction component pixels, and supplies the maximum value to the absolute value of difference calculator 93. As shown in FIG. 9, the first direction maximum value extractor 91 extracts the pixel of interest C and the vertical reference direction component pixels adjacent to and above the pixel of interest, U2 and U1, and supplies the maximum value of the pixels C, U1, and U2 to the absolute value of difference calculator 93.

In step S92, the first direction minimum value extractor 92 extracts the minimum value of the pixel values of the pixel of interest and the vertical reference direction component pixels adjacent to and above the pixel of interest in the upward direction, from among the pixel of interest and the vertical reference direction component pixels, and supplies the minimum value to the absolute value of difference calculator 93. As shown in FIG. 9, the first direction minimum value extractor 92 extracts the pixel of interest C, and the vertical reference direction component pixels U1 and U2 adjacent to and above the pixel of interest in the upward direction, and supplies the maximum value of the pixel values to the absolute value of difference calculator 93.

In step S93, the absolute value of difference calculator 93 calculates the absolute value of difference between the maximum value of the pixel values of the pixel of interest and the pixels above the pixel of interest supplied from the first direction maximum value extractor 91 and the minimum value of the pixel values of the pixel of interest and the pixels below the pixel of interest supplied from the first direction minimum value extractor 92, and supplies the calculated absolute value of difference to the threshold value determiner 97. As shown in FIG. 9, the absolute value of difference calculator 93 calculates the absolute value of difference between the maximum value of the pixel values of the pixels C, U1, and U2 supplied from the first direction maximum value extractor 91 and the minimum value of the pixel values of the pixels C, U1, and U2 supplied from the first direction minimum value extractor 92 and then supplies the calculated absolute value of difference to the threshold value determiner 97.

In step S94, the second direction maximum value extractor 94 extracts the maximum value of the pixel values of the pixel of interest and vertical reference direction component pixels below the pixel of interest in the downward direction and supplies the extracted maximum value to the absolute value of difference calculator 96. As shown in FIG. 9, the second direction maximum value extractor 94 extracts the pixel of interest C and the vertical reference direction component pixels D2 and D1 adjacent to and below the pixel of interest C in the downward direction, and supplies the maximum value of the pixel values of the pixels C, D1, and D2 to the absolute value of difference calculator 96.

In step S95, the second direction minimum value extractor 95 extracts the minimum value of the pixel values the pixel of interest and the vertical reference direction component pixels adjacent to and below the pixel of interest in the downward direction, from among the pixel of interest and the vertical reference direction component pixels, and outputs the minimum value to the absolute value of difference calculator 96. As shown in FIG. 9, the second direction minimum value extractor 95 extracts the pixel of interest C and vertical reference direction component pixels D2 and D1 adjacent to and below the pixel of interest, and supplies the minimum value of the pixel values of the pixels C, D1 and D2 to the absolute value of difference calculator 96.

In step S96, the absolute value of difference calculator 96 calculates the absolute value of difference between the maximum value of the pixel values of the pixel of interest and the pixels below the pixel of interest in the downward direction supplied from the second direction maximum value extractor 94 and the minimum value of the pixel values of the pixel of interest and the pixels below the pixel of interest in the downward direction supplied from the second direction minimum value extractor 95. The absolute value of difference calculator 96 supplies the calculated absolute value of difference to the threshold value determiner 97. As shown in FIG. 9, the absolute value of difference calculator 96 calculates the absolute value of difference between the maximum value of the pixel values of the pixels C, D1, and D2 supplied from the second direction maximum value extractor 94 and the minimum value of the pixel values of the pixels C, D1, and, D2 supplied from the second direction minimum value extractor 95, and supplies the calculated absolute value of difference to the threshold value determiner 97.

In step S97, the threshold value determiner 97 adds a margin to one of the two absolute values of difference respectively supplied from the absolute value of difference calculators 93 and 96, whichever is smaller, sets the resulting sum as the threshold value $\epsilon_2$, and outputs the threshold value $\epsilon_2$ to the non-linear smoother 32.

Figure 24:
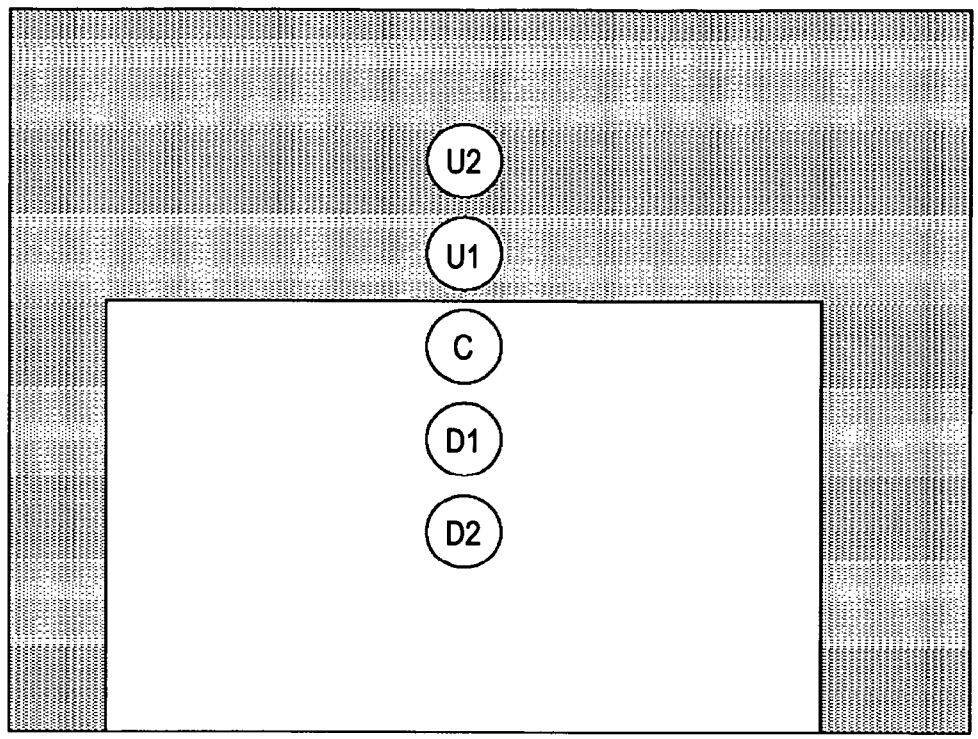
FIG. 24 illustrates the effect of the threshold value setting process of the threshold value setter of FIG. 22.

If there is an edge in the pixel of interest, the threshold value can be determined using the pixels having the pixel values adjacent to the pixel value of the pixel of interest. As shown in FIG. 24, the pixel of interest C and the pixels D1 and D2 below the pixel of interest C might have white pixel values and the pixels U1 and U2 above the pixel of interest C might have black pixel values. The pixel of interest C has a value closer to the pixel values of the pixels D1 and D2. The comparison of the absolute value of difference between the maximum value and the minimum value of the pixels C, U1, and U2 with the absolute value of difference between the maximum value and the minimum value of the pixels C, D1, and D2 shows that the absolute value of difference between the maximum value and the minimum value of the pixels C, U1, and U2 is smaller. The absolute value of difference between the maximum value and the minimum value of the pixels C, U1, and U2 is thus determined to be the threshold value $\epsilon_2$. Since the threshold value $\epsilon_2$ can be determined using only the pixels adjacent to the pixel of interest C, only the structural component can be accurately extracted and only the amplitude component can be accurately smoothed. The threshold value setter 46 is identical in operation to the threshold value setter 36 except that the pixel of interest and the horizontal processing direction component pixels are processed instead of the pixel of interest and the vertical reference direction component pixels. The operation of the threshold value setter 46 is thus omitted herein.

The reference direction component pixels are divided at the pixel of interest and the threshold value is determined from the absolute value of difference between the maximum value and the minimum value within each divided pixel range. Alternatively, the reference direction component pixels are divided at the pixel of interest and the threshold value $\epsilon_2$ may be set based on the absolute value of difference between each pixel within the divided pixel range and the pixel of interest.

FIG. 25 illustrates another threshold value setter 36. The threshold value setter 36 divides the reference direction components with respect to the pixel of interest, and determines the threshold value $\epsilon_2$ based on the absolute value of difference obtained between the pixel of interest and each of the pixels within the divided pixel range.

A first direction absolute value of difference calculator 111 calculates the absolute value of difference between the pixel value of the pixel of interest and the pixel value of each of the vertical reference direction component pixels adjacent to and above the pixel of interest, and supplies the maximum value of the absolute values of difference to a threshold value determiner 113.

A second direction absolute value of difference calculator 112 calculates the absolute value of difference between the pixel value of the pixel of interest and the pixel value of each of the vertical reference direction component pixels adjacent to and below the pixel of interest, and supplies the maximum value of the absolute values of difference to the threshold value determiner 113.

The threshold value determiner 113 adds a margin to one of the absolute values of difference respectively supplied from the first direction absolute value of difference calculator 111 and the second direction absolute value of difference calculator 112, whichever is smaller, sets the resulting sum to be the threshold value $\epsilon_2$, and supplies the threshold value $\epsilon_2$ to the non-linear smoother 32.

The threshold value setting process of the threshold value setter 36 of FIG. 25 is described below.

In step S111, the first direction absolute value of difference calculator 111 calculates the absolute value of difference between the pixel value of the pixel of interest and the pixel value of each of the vertical reference direction component pixels adjacent to and above the pixel of interest, from among the pixel values supplied from the vertical reference direction component pixel extractor 34, and supplies the maximum value of the absolute values of difference to the threshold value determiner 113. As shown in FIG. 9, the first direction absolute value of difference calculator 111 calculates the absolute value of difference between the pixel value of the pixel of interest C and the pixel value of each of the pixels U1 and U2 above the pixel of interest C, namely, calculates |C−U1| and |C−U2|, determines and supplies the maximum value of the absolute values of difference to the threshold value determiner 113.

In step S112, the second direction absolute value of difference calculator 112 calculates the absolute value of difference between the pixel value of the pixel of interest and the pixel value of each of the vertical reference direction component pixels adjacent to and below the pixel of interest from among the pixel values supplied from the vertical reference direction component pixel extractor 34, and determines and then supplies the maximum value of the absolute values of difference to the threshold value determiner 113. As shown in FIG. 9, the second direction absolute value of difference calculator 112 calculates the absolute value of difference between the pixel value of the pixel of interest C and the pixel value of each of the pixels D1 and D2 above the pixel of interest C, namely, calculates |C−D1| and |C−D2|, and determines and then supplies the maximum value of the absolute values of difference to the threshold value determiner 113.

In step S113, the threshold value determiner 113 adds a margin to one of the absolute values of difference respectively supplied from the first direction absolute value of difference calculator 111 and the second direction absolute value of difference calculator 112, whichever is smaller, determines the resulting sum to be the threshold value $\epsilon_2$ and supplies the threshold value $\epsilon_2$ to the non-linear smoother 32.

If there is an edge in the vicinity of the pixel of interest, the threshold value is set with respect to the pixel of interest using only the pixels adjacent to the pixel of interest in pixel value. The threshold value setter 46 is identical in operation to the threshold value setter 36 except that the pixel of interest and the horizontal reference direction component pixels are processed instead of the pixel of interest and the vertical reference direction component pixels. The discussion of the operation of the threshold value setter 46 is thus omitted herein.

In the above discussion, the threshold value is set using the pixels arranged in the direction vertical to the processing direction. The adjacent pixels to be used is not limited to the pixels arranged in the direction vertical to the processing direction. For example, the threshold value may be set depending on the magnitude of correlation of pixel blocks arranged in eight directions from the pixel of interest.

Figure 27:
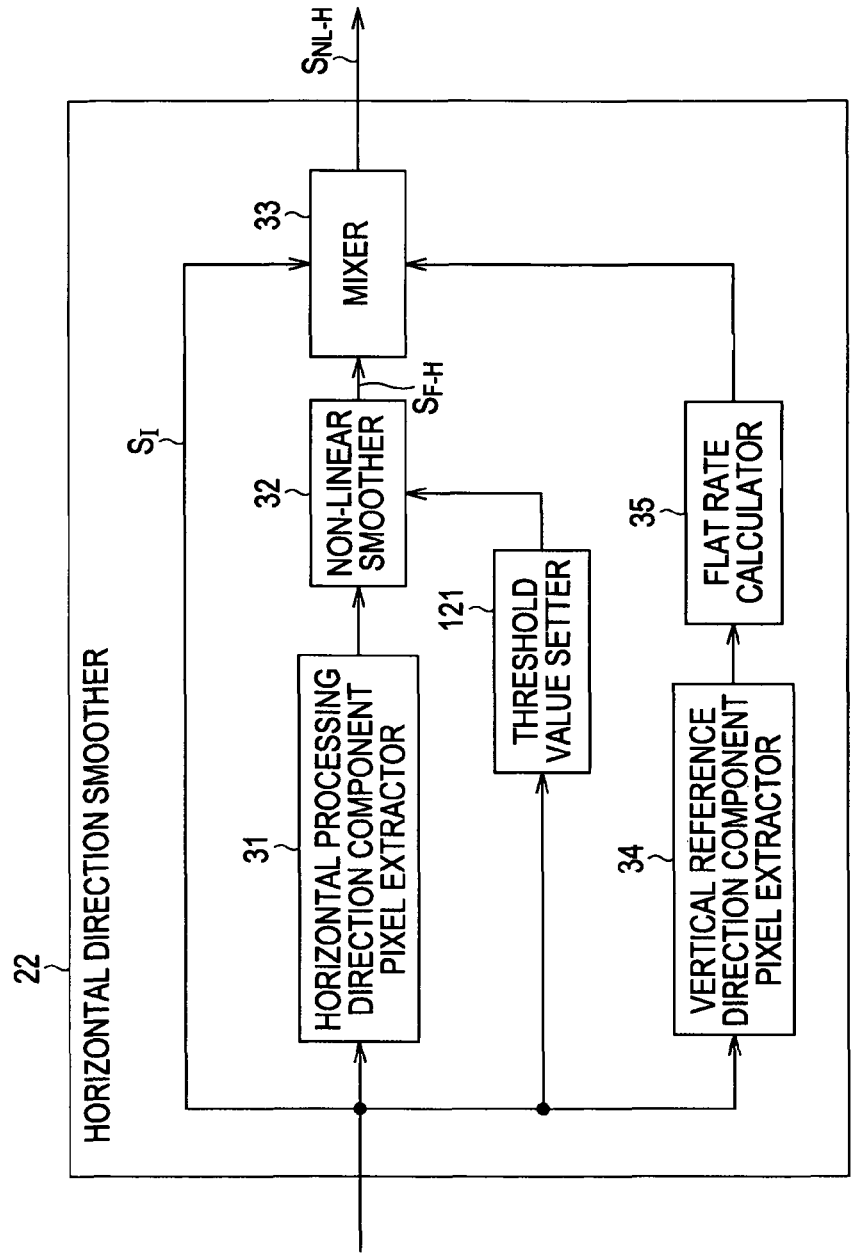
FIG. 27 is a block diagram of a modification of the horizontal direction smoother of FIG. 2.

FIG. 27 illustrates the horizontal direction smoother 22 that sets the threshold value depending on the correlation in eight directions from the pixel of interest. As shown in FIG. 27, elements identical to those in the horizontal direction smoother 22 described with reference to FIG. 3 are designated with the same reference numerals and the discussion thereof is appropriately omitted.

The horizontal direction smoother 22 of FIG. 27 is different from the counterpart of FIG. 3 in that the threshold value setter 36 is replaced with a threshold value setter 121.

The threshold value setter 121 calculates the absolute value of difference between the pixel value of the pixel of interest of interest and the pixel value of each pixel in each of pixel blocks. The pixel blocks are arranged above and below the pixel of interest in the vertical direction, to the right and to the left of the pixel of interest in the horizontal direction, and diagonally above and below the pixel of interest. The threshold value $\epsilon_2$ is determined based on the minimum value of the maximum absolutes value of difference of the pixel blocks.

Referring to FIG. 28, the threshold value setter 121 of one embodiment of the present invention is described below.

The block absolute values of difference calculators 131-1 through 131-8 calculate the respective absolute values of difference between the pixel of interest and each pixel in the pixel block, and supplies the respective maximum values to a threshold value determiner 132.

Figure 29:
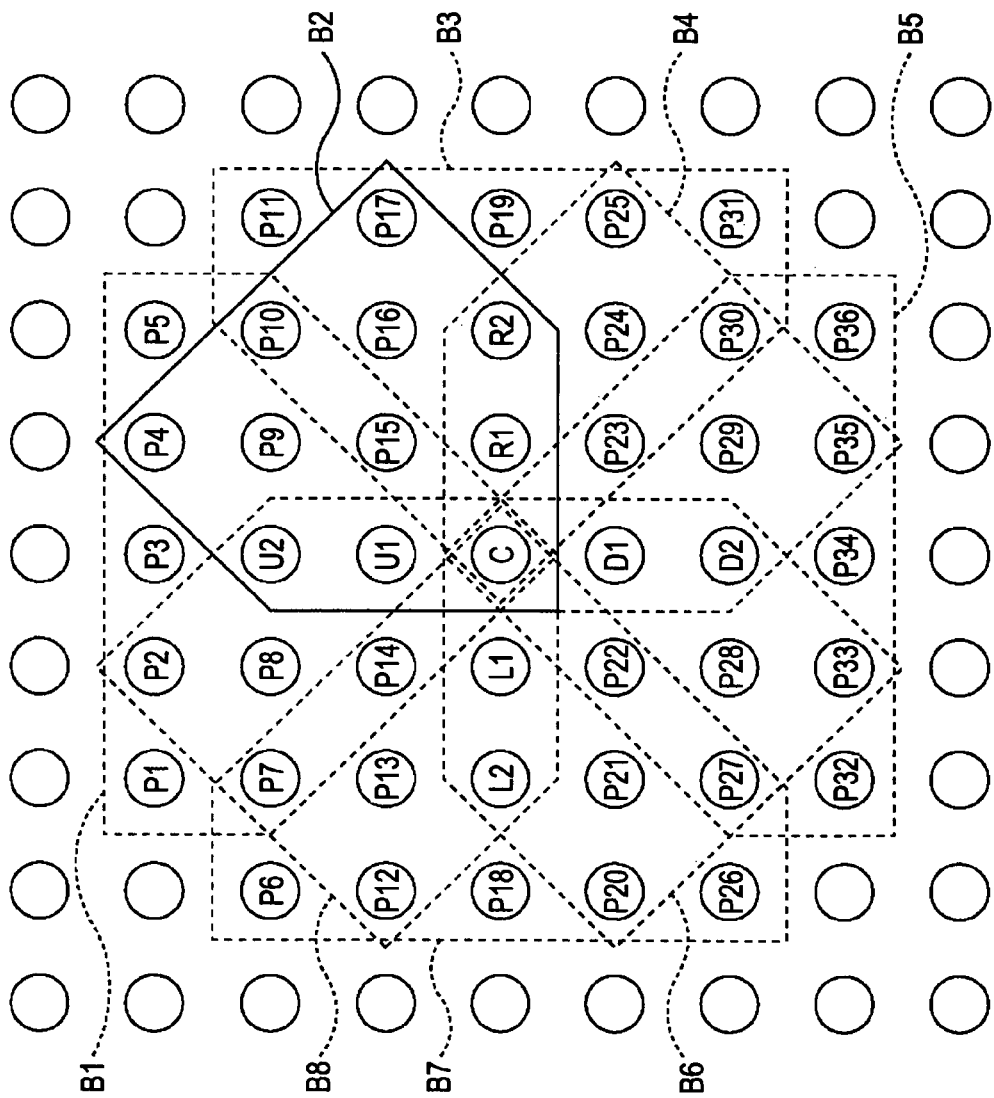
FIG. 29 illustrates the threshold value setter of FIG. 27.

The pixel blocks includes pixel blocks B1 through B8 as shown in FIG. 29. The pixel block B1 is used to detect the presence or absence of a texture vertically above the pixel of interest, and includes 14 pixels C, U1, U2, P1 through P10, P14, and P15 as shown in FIG. 29. The pixel block B2 is used to detect a texture diagonally right above the pixel of interest and includes 11 pixels C, U1, U2, R1, R2, P4, P9, P10, and P15 through P17 as shown in FIG. 29. The pixel block B3 is used to detect a texture horizontally to the right of the pixel of interest and includes 14 pixels of C, R1, R2, P10, P11, P15 through P17, P19, P23 through P25, P30, and P31 as shown in FIG. 29. The pixel block B4 is used to detect a texture diagonally right below the pixel of interest and includes 11 pixels of C, D1, D2, R1, R2, P23 through P25, P29, P30, and P35 as shown in FIG. 29.

The pixel block B5 is used to detect a texture vertically below the pixel of interest and includes 14 pixels of C, D1, D2, P22, P23, P27 through P30, and P32 through P36 as shown in FIG. 29. The pixel block B6 is used to detect a texture diagonally left below the pixel of interest and includes 11 pixels of C, D1, D2, L1, L2, P20 through P22, P27, P28, and P33 as shown in FIG. 29. The pixel block B7 is used to detect a texture horizontally to the left of the pixel of interest and includes 14 pixels of C, L1, L2, P6, P7, P12 through P14, P18, P20 through P22, P26, and P27 as shown in FIG. 29. The pixel block B8 is used to detect a texture diagonally left above the pixel of interest and includes 11 pixels of C, U1, U2, L1, L2, P2, P7, P8, and P12 through P14 as shown in FIG. 29.

The threshold value determiner 132 adds a margin to the minimum value of the maximum absolute values of difference supplied from the block absolute values of difference calculators 131-1 through 131-8, sets the resulting sum to be a threshold value $\epsilon_2$ and supplies the threshold value $\epsilon_2$ to the non-linear smoother 32.

Figure 30:
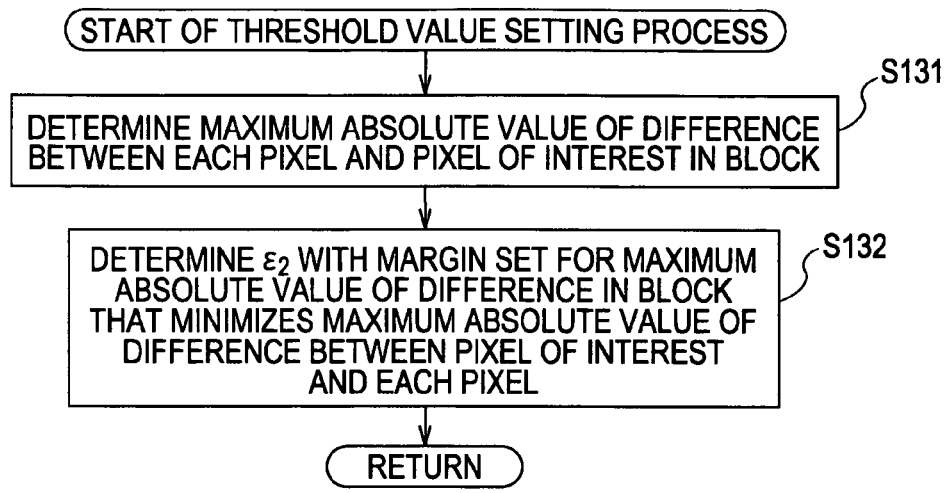
FIG. 30 is a flowchart illustrating the threshold value setting process of the threshold value setter of FIG. 27.

The threshold value setting process of the threshold value setter 36 of FIG. 28 is described below with reference to a flowchart of FIG. 30.

In step S131, the block absolute values of difference calculators 131-1 through 131-8 determine the respective absolute values of difference between the pixel of interest and each pixel in the respective pixel blocks, and then supply the resulting maximum values thereof to the threshold value determiner 132.

As shown in FIG. 29, the block absolute value of difference calculator 131-1 calculates |C-U1|, |C-U2|, |C-P1| through |C-P10|, |C-P14|, and |C-P15| in the pixel block B1 and supplies the maximum value of the results to the threshold value determiner 132.

The block absolute value of difference calculator 131-2 calculates |C-U1|, |C-U2|, |C-R1|, |C-R2|, |C-P4|, |C-P9|, |C-P10|, |C-P15| through |C-P17| in the pixel block B2 and supplies the maximum value of the results to the threshold value determiner 132.

The block absolute value of difference calculator 131-3 calculates |C-R1|, |C-R2|, |C-P10|, |C-P11|, |C-P15| through |C-P17|, |C-P19|, |C-P23| through |C-P25|, |C-P30|, and |C-P31| in the pixel block B3 and supplies the maximum value of the results to the threshold value determiner 132.

The block absolute value of difference calculator 131-4 calculates |C-D1|, |C-D2|, |C-R1|, |C-R2|, |C-P23| through |C-P25|, |C-P29|, |C-P30|, and |C-P35| in the pixel block B4 and supplies the maximum value of the results to the threshold value determiner 132.

The block absolute value of difference calculator 131-5 calculates |C-D1|, |C-D2|, |C-P22|, |C-P23|, |C-P27| through |C-P30| and |C-P32| through |C-P36| in the pixel block B5 and supplies the maximum value of the results to the threshold value determiner 132.

The block absolute value of difference calculator 131-6 calculates |C-D1|, |C-D2|, |C-L1|, |C-L2|, |C-P20| through |C-P22|, |C-P27|, |C-P28|, and |C-P33| in the pixel block B6 and supplies the maximum value of the results to the threshold value determiner 132.

The block absolute value of difference calculator 131-7 calculates |C-L1|, |C-L2|, |C-P6|, |C-P7|, |C-P12| through |C-P14|, |C-P18|, |C-P20| through |C-P22|, |C-P26|, and |C-P27| in the pixel block B7 and supplies the maximum value of the results to the threshold value determiner 132.

The block absolute value of difference calculator 131-8 calculates |C-U1|, |C-U2|, |C-L1|, |C-L2|, |C-P2|, |C-P7|, |C-P8|, and |C-P12| through |C-P14| in the pixel block B8 and supplies the maximum value of the results to the threshold value determiner 132.

In step S132, the threshold value determiner 132 adds a margin to the minimum value of the maximum absolutes value of difference in the pixel blocks supplied from the block absolute values of difference calculators 131-1 through 131-8, sets the sum as a threshold value $\epsilon_2$, and supplies the threshold value $\epsilon_2$ to the non-linear smoother 32. The pixels in the pixel block providing the minimum value of the absolute values of difference have high correlation to the pixel of interest, and shows the high possibility that a texture striding across the pixel of interest is present. The maximum value of the absolute values of difference of the pixel blocks providing the minimum value among the pixel blocks is set as the threshold value $\epsilon_2$.

Through the above process, the threshold value is set based on the pixels adjacent to the pixel of interest in the direction that provides the high possibility of the presence of a texture. The amplitude component is thus smoothed while preserving the structural component. The threshold value $\epsilon_2$ is set based on the pixel values in the pixel blocks in eight directions from the pixel of interest. Alternatively, the threshold value may be set taking into consideration the possibility that a texture is present in other directions than the eight directions.

In the above discussion, the threshold value is set based on the absolute value of difference between the pixel of interest and each pixel in the pixel block in the direction in which a texture may be present. Alternatively, the threshold value may be set based on a distribution of absolute values of difference regardless of the directions of the pixels.

Figure 31:
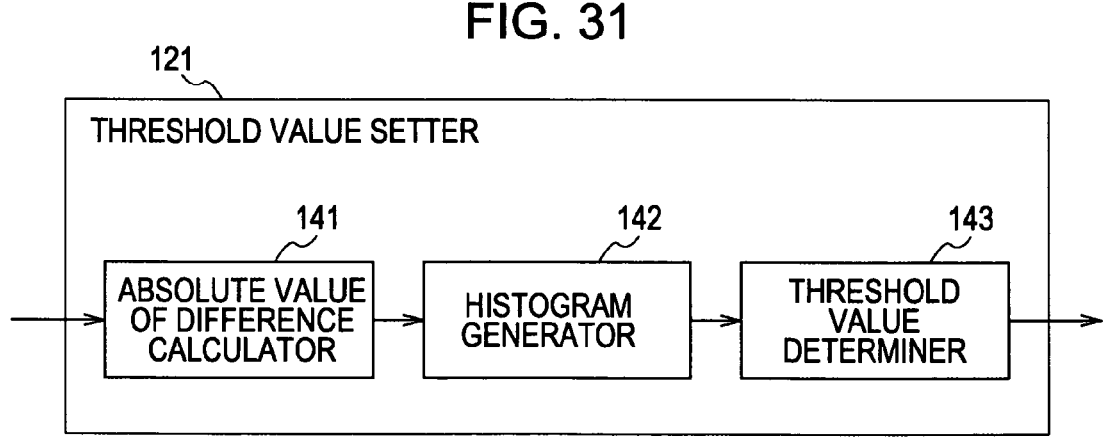
FIG. 31 is a block diagram of another modification of the threshold value setter of FIG. 27.

FIG. 31 illustrates the threshold value setter 121. The threshold value setter 121 sets the threshold value based on the distribution of absolute values of difference using a histogram of the absolute values of difference between the pixel value of the pixel of interest and the pixel value of each of the pixels adjacent to the pixel of interest.

An absolute value of difference calculator 141 calculates the absolute value of difference between the pixel value of the pixel of interest and the pixel value of the pixel adjacent to the pixel of interest with each of the input pixels set as the pixel of interest, and then outputs the absolute value of difference to a histogram generator 142.

The histogram generator 142 generates a histogram with the absolute value of difference plotted in the abscissa and the frequency of the absolute value of difference plotted in the ordinate, and then supplies the histogram to a threshold value determiner 143.

The threshold value determiner 143 sets the threshold value $\epsilon_2$ in accordance with the histogram supplied from the histogram generator 142 and then supplies the threshold value $\epsilon_2$ to the non-linear smoother 32.

Figure 32:
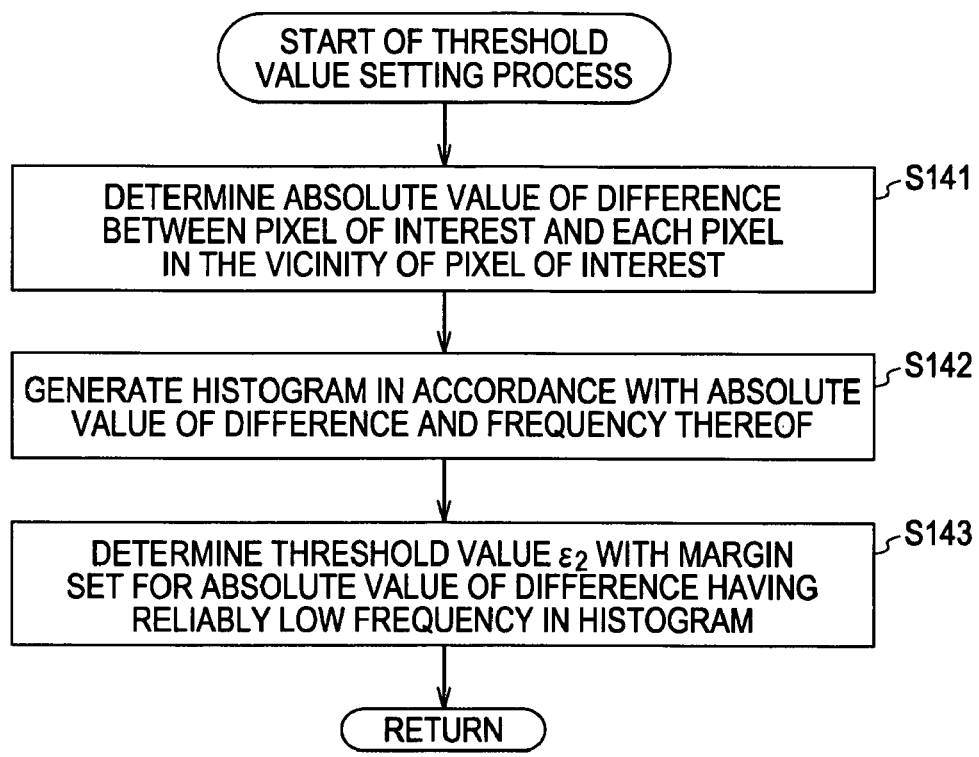
FIG. 32 is a flowchart illustrating the threshold value setting process of the threshold value setter of FIG. 31.

The threshold value setting process of the threshold value setter 121 of FIG. 31 is described below with reference to a flowchart of FIG. 32.

In step S141, the absolute value of difference calculator 141 calculates the absolute value of difference between the pixel value of the pixel of interest and the pixel value of each of the pixels adjacent to the pixel of interest with each of the input pixels successively set as the pixel of interest, and then supplies the absolute values of difference to the histogram generator 142. The adjacent pixels may be 11 pixels by 11 pixels centered on the pixel of interest.

In step S142, the histogram generator 142 generates the histogram with the absolute value of difference plotted in the abscissa and the frequency thereof plotted in the ordinate, and then supplies the histogram to the threshold value determiner 143. As a result, a histogram of FIG. 33 having peaks P1 and P2 is obtained.

Figure 33:
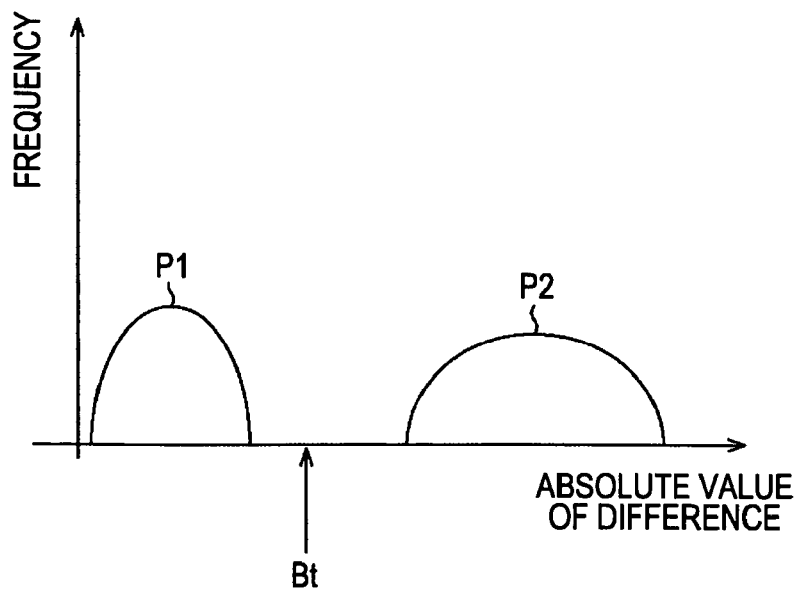
FIG. 33 illustrates the threshold value setting process of the threshold value setter of FIG. 31.

In step S143, the threshold value determiner 143 sets the threshold value $\epsilon_2$ based on the histogram supplied from the histogram generator 142 and then supplies the threshold value $\epsilon_2$ to the non-linear smoother 32. More specifically, when the histogram of FIG. 33 is supplied, the threshold value determiner 143 determines that many pixels having the absolute value of difference near the peaks P1 and P2 are distributed, and considers that there are edges in the pixels. The absolute value of difference having a low frequency between the peaks P1 and P2, such as the absolute value of difference Bt, is set as the threshold value $\epsilon_2$.

Through the above process, the threshold value $\epsilon_2$ is set based on the distribution of the absolute values of difference containing edges and the frequency of the absolute values of difference. Only the amplitude component is smoothed while the structural component is preserved.

Figure 34:
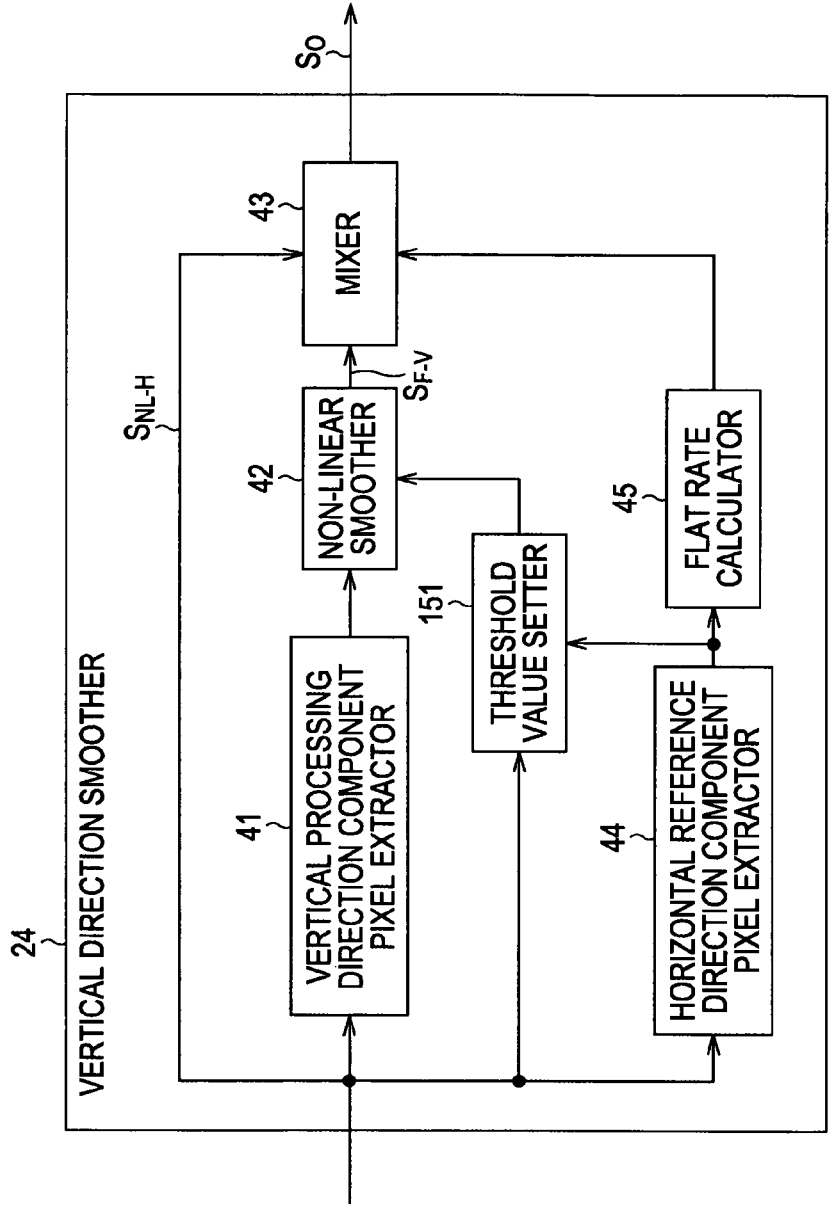
FIG. 34 is a block diagram illustrating another modification of the vertical direction smoother of FIG. 2.

The threshold value setter 121 in the horizontal direction smoother 22 has been discussed. The vertical direction smoother 24 also includes a threshold value setter 151 as shown in FIG. 34. The threshold value setter 151 is identical in operation to the threshold value setter 121 except that the relationship between the horizontal direction and the vertical direction is reversed, and the discussion thereof is omitted herein.

In the above discussion, the horizontal direction smoothing process is performed followed by the vertical direction smoothing process. Alternatively, the vertical direction smoothing process may be performed first followed by the horizontal direction smoothing process. Even if either the horizontal direction smoothing process or the vertical direction smoothing process is performed on the video signal, the effect of the embodiments is pronounced. The flat rate is determined in the processing direction, and unnatural enhancement in the processing direction is controlled, and contrast and sharpness in the area other than the edge are enhanced.

Figure 35:
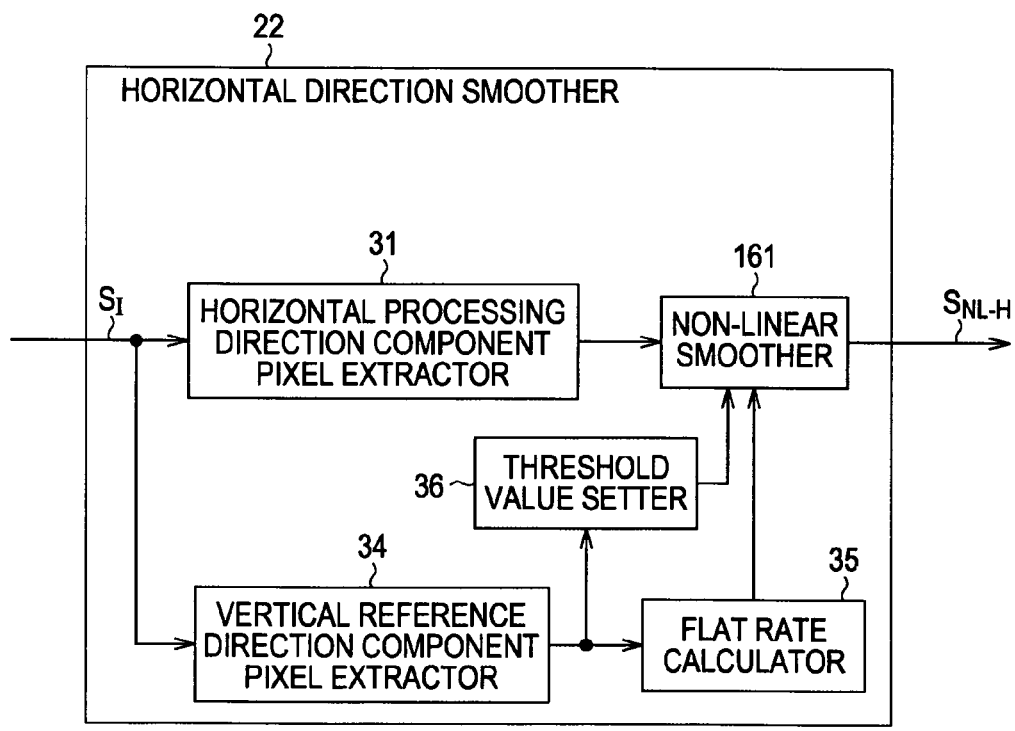
FIG. 35 is a block diagram illustrating another modification of the horizontal direction smoother of FIG. 2.

The non-linear smoother 32 performs the non-linear smoothing process using the pixel of interest and the horizontal processing direction component pixels with respect to the pixel of interest. Alternatively, the vertical reference direction component pixels may be used together with the horizontal processing direction component pixels in the non-linear smoothing process. FIG. 35 illustrates the horizontal direction smoother 22 that uses the vertical reference direction component pixels together with the horizontal processing direction component pixels. As shown in FIG. 35, elements identical to those illustrated in FIG. 3 are designated with the same reference numerals and the discussion thereof is omitted herein.

The horizontal direction smoother 22 of FIG. 35 is different from the horizontal direction smoother 22 of FIG. 3 in that a non-linear smoother 161 is used instead of the non-linear smoother 32 with the mixer 33 eliminated so that the flat rate $Fr_{-V}$ calculated by the flat rate calculator 35 is supplied to the non-linear smoother 161. The non-linear smoother 161 is basically identical in operation to the non-linear smoother 32. The non-linear smoother 161 is different from the non-linear smoother 32 in that the vertical reference direction component pixels supplied from the vertical reference direction component pixel extractor 34 are used together with the horizontal processing direction component pixels in the non-linear smoothing process.

Figure 36:
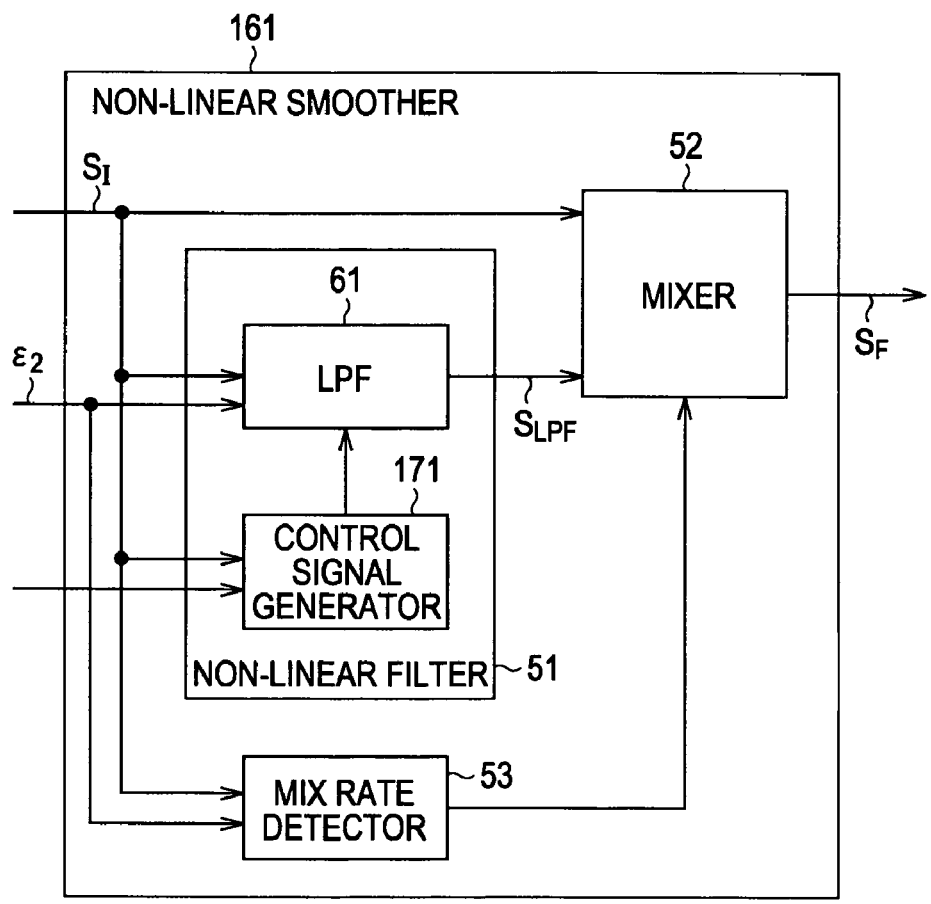
FIG. 36 is a block diagram illustrating the non-linear smoother of FIG. 35.

The non-linear smoother 161 is described below in detail with reference to FIG. 36. In FIG. 36, elements identical to those of the non-linear smoother 32 of FIG. 5 are designated with the same reference numerals and the discussion thereof is omitted herein.

Figure 5:
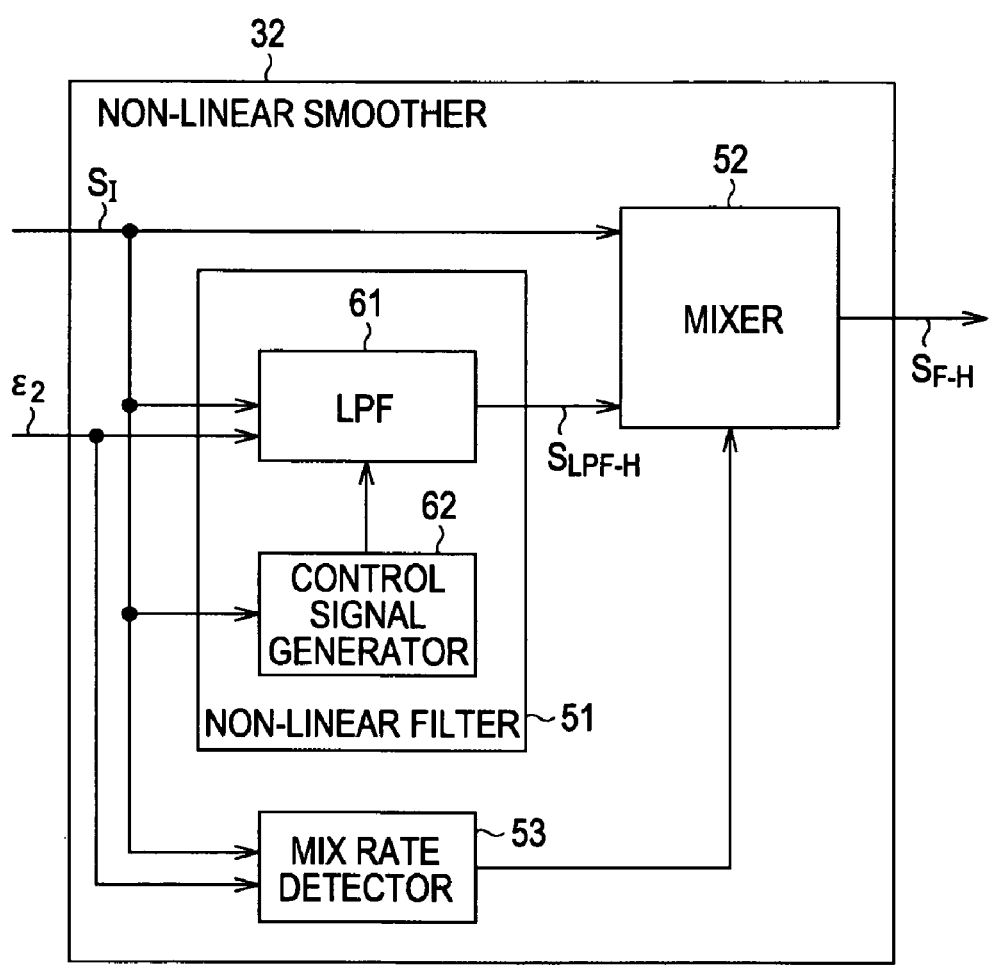
FIG. 5 is a block diagram illustrating a non-linear smoother of FIG. 3.

The non-linear smoother 161 of FIG. 36 is different from the non-linear smoother 32 of FIG. 5 in that the control signal generator 62 is replaced with a control signal generator 171. The control signal generator 171 is identical in operation to the control signal generator 62 except that a control signal is generated using the flat rate $Fr_{-V}$ supplied from the flat rate calculator 35 in addition to the horizontal processing direction component pixels.

Figure 37:
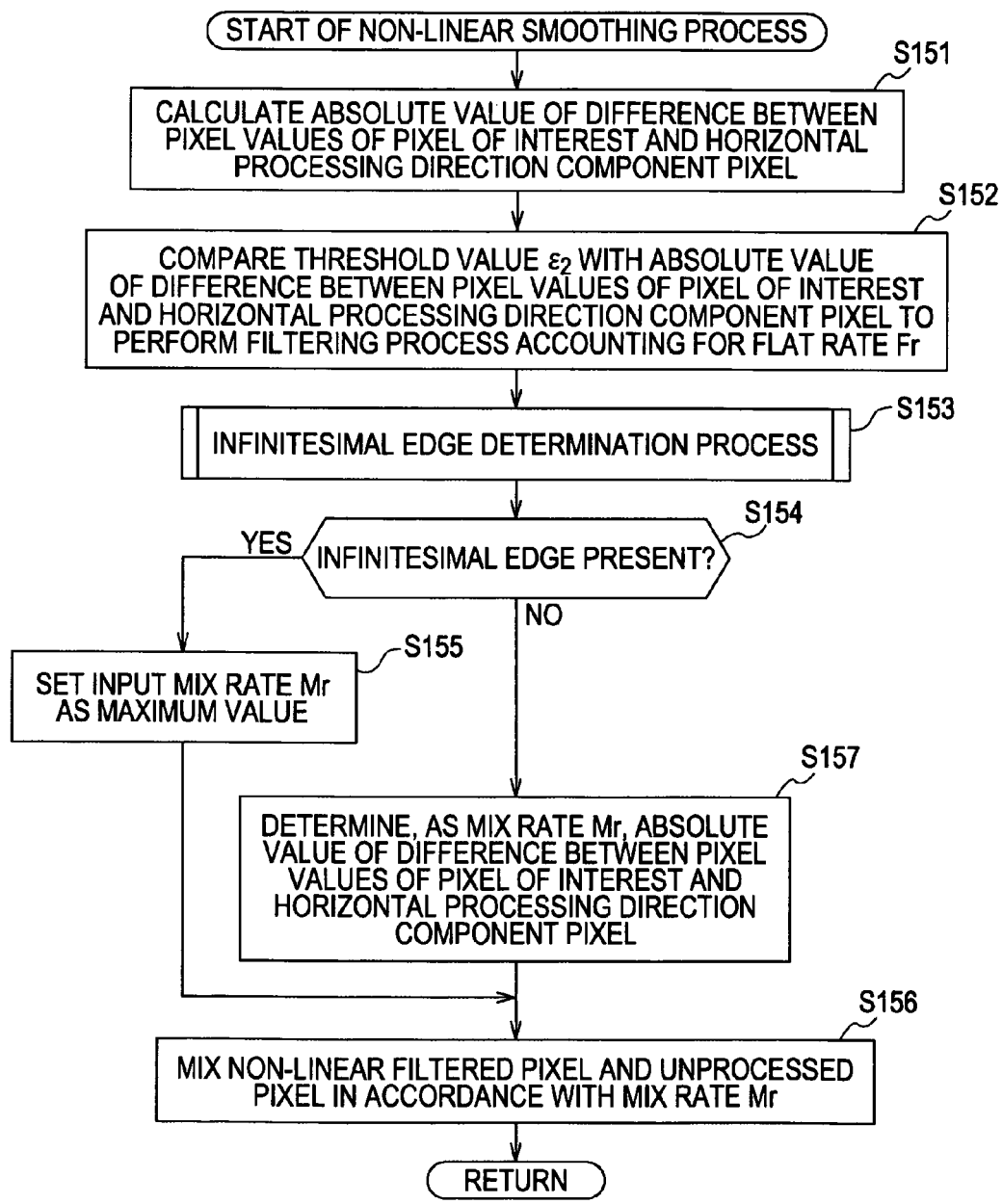
FIG. 37 is a flowchart illustrating a non-linear smoothing process of an image enhancement processor having the non-linear smoother of FIG. 36.

The non-linear smoothing process of the horizontal direction smoother 22 of FIG. 35 is described below with reference to a flowchart of FIG. 37. Steps S153 through S157 in the flowchart of FIG. 37 are respectively identical to steps S33 through S37 in the flowchart of FIG. 11, and the discussion thereof is omitted herein.

In step S151, the control signal generator 62 in the non-linear filter 51 calculates the absolute value of difference between the pixel value of the pixel of interest and the pixel value of each of the horizontal processing direction component pixels.

In step S152, the low-pass filter 61 compares each absolute value of difference between the pixel value of the pixel of interest C and the pixel value of each of the plurality of horizontal processing direction component pixels, supplied from the control signal generator 171, with a predetermined threshold value $\epsilon_2$. If the absolute value of difference is larger than the threshold value $\epsilon_2$, a first process to replace the one of the horizontal processing direction component pixels with the pixel of interest C is performed. The non-linear smoothing process is performed on each pixel having undergone the first process from the video signal $S_1$, taking into consideration the flat rate $Fr_{-V}$ supplied from the flat rate calculator 35.

The two pixels to the right of and two pixels to the left of the pixel of interest might be L2, L1, C, R1, and R2. In accordance with a control signal from the control signal generator 171, the low-pass filter 61 replaces each of the pixels with the pixel of interest C if the difference of the pixel of interest C with each of the pixels in pixel value is larger the threshold value. The low-pass filter 61 thus generates two pixels to the right of the pixel of interest and two pixels to the left of the pixel of interest, namely, L2', L1', C, R1', and R2'. The low-pass filter 61 further processes each of the signals L2', L1', C, R1', and R2' taking into consideration the flat rate $Fr_{-V}$.

As for the signal L2', a signal L2" obtained through the process taking into consideration the flat rate $Fr_{-V}$ is calculated using the following equation (8):

$$L2''=W_c \times C + W_{L2} \times L2' \quad (8)$$

where $W_{L2}$ and $W_c$ are something like weights of equation (5), and $W_c$ corresponds to $W_1$, and $W_{L2}$ corresponds to $W_2$ ($W_{L2}+W_c=1$) If the flat rate $Fr_{-V}$ is small, the weight $W_c$ is maximized (=1), and the signal L2" becomes C (L2"=C).

The same process is performed on the pixel signals, and the signals L1', R1', and R2' are subjected to operations represented by equations (9) through (11), respectively:

$$L1''=W_c \times C + W_{L1} \times L1' \quad (9)$$

$$R1''=W_c \times C + W_{R1} \times R1' \quad (10)$$

$$R2''=W_c \times C + W_{R2} \times R2' \quad (11)$$

Since the vertical flat rate $Fr_{-V}$ of the pixel of interest C is used, the weights become $W_{L2}=W_{L1}=W_{R2}=W_{R1}$ in practice. If the flat rate $Fr_{-V}$ is smaller than a predetermined threshold, L1''=C, R1''=C, and R2''=C.

As a result, the low-pass filter 61 performs the horizontal direction smoothing process by calculating the following equation (12) with reference to equation (1);

$$C'=(1 \times C + 2 \times C + 3 \times C + 2 \times C + 1 \times C)/9 = C \quad (12)$$

As a result, if the flat rate $Fr_{-V}$ is small, the input video signal is used as is. Conversely, if the flat rate $Fr_{-V}$ is large, the value filter processed based on the value of the horizontal direction pixel in accordance with equation (1) is used.

Since the non-linear smoothing process is performed taking into consideration the flat rate, the subsequent mixer 33 can be eliminated (as a result, the signal video $S_{F-H}$ output from the non-linear smoother 161 becomes the video signal $S_{NL-H}$ output from the horizontal direction smoother 22).

Through the above process, the non-linear filtering process taking into consideration not only the horizontal correlation of the pixel of interest but also the vertical correlation is performed. With the edge preserved, an unnatural process in the processing direction is controlled.

With reference to FIG. 36, the control signal generator 171 in the non-linear smoother 161 performs the non-linear filtering process taking into consideration the vertical reference direction component pixels in addition to the horizontal processing direction component pixels. When an infinitesimal edge is detected, the vertical reference direction component pixels may also be used in addition to the horizontal processing direction component pixels.

Figure 38:
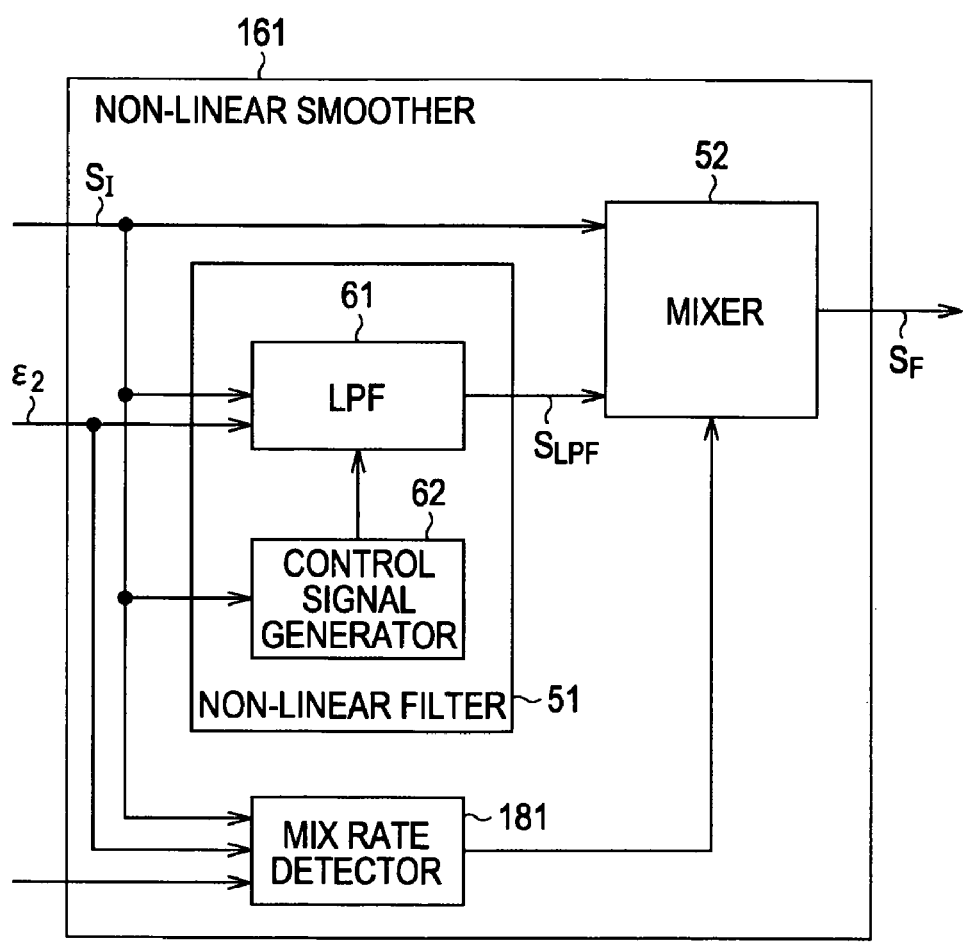
FIG. 38 is a block diagram of another modification of the non-linear smoother of FIG. 35.

FIG. 38 illustrates the non-linear smoother 161. The non-linear smoother 161 uses the vertical reference direction component pixels in addition to the horizontal processing direction component pixels when the mix rate $Mr_{-H}$ is calculated. As shown in FIG. 38, elements identical to those in the non-linear smoother 32 of FIG. 5 are designated with the same reference numerals, and the discussion thereof is omitted herein.

The non-linear smoother 161 of FIG. 38 is different from the non-linear smoother 32 of FIG. 5 in that that the mix rate detector 53 is replaced with a mix rate detector 181. The mix rate detector 181 is basically identical in operation to the mix rate detector 53 except that the mix rate $Mr'_{-H}$ is determined using the flat rate $Fr_{-V}$ supplied from the flat rate calculator 35 in addition to the horizontal processing direction component pixels.

Figure 39:
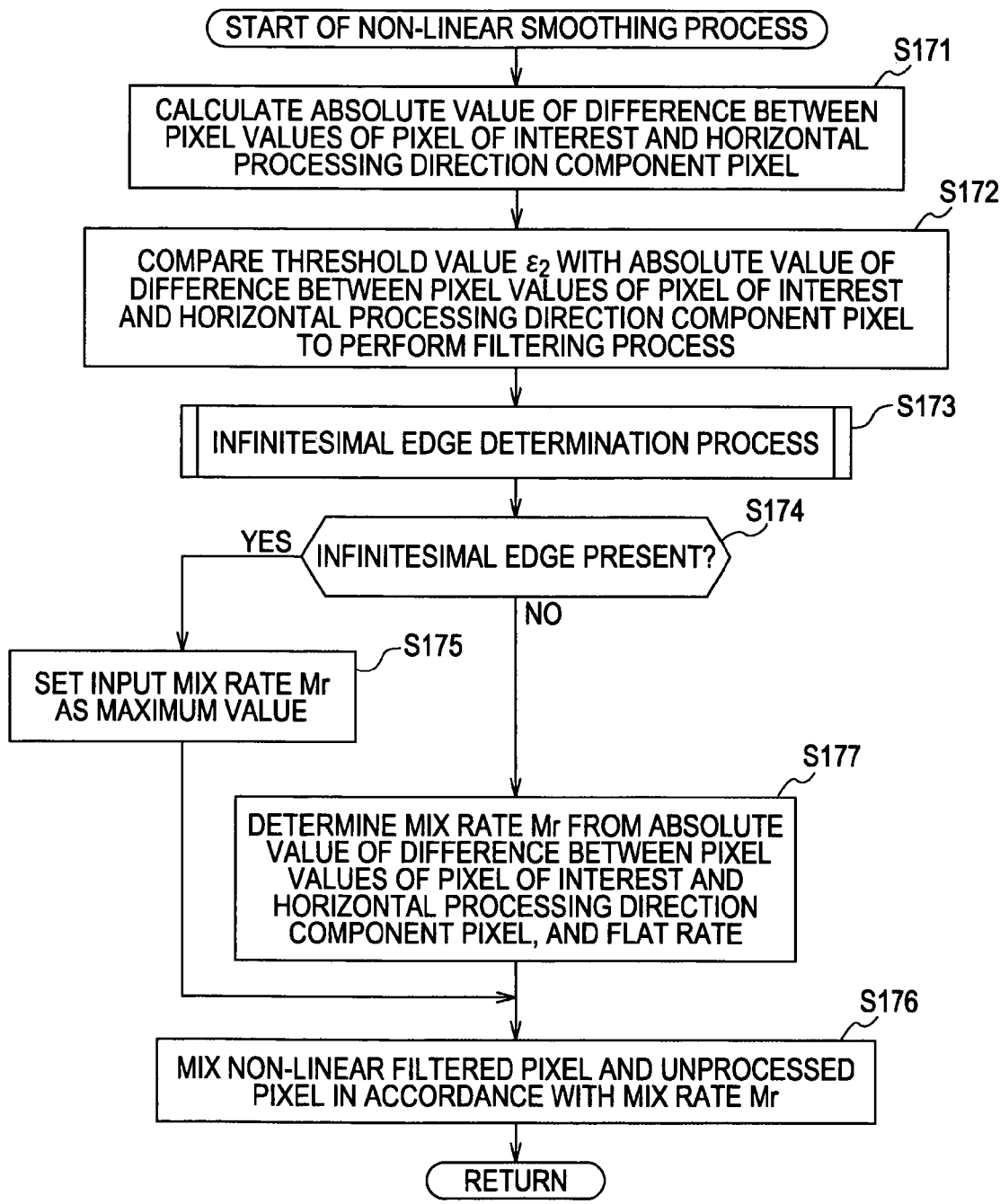
FIG. 39 is a flowchart illustrating the non-linear smoothing process of the image enhancement processor having the non-linear smoother of FIG. 38.

The infinitesimal edge determination process of the non-linear smoother 161 of FIG. 38 is described below with reference to a flowchart of FIG. 39. Steps S171 through S176 in the flowchart of FIG. 39 are respectively identical to steps S31 through S36 in the flowchart of FIG. 11, and the discussion thereof is omitted herein.

In step S177, the mix rate detector 181 calculates the absolute value of difference between the pixel value of the pixel of interest and the pixel value of each of the horizontal processing direction component pixels, determines the maximum value of the calculated absolute values of difference as a mix rate $Mr_{-H}$ (mix rate $Mr_{-H}$ is calculated in the same way as in steps S35 and S37), calculates a mix rate $Mr'_{-H}$ using the flat rate $Fr_{-V}$, and outputs the mix rate $Mr'_{-H}$ to the mixer 52.

More specifically, the mix rate detector 181 determines the mix rate $Mr'_{-H}$ in accordance with the following equation (13) using the flat rate $Fr_{-V}$:

$$Mr'_{-H} = W_A \times Mr_{-Hmax} + W_B \times Mr_{-H} \quad (13)$$

where weights $W_A$ and $W_B$ respectively correspond to the weight $W_1$ and $W_2$ of equation (5). Mix rate $Mr_{-Hmax}$ is the maximum value of the mix rate $Mr_{-H}$. If the flat rate $Fr_{-V}$ is small, the mix rate $Mr'_{-H}$=maximum mix rate $Mr_{-Hmax}$. If the flat rate $Fr_{-V}$ is large, $Mr_{-H}$=Mr-H. For example, if the flat rate $Fr_{-V}$ is small, the video signal $S_{F-H}=S_1$ from the result of equation (3). The input video signal $S_1$ is output as is.

Through the above process, information in the vertical direction can be added at the mixer of the non-linear smoother. The mix rate $Mr_{-H}$ can be set taking into consideration not only the horizontal processing direction component pixels with respect to the pixel of interest but also the vertical reference direction component pixels. A more naturally filtered video signal $S_{LPF-H}$ and the input video signal $S_1$ are mixed. As a result, with the edge preserved, an unnatural process in the processing direction is controlled.

Figure 40:
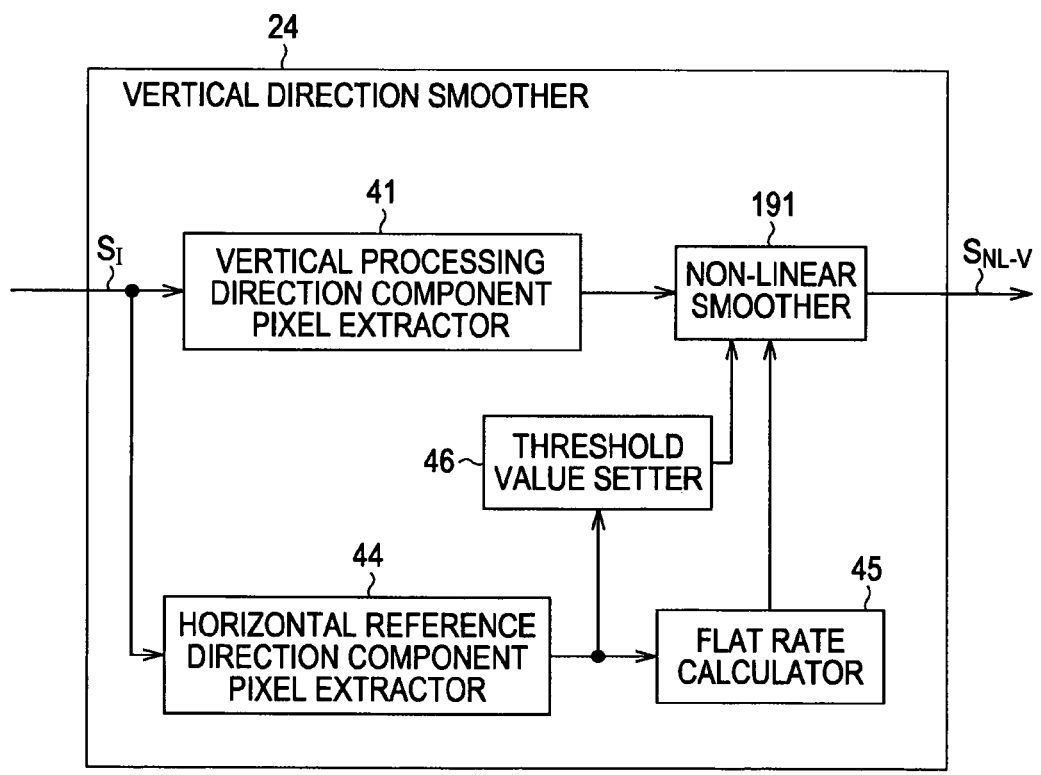
FIG. 40 is a block diagram illustrating another modification of the vertical direction smoother of FIG. 2.

Similarly, the vertical direction smoother 24 may use not only the vertical processing direction component pixels but also the horizontal reference direction component pixels. FIG. 40 illustrates the vertical direction smoother 24 that uses not only the vertical processing direction component pixels but also the horizontal reference direction component pixels. As shown in FIG. 40, elements identical to those in the vertical direction smoother 24 of FIG. 4 are designated with the same reference numerals and the discussion thereof is omitted herein.

Figure 4:
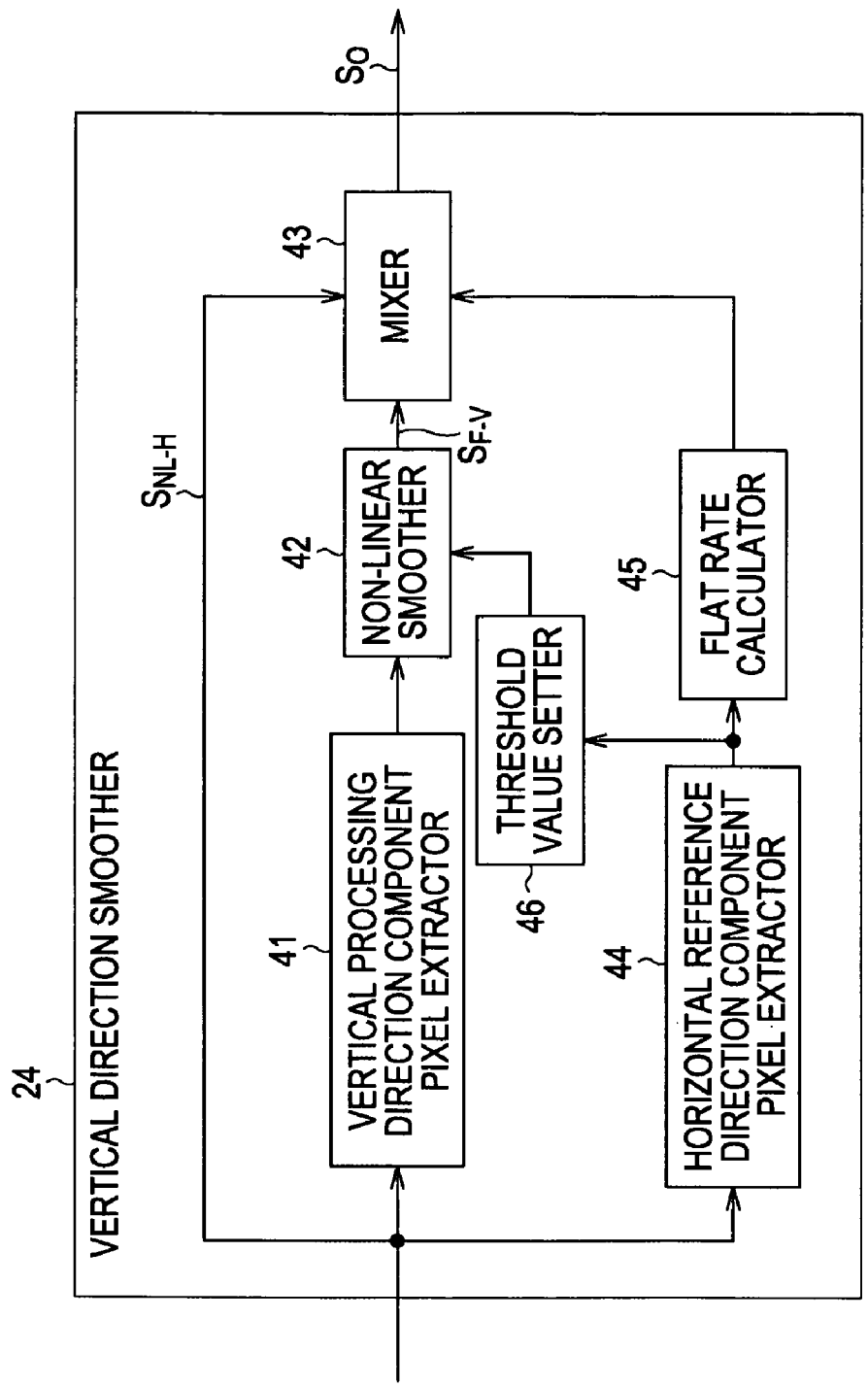
FIG. 4 is a block diagram illustrating a vertical direction smoother of FIG. 2.

The vertical direction smoother 24 of FIG. 40 is different from the vertical direction smoother 24 of FIG. 4 in that a non-linear smoother 191 is arranged with the mixer 33 eliminated so that the flat rate $Fr_{-H}$ calculated by the flat rate calculator 45 is supplied to the non-linear smoother 191. The non-linear smoother 191 is basically identical in operation to the non-linear smoother 42 except that the flat rate $Fr_{-H}$ supplied from the flat rate calculator 45 is used together with the vertical processing direction component pixels.

Figure 41:
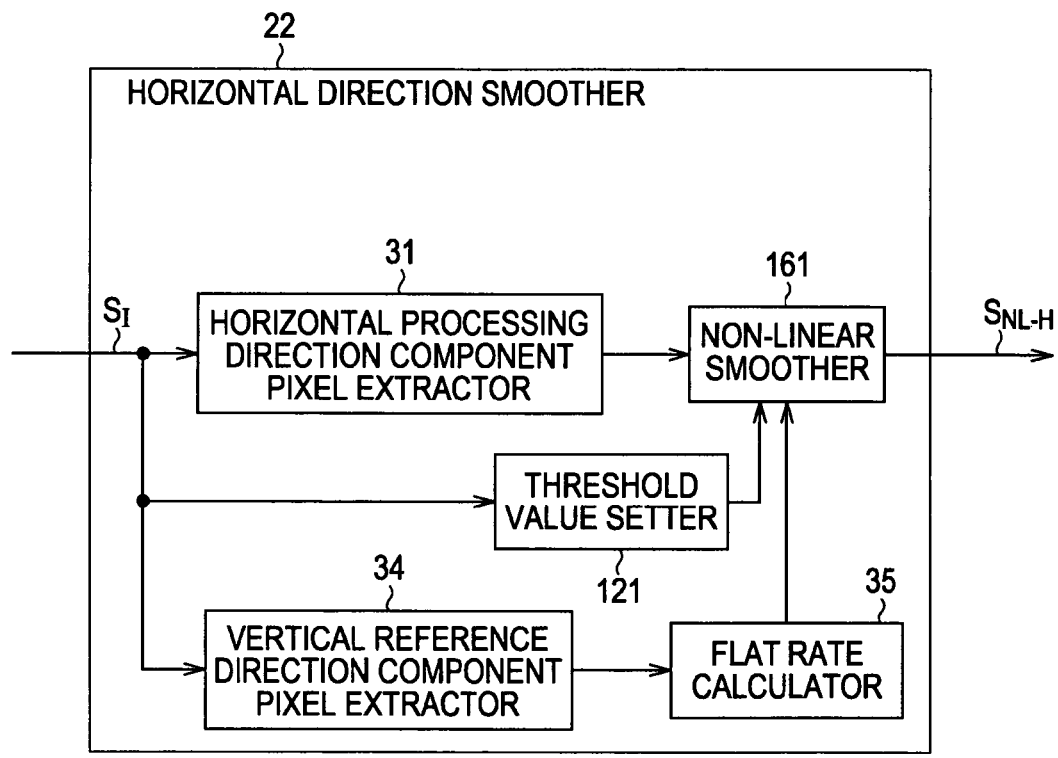
FIG. 41 is a block diagram illustrating another modification of the horizontal direction smoother of FIG. 2.
Figure 42:
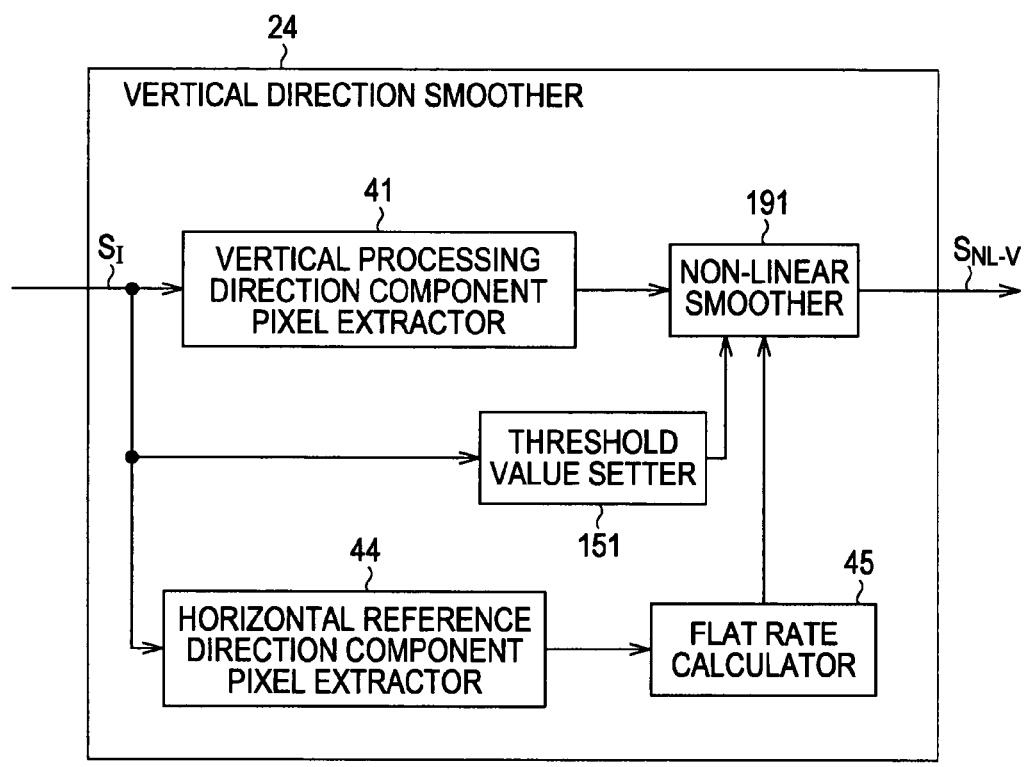
FIG. 42 is a block diagram illustrating another modification of the vertical direction smoother of FIG. 2.

The non-linear smoother 191 is identical in operation to the non-linear smoother 161 of FIGS. 36 and 38 except that the process in the horizontal direction is interchanged with the process in the vertical direction, and the discussion thereof is omitted herein. In the above discussion, the threshold value setters 36 and 46 are used. As shown in FIG. 41, the threshold value setter 121 may be substituted for the threshold value setter 36 when the non-linear smoother 161 is used. As shown in FIG. 42, the threshold value setter 151 may be substituted for the threshold value setter 46 when the non-linear smoother 191 is used. In each case, the threshold value setting process remains unchanged and is not discussed further.

In accordance with embodiments of the present invention, each of the consecutively arranged signals is successively designated as the signal of interest. The first threshold value is set based on the absolute value of difference between the signal adjacent to the signal of interest and the signal of interest. The plurality of adjacent signals are extracted as the process signals from the signals consecutive arranged in the first direction with respect to the designated signal of interest. The signal of interest and the plurality of process signals are weight averaged to generate the average signal based on the comparison result of comparing the process difference between the signal of interest and each process signal with the first threshold value. The first mix rate of the average signal and the signal of interest is calculated based on the comparison result of comparing the process difference with the second threshold value smaller than the first threshold value. The average signal and the signal of interest are mixed in accordance with the calculated first mix rate, and the first mix signal is generated. The plurality of adjacent signals are extracted as the reference signals from the signals consecutively arranged in the second direction with respect to the designated signal of interest. The second mix rate of the mix signal and the signal of interest is calculated based on the reference difference between the signal of interest and each reference signal. The first mix signal and the signal of interest are mixed in accordance with the second mix rate. An image other than a sharp edge thereof is smoothed and continuity and correlation of pixels are maintained.

The above-described series of process steps may be executed using hardware or software. If the series of process steps is performed using software, a program constructing the software may be installed onto a computer in a dedicated hardware structure or a general-purpose personal computer that performs a variety of functions by executing a variety of programs.

FIG. 43 illustrates a personal computer that embodies the electrical internal structure of the enhancement processor 11 of FIG. 2 using software in accordance with one embodiment of the present invention. A CPU 201 of the personal computer generally controls the personal computer. The CPU 201 executes a program stored on a read-only memory (ROM) 202 when the CPU 201 receives via a bus 204 and an input-output interface 205 a command a user enters onto an input unit 206. A program is read from one of a magnetic disk 221, an optical disk 222, a magneto-optical disk 223 and a semiconductor memory 224 connected to a drive 210, and installed onto a storage unit 208. The CPU 201 loads the program onto a random-access memory (RAM) 203 for execution. The function of the enhancement processor 11 of FIG. 2 is thus performed using software. The CPU 201 controls a communication unit 209 to exchange data with the outside.

As shown in FIG. 43, the storage media storing the program may include package media, distributed to the user to provide the program to the user separate from the computer, including the magnetic disk 221 (including a flexible disk), the optical disk 222 (such as compact-disk read-only memory (CD-ROM) or digital versatile disk (DVD)), the magneto-optical disk 223 (Mini-Disk (MD®)), and the semiconductor memory 224, each storing the program. The storage media may further include ROM 202 and a hard disk in the storage unit 208, each supplied in the computer to the user and storing the program.

The process steps describing the program stored on the storage medium may be performed in the order sequence as described. The process steps may not necessarily be performed in the described order sequence, but may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus for adjusting a level of consecutively arranged signals, comprising:
    designating means for successively designating each of the consecutively arranged signals as a signal of interest;
    setting means for setting a first threshold value based on the absolute value of difference between a signal adjacent to the signal of interest designated by the designating means and the signal of interest;
    process signal extracting means for extracting a plurality of adjacent signals as process signals from signals consecutively arranged in a first direction relative to the signal of interest designated by the designating means;
    calculating means for calculating an average signal by weight averaging the signal of interest and the plurality of process signals based on a comparison result of comparing a process difference between the signal of interest and each of the process signals with the first threshold value;
    first mix rate calculating means for calculating a first mix rate of the average signal and the signal of interest based on a comparison result of comparing the process difference with a second threshold value smaller than the first threshold value;
    first mixing means for generating a first mix signal by mixing the average signal and the signal of interest in accordance with the first mix rate calculated by the first mix rate calculating means;
    reference signal extracting means for extracting, as reference signals, a plurality of adjacent signals from signals consecutively arranged in a second direction relative to the signal of interest designated by the designating means;
    second mix rate calculating means for calculating a second mix rate of the mix signal and the signal of interest based on a reference difference between the signal of interest and each reference signal; and
    second mixing means for generating a second mix signal by mixing the first mix signal and the signal of interest in accordance with the second mix rate calculated by the second mix rate calculating means.

2. The signal processing apparatus according to claim 1, wherein the signal comprises a pixel value of each pixel constructing an image.

3. The signal processing apparatus according to claim 1, wherein the setting means comprises the absolute value of difference calculating means for calculating the absolute value of difference between the reference signal and the pixel of interest,
    wherein the first threshold value is set based on the maximum value of the absolute values of difference between each of the reference signals and the signal of interest.

4. The signal processing apparatus according to claim 1, wherein the setting means comprises:
    maximum signal extracting means for extracting one of the reference signals and the signal of interest providing a maximum value, from among the reference signals and the signal of interest; and
    minimum signal extracting means for extracting one of the reference signals and the signal of interest providing a minimum value, from among the reference signals and the signal of interest,
    wherein the first threshold value is set based on the absolute value of difference between the maximum value of the reference signals and the signal of interest and the minimum value of the reference signals and the signal of interest.

5. The signal processing apparatus according to claim 1, wherein the setting means comprises:
    forward direction calculating means for calculating the absolute value of difference between each of the reference signals and the signal of interest, the reference signals arranged in a forward direction with respect to the second direction relative to the signal of interest;

backward direction calculating means for calculating the absolute value of difference between each of the reference signals and the signal of interest, the reference signals arranged in a backward direction with respect to the second direction relative to the signal of interest, wherein the first threshold value is set based on the maximum value of the absolute values of difference calculated by the forward direction calculating means or the maximum value of the absolute values of difference calculated by the backward direction calculating means, whichever is smaller.

6. The signal processing apparatus according to claim 1, wherein the setting means comprises:

forward direction maximum signal extracting means for extracting one of the reference signals and the signal of interest providing a maximum value, from among the reference signals and the signal of interest, the reference signals arranged in a forward direction with respect to the second direction relative to the signal of interest;

forward direction minimum signal extracting means for extracting one of the reference signals and the signal of interest providing a minimum value, from among the reference signals and the signal of interest, the reference signals arranged in the forward direction with respect to the second direction relative to the signal of interest;

forward direction absolute value of difference calculating means for calculating the absolute value of difference between the maximum value extracted by the forward direction maximum signal extracting means and the minimum value extracted by the forward direction minimum signal extracting means;

backward direction maximum signal extracting means for extracting one of the reference signals and the signal of interest providing a maximum value, from among the reference signals and the signal of interest, the reference signals arranged in a backward direction with respect to the second direction relative to the signal of interest;

backward direction minimum signal extracting means for extracting one of the reference signals and the signal of interest providing a minimum value, from among the reference signals and the signal of interest, the reference signals arranged in the backward direction with respect to the second direction relative to the signal of interest; and backward direction absolute value of difference calculating means for calculating the absolute value of difference between the maximum value extracted by the backward direction maximum signal extracting means and the minimum value extracted by the backward direction minimum signal extracting means, wherein the first threshold value is set based on the absolute value of difference calculated by the forward direction absolute value of difference calculating means or the absolute value of difference calculated by the backward direction absolute value of difference calculating means, whichever is smaller.

7. The signal processing apparatus according to claim 1, wherein the setting means comprises a block absolute value of difference calculating means for calculating the absolute value of difference between each pixel within each of blocks and a pixel of interest within each of blocks set in a plurality of directions relative to the signal of interest, and outputting a maximum value of the absolute values of difference, wherein the first threshold value is set based on a minimum value of the maximum block values of difference calculated by the block absolute value of difference calculating means.

8. The signal processing apparatus according to claim 1, wherein the setting means comprises:

adjacent absolute value of difference calculating means for calculating the absolute value of difference between the signal of interest and each of adjacent pixels; and histogram generating means for generating a histogram based on the absolute value of difference between each pixel and the pixel of interest calculated by the adjacent absolute value of difference calculating means, wherein the first threshold value is set based on the absolute value of difference providing a minimum frequency in the histogram.

9. A method of adjusting a level of consecutively arranged signals, comprising steps of:

successively designating each of the consecutively arranged signals as a signal of interest;

setting a first threshold value based on the absolute value of difference between a signal adjacent to the signal of interest designated in the designating step and the signal of interest;

extracting a plurality of adjacent signals as process signals from signals consecutively arranged in a first direction relative to the signal of interest designated in the designating step;

calculating an average signal by weight averaging the signal of interest and the plurality of process signals based on a comparison result of comparing a process difference between the signal of interest and each of the process signals with the first threshold value;

calculating a first mix rate of the average signal and the signal of interest based on a comparison result of comparing the process difference with a second threshold value smaller than the first threshold value;

generating a first mix signal by mixing the average signal and the signal of interest in accordance with the first mix rate calculated in the first mix rate calculating step;

extracting, as reference signals, a plurality of adjacent signals from signals consecutively arranged in a second direction relative to the signal of interest designated in the designating step;

calculating a second mix rate of the mix signal and the signal of interest based on a reference difference between the signal of interest and each reference signal; and generating a second mix signal by mixing the first mix signal and the signal of interest in accordance with the second mix rate calculated in the second mix rate calculating step.

10. A recording medium storing a computer-readable program of adjusting a level of consecutively arranged signals, the computer program comprising steps of:

successively designating each of the consecutively arranged signals as a signal of interest;

setting a first threshold value based on the absolute value of difference between a signal adjacent to the signal of interest designated in the designating step and the signal of interest;

extracting a plurality of adjacent signals as process signals from signals consecutively arranged in a first direction relative to the signal of interest designated in the designating step;

calculating an average signal by weight averaging the signal of interest and the plurality of process signals based on a comparison result of comparing a process difference between the signal of interest and each of the process signals with the first threshold value;

calculating a first mix rate of the average signal and the signal of interest based on a comparison result of comparing the process difference with a second threshold value smaller than the first threshold value;

generating a first mix signal by mixing the average signal and the signal of interest in accordance with the first mix rate calculated in the first mix rate calculating step;

extracting, as reference signals, a plurality of adjacent signals from signals consecutively arranged in a second direction relative to the signal of interest designated in the designating step;

calculating a second mix rate of the mix signal and the signal of interest based on a reference difference between the signal of interest and each reference signal; and generating a second mix signal by mixing the first mix signal and the signal of interest in accordance with the second mix rate calculated in the second mix rate calculating step.

11. A program stored on a non-transitory computer-readable medium for causing a computer to adjust a level of consecutively arranged signals, the program comprising steps of:

successively designating each of the consecutively arranged signals as a signal of interest;

setting a first threshold value based on the absolute value of difference between a signal adjacent to the signal of interest designated in the designating step and the signal of interest;

extracting a plurality of adjacent signals as process signals from signals consecutively arranged in a first direction relative to the signal of interest designated in the designating step;

calculating an average signal by weight averaging the signal of interest and the plurality of process signals based on a comparison result of comparing a process difference between the signal of interest and each of the process signals with the first threshold value;

calculating a first mix rate of the average signal and the signal of interest based on a comparison result of comparing the process difference with a second threshold value smaller than the first threshold value;

generating a first mix signal by mixing the average signal and the signal of interest in accordance with the first mix rate calculated in the first mix rate calculating step;

extracting as reference signals, a plurality of adjacent signals from signals consecutively arranged in a second direction relative to the signal of interest designated in the designating step;

calculating a second mix rate of the mix signal and the signal of interest based on a reference difference between the signal of interest and each reference signal; and generating a second mix signal by mixing the first mix signal and the signal of interest in accordance with the second mix rate calculated in the second mix rate calculating step.

12. A signal processing apparatus for adjusting a level of consecutively arranged signals, the signal processing apparatus comprising:

a designating unit successively designating each of the consecutively arranged signals as a signal of interest;

a setting unit setting a first threshold value based on the absolute value of difference between a signal adjacent to the signal of interest designated by the designating unit and the signal of interest;

a process signal extracting unit extracting a plurality of adjacent signals as process signals from signals consecutively arranged in a first direction relative to the signal of interest designated by the designating unit;

a calculating unit calculating an average signal by weight averaging the signal of interest and the plurality of process signals based on a comparison result of comparing a process difference between the signal of interest and each of the process signals with the first threshold value;

a first mix rate calculating unit calculating a first mix rate of the average signal and the signal of interest based on a comparison result of comparing the process difference with a second threshold value smaller than the first threshold value;

a first mixing unit generating a first mix signal by mixing the average signal and the signal of interest in accordance with the first mix rate calculated by the first mix rate calculating unit;

a reference signal extracting unit extracting, as reference signals, a plurality of adjacent signals from signals consecutively arranged in a second direction relative to the signal of interest designated by the designating unit;

a second mix rate calculating unit calculating a second mix rate of the mix signal and the signal of interest based on a reference difference between the signal of interest and each reference signal; and a second mixing unit for generating a second mix signal by mixing the first mix signal and the signal of interest in accordance with the second mix rate calculated by the second mix rate calculating unit.

* * * * *